(12) United States Patent
Tanoue et al.

(10) Patent No.: US 6,298,033 B1
(45) Date of Patent: Oct. 2, 2001

(54) RECORDING/REPRODUCING OPTICAL DISK WITH CONSTANT PRODUCT OF ROTATION NUMBER AND NUMBER OF SECTOR AREAS AND RECORDING/REPRODUCING APPARATUS USING SAME

(75) Inventors: Koki Tanoue; Hideaki Osawa, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/107,511

(22) Filed: Jun. 30, 1998

(30) Foreign Application Priority Data

Jun. 30, 1997 (JP) .................................................. 9-173647
Jul. 4, 1997 (JP) .................................................. 9-179379
Jul. 15, 1997 (JP) .................................................. 9-189890

(51) Int. Cl.[7] ...................................................... G11B 7/24
(52) U.S. Cl. ...................................... 369/275.3; 369/275.4
(58) Field of Search .............................. 369/275.3, 275.4, 369/275.1, 13, 278, 279, 272, 44.26, 32, 277, 53.11, 53.2

(56) References Cited

U.S. PATENT DOCUMENTS 5,867,474 * 2/1999 Nagasawa et al. ............... 369/275.3
6,069,869 * 5/2000 Nagasawa et al. ............... 369/275.3

FOREIGN PATENT DOCUMENTS

| 63-13174 | 1/1988 | (JP) . |
| 2-189770 | 7/1990 | (JP) . |
| 6-274896 | 9/1994 | (JP) . |
| 9-147393 | 6/1997 | (JP) . |
| 9-161274 | 6/1997 | (JP) . |
| 9-223362 | 8/1997 | (JP) . |

* cited by examiner

*Primary Examiner*—Ali Neyzari
(74) *Attorney, Agent, or Firm*—Pillsbury Winthrop LLP

(57) ABSTRACT

A data recording/reproducing optical disk comprises a plurality of land areas and a plurality of groove areas, which are formed in configuration as concentric circles in such a manner that a plurality of tracks are formed on the plurality of land areas and the plurality of groove areas, the plurality of tracks are partitioned into a plurality of zones provided on the disk from the inner side to the outer side thereof and a plurality of sector areas are formed on a track in a continuous manner with the plurality of sector areas on a next track, wherein the disk in use is rotated such that a rotation number of the disk in a zone is sequentially slowed in successive zones toward the outer side of the disk along a radial direction under a condition of a constant product of a rotation number and the number of sector areas in one track in each zone.

15 Claims, 24 Drawing Sheets

| | | | RADIUS POSITION | NUMBER OF SECTORS IN ONE TRACK | TRACK NUMBER |
|---|---|---|---|---|---|
| READ IN AREA | EMBOSS DATA ZONE | BLANK ZONE<br>REFLECTION ZONE<br>BLANK ZONE<br>CONTROL DATA ZONE<br>BLANK ZONE | 22.59~23.996 | 18 | 1896 |
| | MIRROR ZONE | CONNECTION ZONE | 23.996~24.000 | | |
| | REWRITABLE DATA ZONE | GUARD TRACK ZONE<br>DISK TEST ZONE<br>DRIVE TEST ZONE<br>GUARD TRACK ZONE<br>DISK RECOGNITION ZONE<br>CHANGE CONTROL ZONE | 24.000~24.18 | 17 | 1888 |
| DATA AREA (REWRITABLE DATA ZONE) | | ZONE 0 | 24.18~25.40 | 17 | |
| | | ZONE 1 | 25.40~26.79 | 18 | 1888 |
| | | ZONE 2 | 26.79~28.19 | 19 | 1888 |
| | | ZONE 3 | 28.19~29.59 | 20 | 1888 |
| | | ZONE 4 | 29.59~30.99 | 21 | 1888 |
| | | ZONE 5 | 30.99~32.38 | 22 | 1888 |
| | | ZONE 6 | 32.38~33.78 | 23 | 1888 |
| | | ZONE 7 | 33.78~35.18 | 24 | 1888 |
| | | ZONE 8 | 35.18~36.57 | 25 | 1888 |
| | | ZONE 9 | 36.57~37.97 | 26 | 1888 |
| | | ZONE 10 | 37.97~39.37 | 27 | 1888 |
| | | ZONE 11 | 39.37~40.76 | 28 | 1888 |
| | | ZONE 12 | 40.76~42.16 | 29 | 1888 |
| | | ZONE 13 | 42.16~43.56 | 30 | 1888 |
| | | ZONE 14 | 43.56~44.96 | 31 | 1888 |
| | | ZONE 15 | 44.96~46.35 | 32 | 1888 |
| | | ZONE 16 | 46.35~47.75 | 33 | 1888 |
| | | ZONE 17 | 47.75~49.15 | 34 | 1888 |
| | | ZONE 18 | 49.15~50.55 | 35 | 1888 |
| | | ZONE 19 | 50.55~51.94 | 36 | 1888 |
| | | ZONE 20 | 51.94~53.34 | 37 | 1888 |
| | | ZONE 21 | 53.34~54.74 | 38 | 1888 |
| | | ZONE 22 | 54.74~56.13 | 39 | 1888 |
| | | ZONE 23 | 56.13~57.53 | 40 | 1888 |
| READ OUT AREA (REWRITABLE DATA ZONE) | | CHANGE CONTROL ZONE<br>DISK RECOGNITION ZONE<br>GUARD TRACK ZONE<br>DRIVE TEST ZONE<br>DISK TEST ZONE<br>GUARD TRACK ZONE | 57.53~58.60 | 40 | 1446 |

FIG. 4

| | | PHYSICAL SECTOR NUMBER (HEXA) | ROTATION SPEED (Hz) |
|---|---|---|---|
| READ IN AREA | EMBOSS DATA ZONE — BLANK ZONE | 27AB0~2EFFF | 37.57 |
| | REFLECTION ZONE | 2F000~2F00F | |
| | BLANK ZONE | 2F010~2F1FF | |
| | CONTROL DATA ZONE | 2F200~2FDFF | |
| | BLANK ZONE | 2FE00~2FFFF | |
| | MIRROR ZONE — CONNECTION ZONE | | |
| | REWRITABLE DATA ZONE — GUARD TRACK ZONE | 30000~301FF | 39.78 |
| | DISK TEST ZONE | 30200~305FF | |
| | DRIVE TEST ZONE | 30600~30CFF | |
| | GUARD TRACK ZONE | 30D00~30EFF | |
| | DISK RECOGNITION ZONE | 30F00~30F7F | |
| | CHANGE CONTROL ZONE | 30F80~30FFF | |
| DATA AREA (REWRITABLE DATA ZONE) | ZONE 0 | 31000~37D5F | 39.78 |
| | ZONE 1 | 37D60~4021F | 37.57 |
| | ZONE 2 | 40220~48E3F | 35.59 |
| | ZONE 3 | 48E40~521BF | 33.81 |
| | ZONE 4 | 521C0~5BC9F | 32.20 |
| | ZONE 5 | 5BCA0~65EDF | 30.74 |
| | ZONE 6 | 65EE0~7087F | 29.40 |
| | ZONE 7 | 70880~7B97F | 28.18 |
| | ZONE 8 | 7B980~871DF | 27.05 |
| | ZONE 9 | 871E0~9319F | 26.01 |
| | ZONE 10 | 931A0~9F8BF | 25.05 |
| | ZONE 11 | 9F8C0~AC73F | 24.15 |
| | ZONE 12 | AC740~B9D1F | 23.32 |
| | ZONE 13 | B9D20~C7A5F | 22.54 |
| | ZONE 14 | C7A60~D5EFF | 21.82 |
| | ZONE 15 | D5F00~E4AFF | 21.13 |
| | ZONE 16 | E4B00~F3E5F | 20.49 |
| | ZONE 17 | F3E60~10391F | 19.89 |
| | ZONE 18 | 103920~113B3F | 19.32 |
| | ZONE 19 | 113B40~1244BF | 18.79 |
| | ZONE 20 | 1244C0~13559F | 18.28 |
| | ZONE 21 | 1355A0~146DDF | 17.80 |
| | ZONE 22 | 146DE0~158D7F | 17.34 |
| | ZONE 23 | 158D80~16B47F | 16.91 |
| READ OUT AREA (REWRITABLE DATA ZONE) | CHANGE CONTROL ZONE | 16B480~16B4FF | 16.91 |
| | DISK RECOGNITION ZONE | 16B500~16B57F | |
| | GUARD TRACK ZONE | 16B580~16B77F | |
| | DRIVE TEST ZONE | 16B780~16BE7F | |
| | DISK TEST ZONE | 16BE80~16C57F | |
| | GUARD TRACK ZONE | 16C580~17966F | |

| HEADER FIELD | MIRROR FIELD | RECORDING FIELD | | | | | | |
|---|---|---|---|---|---|---|---|---|
| | | GAP FIELD | GUARD 1 FIELD | VFO 3 FIELD | PS FIELD | DATA FIELD | PA3 FIELD | GUARD 2 FIELD | BUFFER FIELD |
| 128 | 2 | 10+J/16 | 20+K | 35 | 3 | 2418 | 1 | 55-K | 25-J/16 |

| HEADER 1 FIELD | | | | | HEADER 2 FIELD | | | | | HEADER 3 FIELD | | | | | HEADER 4 FIELD | | | | |
|---|---|---|---|---|---|---|---|---|---|---|---|---|---|---|---|---|---|---|---|
| VFO 1 | AM | PID 1 | IED 1 | PA1 | VFO 2 | AM | PID 2 | IED 2 | PA2 | VFO 1 | AM | PID 3 | IED 3 | PA1 | VFO 2 | AM | PID 4 | IED 4 | PA2 |
| 36 | 3 | 4 | 2 | 1 | 8 | 3 | 4 | 2 | 1 | 36 | 3 | 4 | 2 | 1 | 8 | 3 | 4 | 2 | 1 |

RECORDING/REPRODUCING OPTICAL DISK WITH CONSTANT PRODUCT OF ROTATION NUMBER AND NUMBER OF SECTOR AREAS AND RECORDING/REPRODUCING APPARATUS USING SAME

BACKGROUND OF THE INVENTION

The present invention relates to a data recording/reproducing optical disk, a master disk manufacturing apparatus for an optical disk used in manufacture of the optical disk and an optical disk recording/reproducing apparatus (hereinafter simply referred to as optical disk apparatus as well) using the optical disk.

Recently, a digital video disk (DVD) as an optical disk of a large storage capacity has been developed and an optical disk apparatus which is used for recording data on the optical disk and reproducing the recorded data thereon has also been developed.

An optical disk used in such an optical disk apparatus has a format such that a surface of the optical disk is partitioned along a radial direction, into a plurality of annular zones comprising a plurality of tracks. Each zone has the same number of sectors in one track therein and the number of sectors in one track in a zone is increased by one between adjacent two zones toward the outer side of the optical disk and this is applied through all the zones along a radial direction.

The above described optical disk apparatus is designed so as to perform only recording at an almost fixed linear speed (laser light from an optical head travels at an almost constant moving speed along a track on the optical disk) according to characteristics of the optical disk. For this reason, a different rotation number is adopted for a different zone when data is recorded. That is, a rotation number of the disk is sequentially decreased as the laser light travels in recording along a radial direction from an inner side zone to the outer side zone on the optical disk.

Besides, when data is reproduced, a rotation number along a radial direction is changed from the inner zone to the outer zone in a similar manner to the recording.

In such an optical disk apparatus, a data transmission rate is different in a different zone when reproducing is performed.

Therefore, when an animation is recorded as data and the data are reproduced, there is a need for circuitry through which a transmission rate is adjusted so as to assume the same value since a transmission rate is different in a different zone. In such a case, the transmission rate is adjusted to the lowest rate, which entails a problem: the transmission rate thus adjusted is slow.

BRIEF SUMMARY OF THE INVENTION

It is an object of the present invention to provide an optical disk in which a transmission rate is not slowed, but secured at a constant value, and in which data recording/reproducing for an animation and the like can be performed without any additional special circuitry, a master disk manufacturing apparatus for the optical disk and an optical disk recording/reproducing apparatus using the optical disk.

The present invention is directed to a data recording/reproducing optical disk comprising: a plurality of land areas and a plurality of groove areas, which are formed on a disk made of resin in configuration of a spiral shape or as concentric circles in such a manner that each full round of the configuration, spiral or circular, consists of one of a land area and a groove area, and a land area and a groove area in the rounds of the configuration, spiral or circular, are disposed alternately in a sequential manner along a radial direction of the disk; and a plurality of tracks formed on the plurality of land areas and the plurality of groove areas, the plurality of tracks being partitioned into a plurality of zones provided on the disk from the inner side to the outer side thereof, a plurality of sector areas being formed on a track in a continuous manner with the plurality of sector areas on a next track and a format being adopted that each sector area includes an address area where an address data which means the location of the sector on the track is recorded and a recording area where an arbitrary data is recorded, the number of sector areas in the plurality of sector areas is increased by one between tracks in the radial direction from the inner side to the outer side of the disk, and the plurality of sector areas including a plurality of block areas in each of which a plurality of error correction recording areas used for recording error correction data for reproduction of the recorded arbitrary data with high fidelity are included, wherein the disk in use is rotated such that a rotation number of the disk in a zone is sequentially slowed in successive zones toward the outer side of the disk along a radial direction under a condition of a constant product of a rotation number and the number of sector areas in one track in each zone.

Since the product of a rotation number and the number of sector areas in one track in each zone is constant, as described above, recording and reproducing of arbitrary data can be performed at the same transmission rate. That is, even when a disk is rotated at a different rotation number R in each zone, there is always established a relation that R·n=C among R and the number n of sector areas in one track in each zone of the disk, and a product C thereof. That is, since a product of a rotation number R and the number n of sector areas in one track in each zone of the disk is always constant, a transmission rate of data read out from the disk is always constant. For this reason, in the case of the present invention, a recording/reproducing process can be realized at the maximum transmission rate since a stable, constant transmission rate can be obtained as compared with a conventional case.

The present invention specifies a disk manufacturing apparatus for such a disk and a disk recording/reproducing apparatus.

The present invention is directed to a data recording/reproducing optical disk, which comprises a first area in which data recording and reproducing can be effected based on a first format; and a second area in which data for recognizing a disk can only be reproduced based on a second format.

According to the present invention, an emboss area in the second format is provided in addition to an area in the first format which is an ordinary recording area; recorded in the emboss area is information exclusively used to read out control information and the like. With provision of this area, even when no access can be performed to an ordinary recording area for some reason or other, it is possible to read important read information such as control information or the like. This enables investigation into why an ordinary area cannot be accessed and thus makes access to a disk more certain.

Since the land areas and groove areas are respectively provided with change areas, recording/reproducing can be realized with more certainty even when recording in a primary area is not conducted in an orderly manner.

The present invention is directed to a data recording and reproducing optical disk, in which a plurality of land sectors are disposed along one round of a spiral track and a plurality of groove sectors are disposed along one round of the spiral track in such a manner that the plurality of land sectors and the plurality of groove sectors are alternately successively disposed on spiral tracks along a radial direction, in repetition of one round of the plurality of land sectors and a next one round of the plurality of groove sectors, comprising: a first rewritable data area in which each of a first predetermined number of land sectors and the first predetermined number of groove sectors is disposed along one round of a spiral track, a land sector including a first recording section, which is an area in the shape of a land where data recording/reproducing is conducted, and which is disposed on a spiral track, and a first half header section, which indicates address information of data recorded and reproduced on the first recording section, and which is located ahead of the first recording section and a groove sector including a second recording section, which is an area in the shape of a groove where data recording/reproducing is conducted, and which is disposed on the spiral track, and a second half header section, which indicates address information of data recorded and reproduced on the second recording section, and which is located ahead of the second recording section and disposed in pair with the first half header section in a zig-zag shifted manner; a first change area located in the vicinity of the first rewritable data area, in which when data write is not performed in the first rewritable data area in an orderly manner, the data write is performed instead of the first rewritable data area, including the first predetermined number of land sectors and the first predetermined number of groove sectors each disposed along one round of a spiral track; a second rewritable data area including: a second predetermined number of land sectors and the second predetermined number of grooves disposed each along one round of a spiral track, wherein the second predetermined number is different from the first predetermined number; and a second change area located in the vicinity of the second writable data area, in which when data write is not performed in the second rewritable data area in an orderly manner, the data write is performed instead of the second rewritable data area, including the second predetermined number of land sectors and the second predetermined number of groove sectors each disposed along one round of a spiral track.

The present invention similarly provides change areas for a land area and a groove area respectively, whereby data recording/reproducing are realized with more certainty even when recording is not performed in an orderly manner in a primary area. Such structural features are in more detailed manner specified in the invention described just above.

The present invention is directed to a data recording/reproducing optical disk comprising: a plurality of land areas and a plurality of groove areas, which are formed on a disk made of resin in configuration of a spiral shape or as concentric circles in such a manner that each full round of the configuration, spiral or circular, consists of one of a land area and a groove area, and a land area and a groove area in the rounds of the configuration, spiral or circular, are disposed alternately in a sequential manner along a radial direction of the disk; and a plurality of tracks formed on the plurality of land areas and the plurality of groove areas, the plurality of tracks being partitioned into a plurality of zones provided on the disk from the inner side to the outer side thereof, a plurality of sector areas being formed on a track in a continuous manner with the plurality of sector areas on a next track, a format being adopted that each sector area includes an address area where an address data which means the location of the sector area on the track is recorded and a recording area where an arbitrary data is recorded, the number of sector areas in the plurality of sector areas being increased by one between tracks in a radial direction from the inner side to the outer side of the disk, and the plurality of sector areas including a plurality of block areas in each of which a plurality of error correction recording areas used for recording error correction data for reproduction of the recorded arbitrary data with high fidelity are included, wherein the disk in use is rotated such that a rotation number of the disk in a zone is sequentially slowed in successive zones toward the outer side of the disk along a radial direction under a condition of a constant product of a rotation number and the number of sector areas in one track in each zone and the plurality of tracks includes a rewritable data area in which recording and reproducing of data can be conducted, having a first recording section which is in the shape of a land where data recording/reproducing is performed, a first half header section in which address information corresponding to the first recording section is recorded, a second recording section which is in the shape of a groove where data recording/reproducing is performed and a second half header section, in which address information corresponding to the second recording section is recorded, and which is disposed in pair with the first header section in a zig-zag shifted manner.

According to the present invention, a product of a rotation number and the number of sector areas along one track round in each zone has a constant value, that is R·n=C, whereby the same rate can be obtained between zones to realize a stable reproduction.

In addition to this, the present invention described has a configuration in which the first half header section and the second half header as described above are disposed in a zig-zag shifted manner with a space therebetween, whereby 1) reliability in reading is increased because a margin in distance between adjacent pits is provided, 2) a narrow beam exclusively used for a header is not necessary any longer and thus cutting can be possible by one beam with a high speed and 3) a converting position between a land and a groove can be detected with ease.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate a presently preferred embodiment of the invention and together with the general description given above and the detailed description of the preferred embodiment given below, serve to explain the principles of the invention.

FIG. 4 is a representation for explaining the number of sectors in one track and the like in each zone of an optical disk;

FIG. 5 is a representation for explaining a rotation speed and the like in each zone of an optical disk;

FIG. 9 is a representation for explaining the content of each zone of a data area of an optical disk;

FIG. 21A is a representation showing an overall structure of a sector on a recording/reproducing optical disk pertaining to an embodiment of the invention of the present application;

FIG. 21B is a representation in detail showing a header section of the sector of FIG. 21A;

DETAILED DESCRIPTION OF THE INVENTION

Below described will be a master disk manufacturing apparatus for an optical disk showing an embodiment of the present invention in reference to the accompanying drawings.

Figure 1:
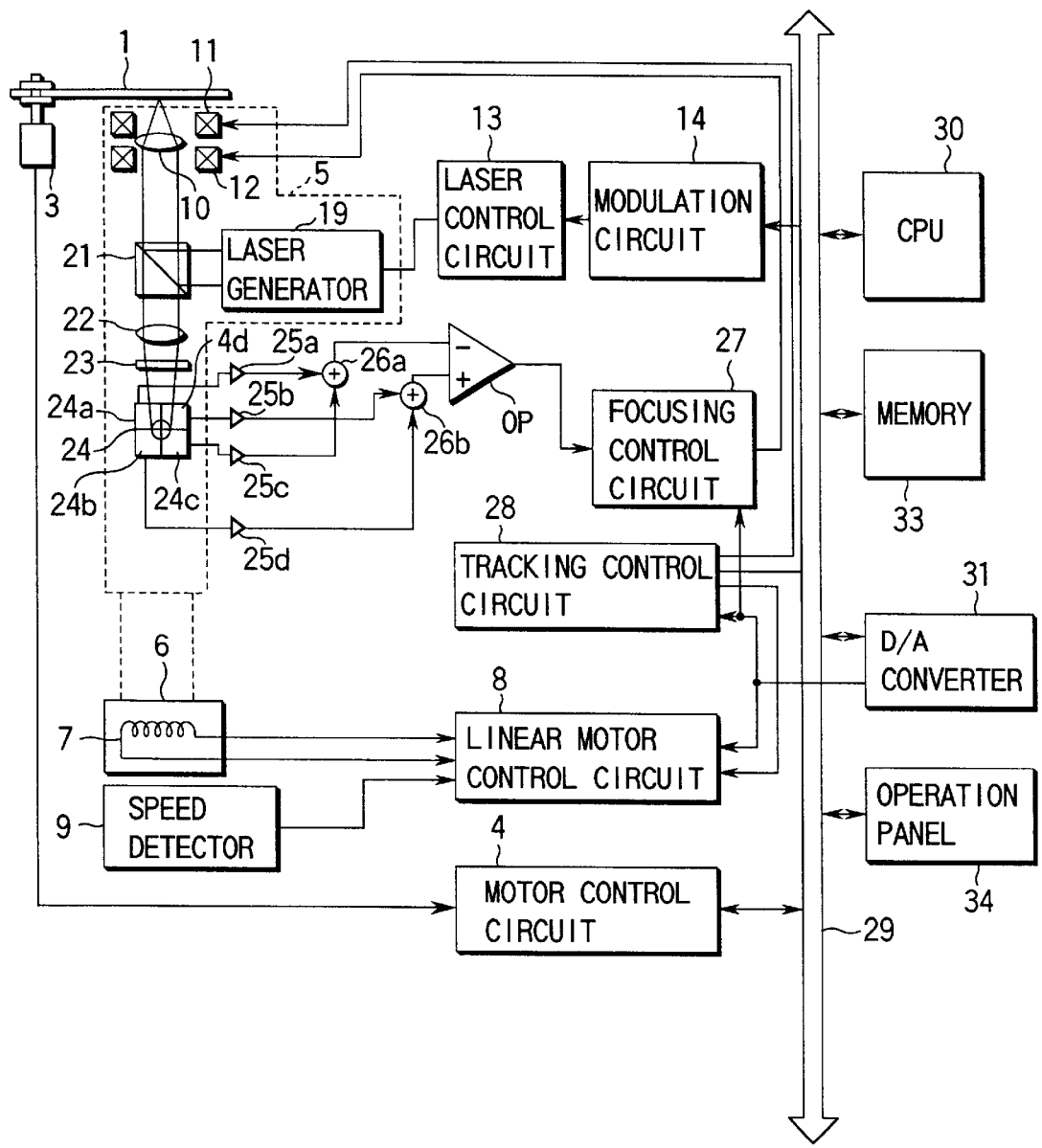
FIG. 1 is a block diagram showing a schematic structure of a cutting apparatus for explaining an embodiment of the present invention.

FIG. 1 shows a cutting apparatus for manufacturing a glass master disk and producing a stamper (mastering process). In FIG. 1, the cutting apparatus works to form a protruding portion (groove) of a track and a recorded mark (pit) in the shape of a tiny recess by melting photoresist coated on a glass substrate 1 with no recess/protrusion profiles thereon under ON/OFF application of laser power when manufacturing the glass master disk for a recording/reproducing optical disk (RAM).

In FIG. 1, the glass substrate 1 coated with photoresist is rotated by a motor 3 at various rotation numbers wherein a rotation number is different in a different zone as described later. The motor 3 is controlled by a motor control circuit 4.

A cutting process on the glass substrate 1 is conducted by an optical head 5. The optical head 5 is fixedly mounted to a driving coil 7 constituting a moving part of a linear motor 6 and the driving coil 7 is connected to a linear motor control circuit 8.

A speed detector 9 is connected to the linear motor control circuit 8 and a speed signal of the speed detector 9 is transmitted to the linear motor control circuit 8.

A stationary part of the linear motor 6 is provided with a permanent magnet not shown and the driving coil 7 is excited by the linear motor control circuit 8 and thereby the optical head 5 is moved along a radial direction of the glass substrate 1.

The optical head 5 is provided with an objective lens 10 supported by a wire or a leaf spring not shown and the objective lens 10 can be moved along not only a focusing direction (an optical axis direction of the lens) by a driving coil 12 and a tracking direction (a direction intersecting an optical axis of the lens at a right angle) by a driving coil 11.

Laser light generated from a laser generator 19 driven by a laser control circuit 13 is projected on the glass substrate 1 through a half prism 21 and the objective lens 10 and reflected light from the glass substrate 1 is guided to a photodetector 24 through the objective lens 10, the half prism 21, a collective lens 22 and a cylindrical lens 23.

Figure 2:
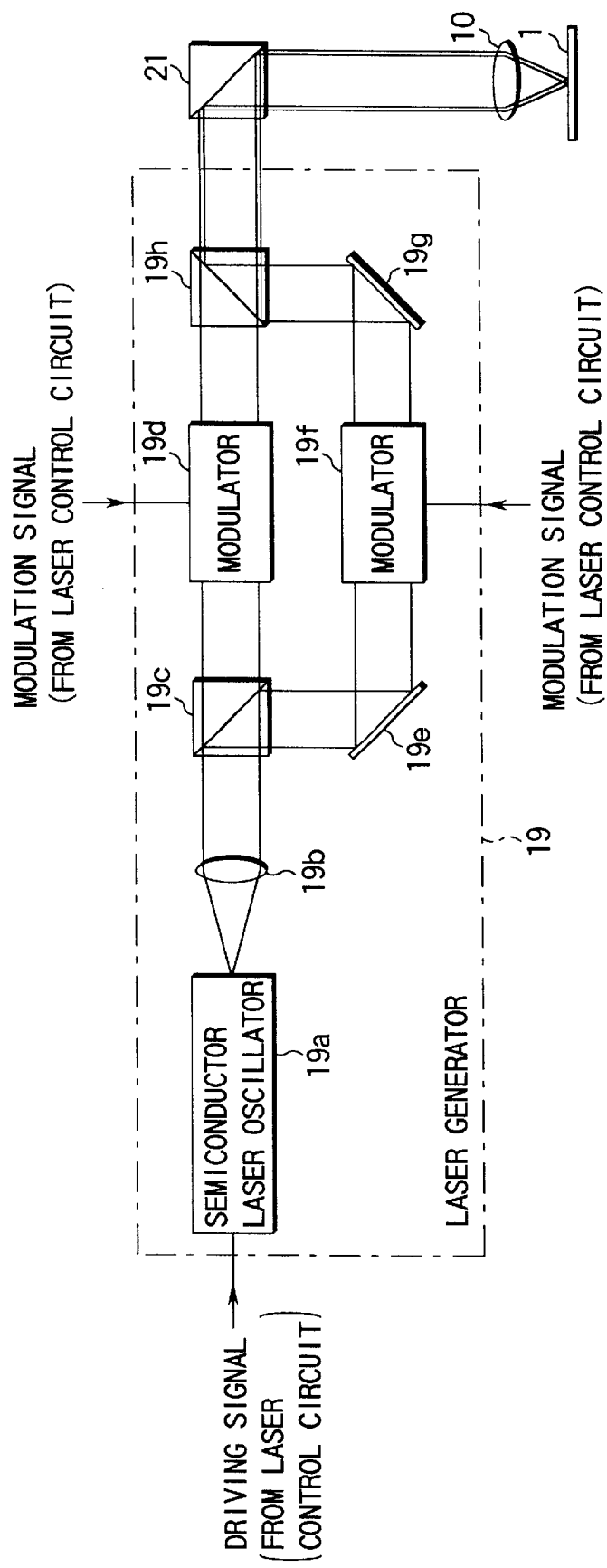
FIG. 2 is a schematic diagram showing a structure of a laser generator.

The laser generator 19 comprises, as shown in FIG. 2, a semiconductor laser oscillator (or Ar/Ne laser oscillator) 19a generating laser light, a collimator lens 19b by which laser rays from the semiconductor laser oscillator 19a are collimated, a beam splitter 19c which divides laser light from the collimator lens 19b into transmissive light and reflecting light, a modulator 19d which modulates laser light transmitting the beam splitter 19c, a modulator 19f which modulates laser light which is reflected on the beam splitter 19c and guided through a mirror 19e and a half prism 19h, which transmits laser light from the modulator 19d, and which reflects laser light guided through a mirror 19g from the modulator 19f. The modulators 19d, 19f work so as to selectively intercept laser light guided thereto by a control signal from the laser control circuit 13 and are constituted from, for example a shutter or the like. The modulator 19d allows laser light to transmit itself by modulating according to a modulation signal shown in the case (c) of FIG. 3 when a groove is formed and the modulator 19f allows laser light to transmit itself by modulating according to a modulation signal shown in the case of (b) of FIG. 3 when an address pit is formed.

Laser light Ca from the modulator 19d is guided to the glass substrate 1 through the half prism 19h, the half prism 21 and the objective lens 10, and laser light Cb from the modulator 19f is guided to the glass substrate 1 through the mirror 19g, the half prism 19h, the half prism 21 and the objective lens 10.

At this point, the center of the laser light Ca coincides with the center of a groove and the center of the laser light Cb is deviated from the center of the groove in a radial direction of the glass substrate 1 by adjustment of the mirror 19g.

Figure 3:
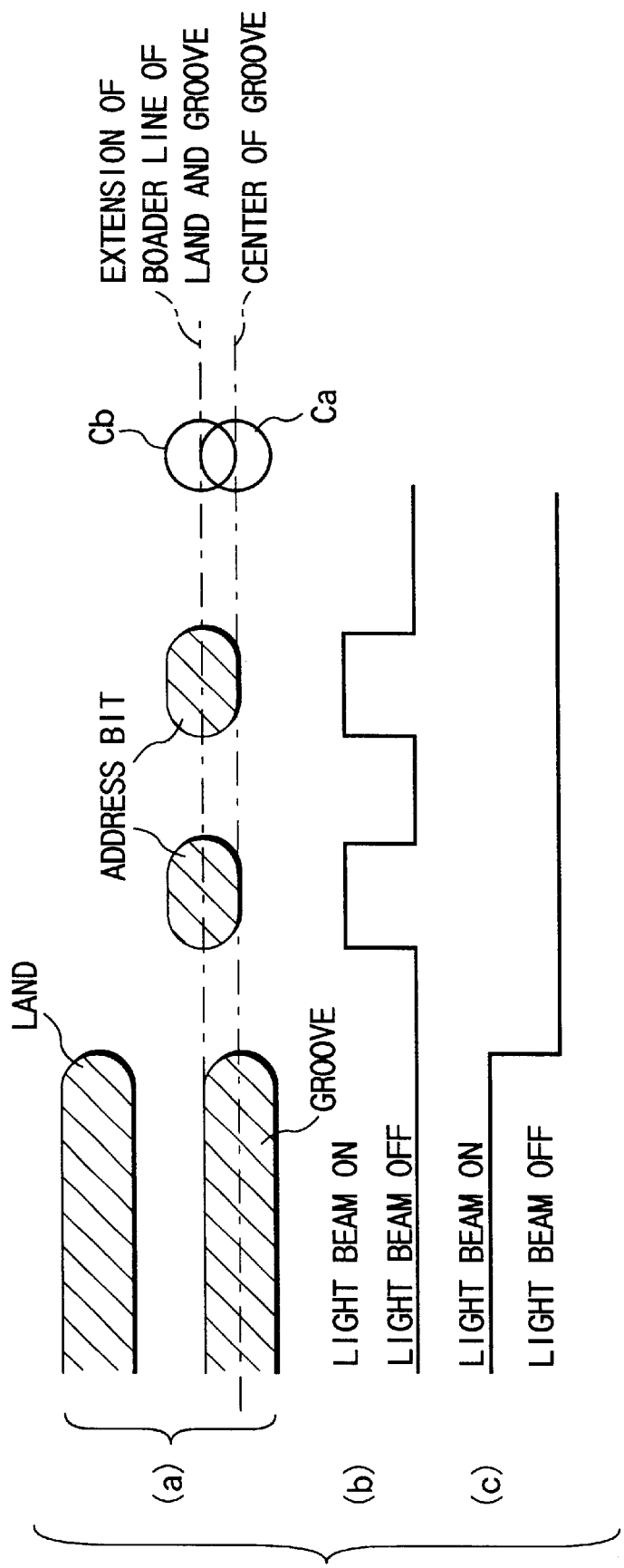
FIG. 3 is a representation for explaining formation of a groove, formation of an address pit and a modulation signal.

In such a condition, as shown in (a) of FIG. 3, the center of the laser light coincides with the center of the groove and the center of the laser light Ca coincides with an extension of the boundary line between a land and the groove.

The photodetector 24 is constructed from light detecting cells 24a, 24b, 24c and 24d, wherein the photodetector 24 is divided in four ways.

Output signals from the light detecting cells 24a, 24b, 24c, 24d are respectively supplied through amplifiers 25a, 25b, 25c, 25d to a terminal of an adder 26a, a terminal of an adder 26b, the other terminal of the adder 26a and the other terminal of the adder 26d.

An output signal of the adder 26a is supplied to the inversion input terminal of a differential amplifier OP1 and an output signal of the adder 26b is supplied to the non-inversion input terminal of the differential amplifier OP1. The differential amplifier OP1 thereby outputs a signal relating to a focal point in accordance with a difference between output signals of the adders 26a, 26b to supply the signal to a focusing control circuit 27. An output signal of the focusing control circuit 27 is supplied to the focusing driving coil 12 and the laser light is controlled on the optical disk to be always in a just focusing condition.

A tracking control circuit 28 produces a track driving signal according to a control signal supplied from CPU 30 through a D/A converter 31.

A track driving signal output from the tracking control circuit 28 is supplied to the driving coil 11 in a tracking direction.

With the supply of a track driving signal to the driving coil 11, the objective lens 10 gradually moves a distance of one track while the glass substrate is rotated one rotation.

When the objective lens 10 moves under control of the tracking control circuit 28, the linear motor control circuit 8 drives the linear motor 6, that is moves the optical head 5 so that the objective lens 10 assumes its position in the vicinity of the center of the optical head 5.

A modulation circuit 14 is provided in a preceding stage of the laser control circuit 13. The modulation circuit 14 modulates a preformat data recorded in an emboss data zone of a read-in area, which data is supplied from a memory 33 described later, and a preformat data in the header area of each sector of each zone in a data area according to an 8 to 16 code conversion method or the like.

The cutting apparatus is provided with the D/A converter 31 for exchange of data between the focusing control circuit 27, the tracking control circuit 28 or the linear motor control circuit 8 and the CPU 30.

The laser control circuit 13, the focusing control circuit 27, the tracking control circuit 28, the linear motor control circuit 8, the motor control circuit 4, the modulation circuit 14 and the like are controlled by the CPU 30 through a bus line 29 and the CPU 30 conducts a predetermined processing by an instruction to start cutting from an operator control panel 34 and according to a program stored in the memory 33.

The memory 33 stores a position along a radial direction of zones, the number of sectors in one track of each zone, the number of tracks of each zone, physical sector numbers of zones and rotation numbers of each zone and in addition, data in a header section preformatted in each zone of a memory area.

Tracks in the emboss data zone of the read-in area are formed by grooves in the shape of a spiral and a track in each zone of the memory area assume a single spiral mode constituted by a combination of grooves and lands both in the shape of a spiral wherein one round of a track is constituted by either a groove or a land and a groove abuts on a land or vice versa in a radial direction. Tracks in a rewritable data zone of the read-in area and tracks in a read-out area may respectively be formed with spiral grooves only, but the tracks in both areas may respectively be formed with mixtures of spiral lands and spiral grooves, wherein one round of a track is constituted by either a groove or a land and a groove abuts on a land or vice versa in a radial direction.

With use of the above described cutting apparatus, in manufacture of a glass master disk, recesses corresponding to grooves and emboss data are formed in accordance with a structure of an optical disk 40 described later while the glass substrate is rotated at a rotation number corresponding to each zone.

In the cutting apparatus, photoresist on the glass substrate 1 is selectively molten across the surface thereof in accordance with grooves and header sections and after the cutting is over, developing and a conductive treatment are applied to the surface to obtain the glass master disk. The glass master disk is subjected to electroplating or the like to manufacture a stamper which has a nickel layer or the like thereon.

An optical layer 40 for recording/reproducing is manufactured with use of the stamper in an injection stamping method or the like.

A structure of the optical disk 40 thus fabricated will be described.

The optical disk 40 is constructed from, for example, a disk-like substrate made of a transparent resin such as polycarbonate resin or acrylic resin of 0.6 mm thick, a recording film of a phase change type, a reflective film, a protective film, a bonding sheet and an adhesive agent. A groove and header information are recorded in a recess/protrusion profile on substrates, the recording film and the like are formed on the surface having the recess/protrusion profile of each substrate, and two substrates thus processed are bonded to each other on the surfaces having the surface profile to manufacture a double-sided recording/reproducing disk.

The optical disk 40, as shown in FIGS. 4 to 7, has a structure containing an emboss data zone 45 of a read-in area 42 and a rewritable data zone 46, zones 43a, . . . 43x of a data area 43 and a data zone of a read-out area 44 from the inner side to the outer side of the disk, wherein clock signals for respective zones are the same and rotation numbers (rotation speeds) and the numbers of sectors in one track for the respective zones are different from one another.

The read-in area 42 is constructed from an emboss data zone 45 comprising a plurality (1896) of tracks and a rewritable data zone 46 comprising a plurality of tracks. The emboss data zone 45 is constructed from a blank zone, reference signal zone, a blank zone, a control data zone, and a blank zone. The emboss zone 45 records a reference signal and a control data in a manufacturing process. The rewritable data zone 46 is constructed from a guard track zone, a disk test zone, a drive test zone, a disk recognition zone and a change control zone as a change control area.

The data area 43 is constructed from a plurality of, for example, 24 zones consisting of 43a, . . . 43x along a radial direction, each comprising a plurality (1888) of tracks. Among the zones, only the zone 43a comprises the rewritable data zone 46 and the number of tracks is 1888 in total.

The read-out area 44 is constructed from a plurality (1446) of tracks, the area is a collection of rewritable data zones as is in the case of the rewritable data zone 46 and the area can record the same content as that of the data zone 46.

In zones 43a, . . . 43x of the data area 43, a rotation number (a speed is 39.78 to 19.9 Hz) of each zone is slowed from the inner side to the outer side of an optical disk and the number of sectors (17 to 40) in one track of a zone is increased in the same direction.

Figure 8:
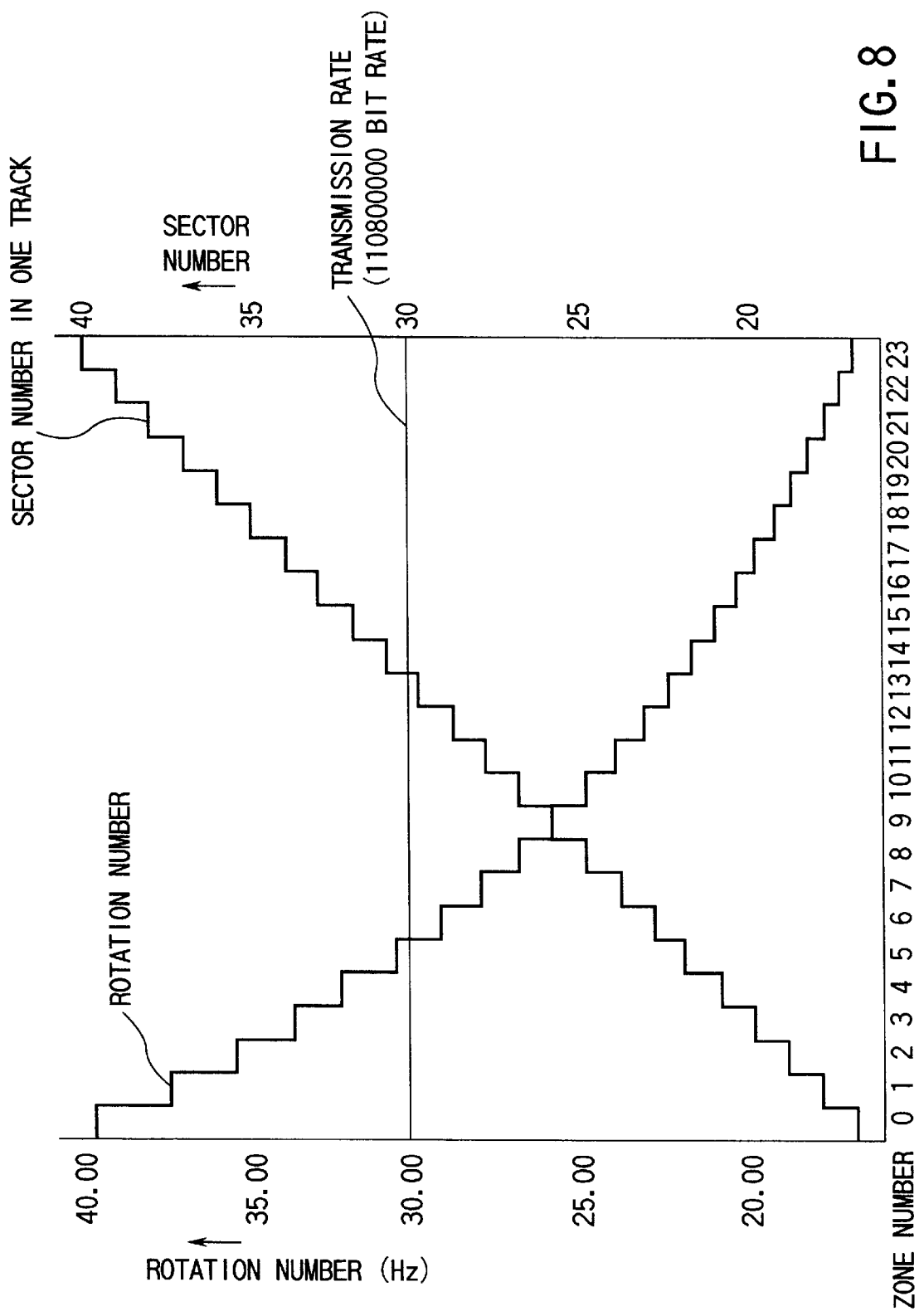
FIG. 8 is a graph for explaining a transmission rate calculated from a rotation number and the number of sectors in one track of data area in each zone on an optical disk.

Therefore, since a transmission rate in each zone of the optical disk 40 in reproducing is determined by the number of sectors in one track in the zone and a rotation number of the zone and as described above, a rotation number in a zone is gradually decreased from a rotation number of 39.78 along a direction from the inner side zone to the outer side zone of the optical disk 40, while the number of sectors in one track is increased from 17 at a rate of one per one track, thus a transmission rate in each zone is the same (11080000 bit rate: 11.08 Mbps) as shown in FIG. 8.

A product of the number of sectors in one track and a rotation number in each zone is constant. The constant value is a value (676.3) obtained when a bit rate as a transmission rate is divided by the number of bits per sector (2048×8).

That is, the bit rate is a product of the number of sectors in one track, the number of user bits in one sector and a rotation number in a zone.

Accordingly, when a rotation number (Hz) of an optical disk 40 is indicated by S, a user data bit rate (bps) is indicated by R, the number of sectors in one track is indicated by N and the number of user bits in one sector is indicated by B, the following formula is given:

$$S=R/(N \cdot B)$$

Relations between speed data as a rotation number, the number of sectors in one track and the like in the respective zones 43a, . . . 43x, 44, 45, 46 are recorded in a table 93a of a memory 93 of an optical disk apparatus 61 (described later) or the emboss data zone 45 of the optical disk 40 according to the contents shown in FIGS. 4 and 5.

Guide areas as buffer areas are provided on the outer and inner sides of each zone (a guide area between adjacent two zones), where data recording is not conducted. But there are exceptions in that no guide areas are provided on the inner side of the zone 43a and on the outer side of the zone 43x. The zones 43a, . . . 43x are constructed from 24 groups (numbered with 0 to 23) where data are actually recorded with exclusion of guide areas provided on the inner and outer sides. The groups each are constructed from a user area and a spare sector comprising an alternate sector for a defective sector. The spare area is located on the outside of the outer periphery of the user area.

The contents of the zones 43a, . . . 43x (numbered with 0 to 23) are recorded in the table 93a of the memory 93 of the optical disk apparatus 61 or in the emboss data zone 45 of the optical disk 40.

Figure 9:
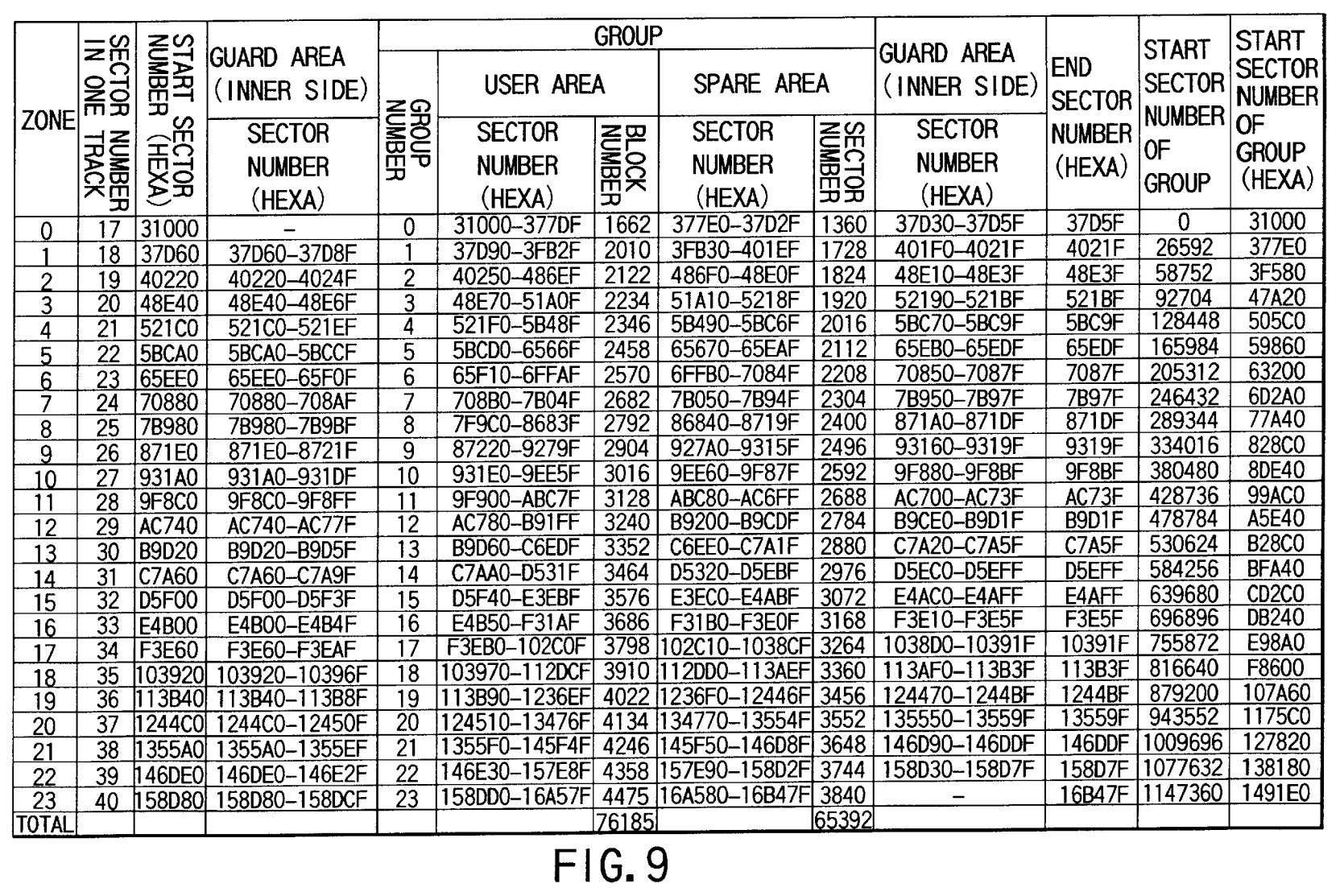

That is, as shown in FIG. 9, each zone is recorded with a zone number, the number of sectors in one track (one round), a start sector number (hexa), the sector number of a guard area on the inner side (hexa), a group number, the sector number of a user area (hexa) and the number of ECC blocks, the sector number (hexa) and the number of sectors of a spare area, the sector number of a guard area on the outer side (hexa), an end sector number (hexa), the start sector number of a group, and the start sector number of the group (hexa).

The number of sectors in one track is increased from the inner side to the outer side of the optical disk like 17 for zone 0, 18 for zone 1, . . . 40 for zone 23 at a rate of one sector per one in the zone number. A start number shows the first sector number of the corresponding zone in a hexadecimal notation. The sector number of a guard area on the inner side shows the first sector number and the end sector number of the guard area on the inner side of the corresponding zone in a hexadecimal notation. A group number is attached with the same number as the corresponding zone number. The sector number of a user area shows the first sector number and the end sector number of the user area of the corresponding zone in a hexadecimal notation. The number of ECC blocks shows the number of ECC blocks in the user area of the corresponding zone in a decimal notation. The sector number of a spare area shows the first sector number and the end sector number of the spare area of the corresponding zone in a hexadecimal notation. The number of sectors in the spare area shows the number of sectors in the spare area of the corresponding zone in a decimal notation. The sector number of a guard area on the outer side shows the first sector number and the end sector number in the guard area on the outer side of the corresponding zone in a hexadecimal notation. An end sector number shows the end sector number of the corresponding zone in a hexadecimal notation. The start sector number of a group shows the start sector number in actual use in the group of the corresponding zone in decimal and hexadecimal notations and sector numbers in a zone are attached with consecutive integer numbers.

Figure 6:
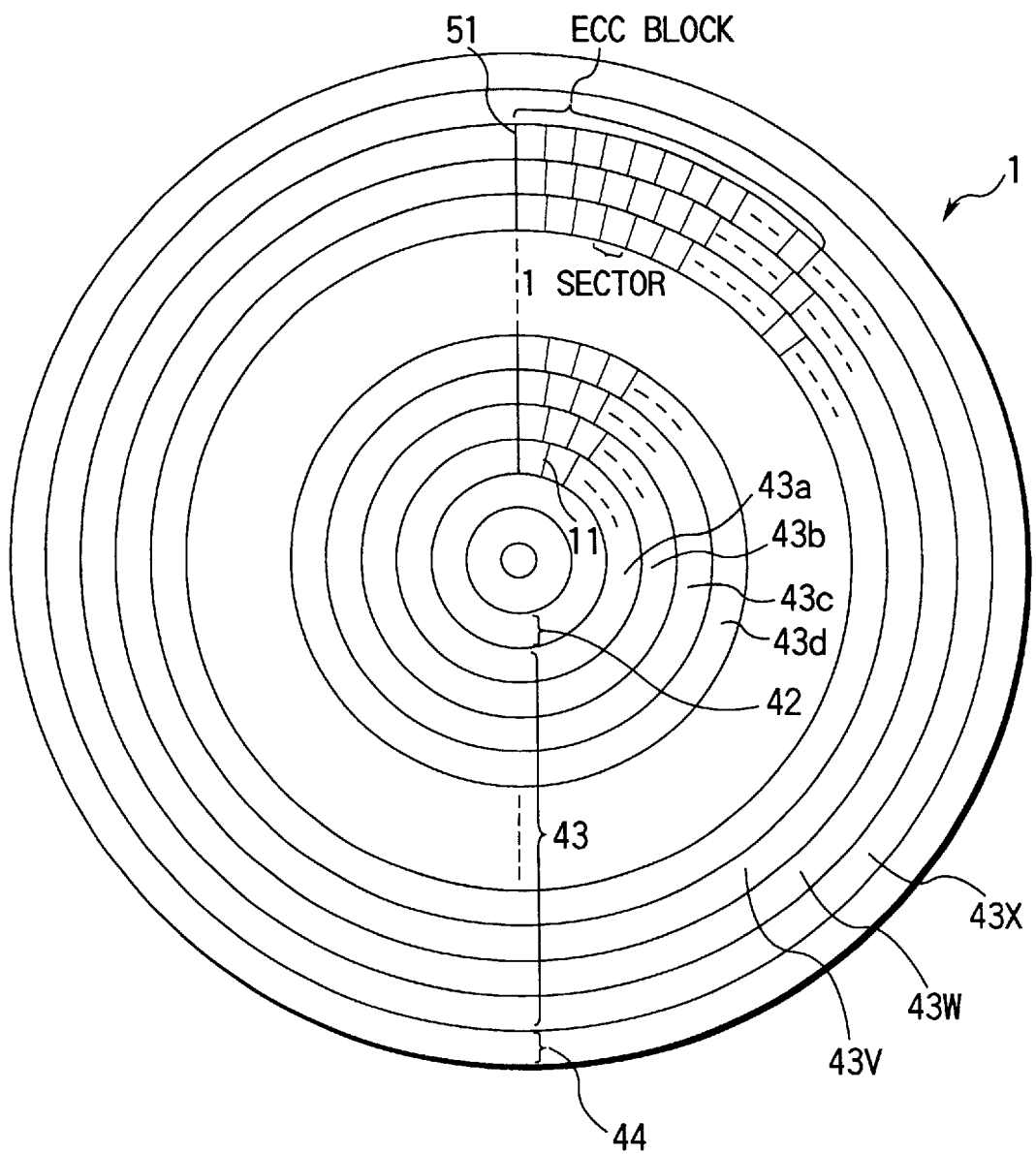
FIG. 6 is a plan view showing a schematic structure of an optical disk.
Figure 7:
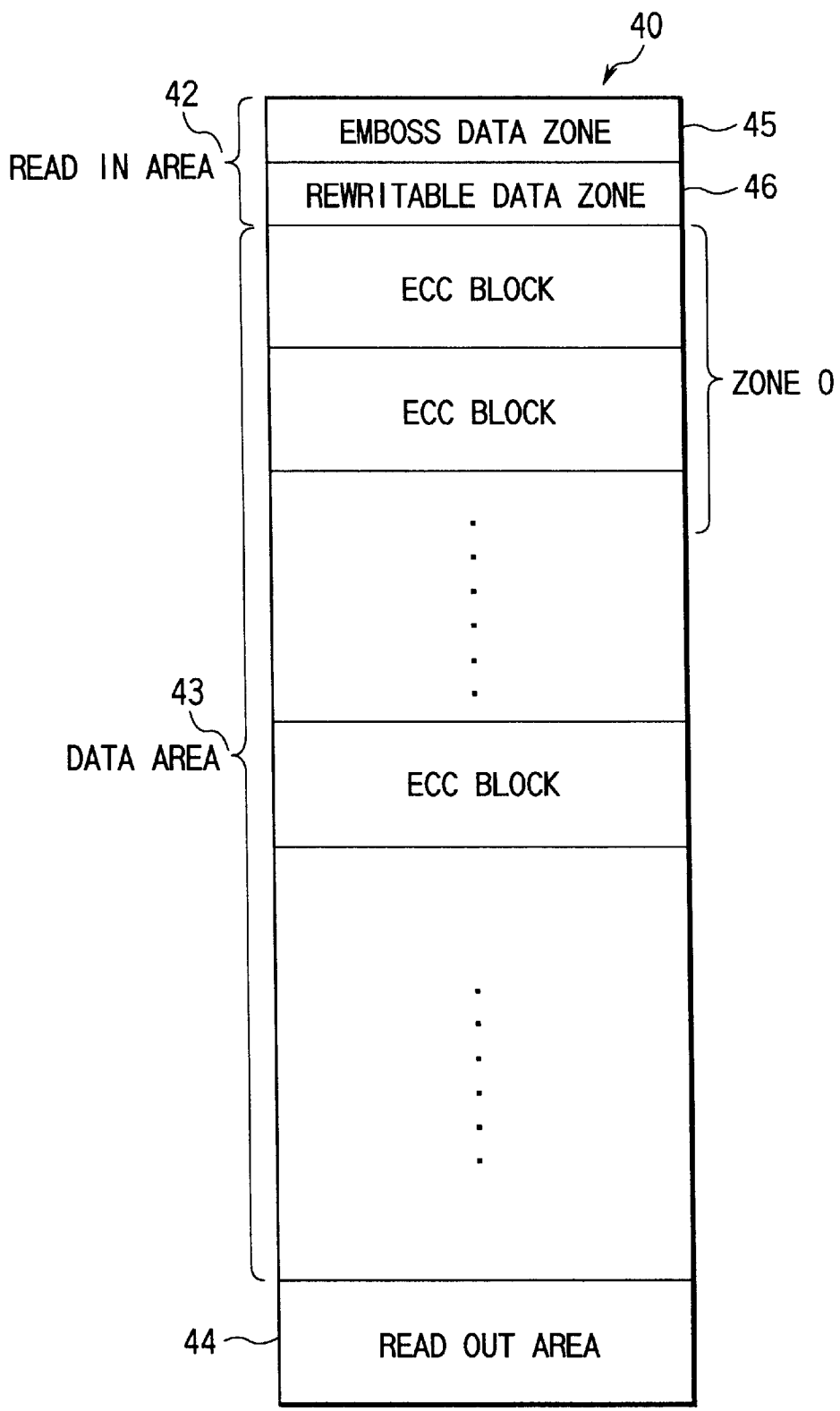
FIG. 7 is a representation showing a schematic structure of an optical disk.

In tracks in the zones 43a, . . . 43x of the data area 43, as shown in FIGS. 6 and 7, data are recorded in each ECC (error correction code) block data unit (for example 38688 bytes) as a data recording unit.

Figure 10:
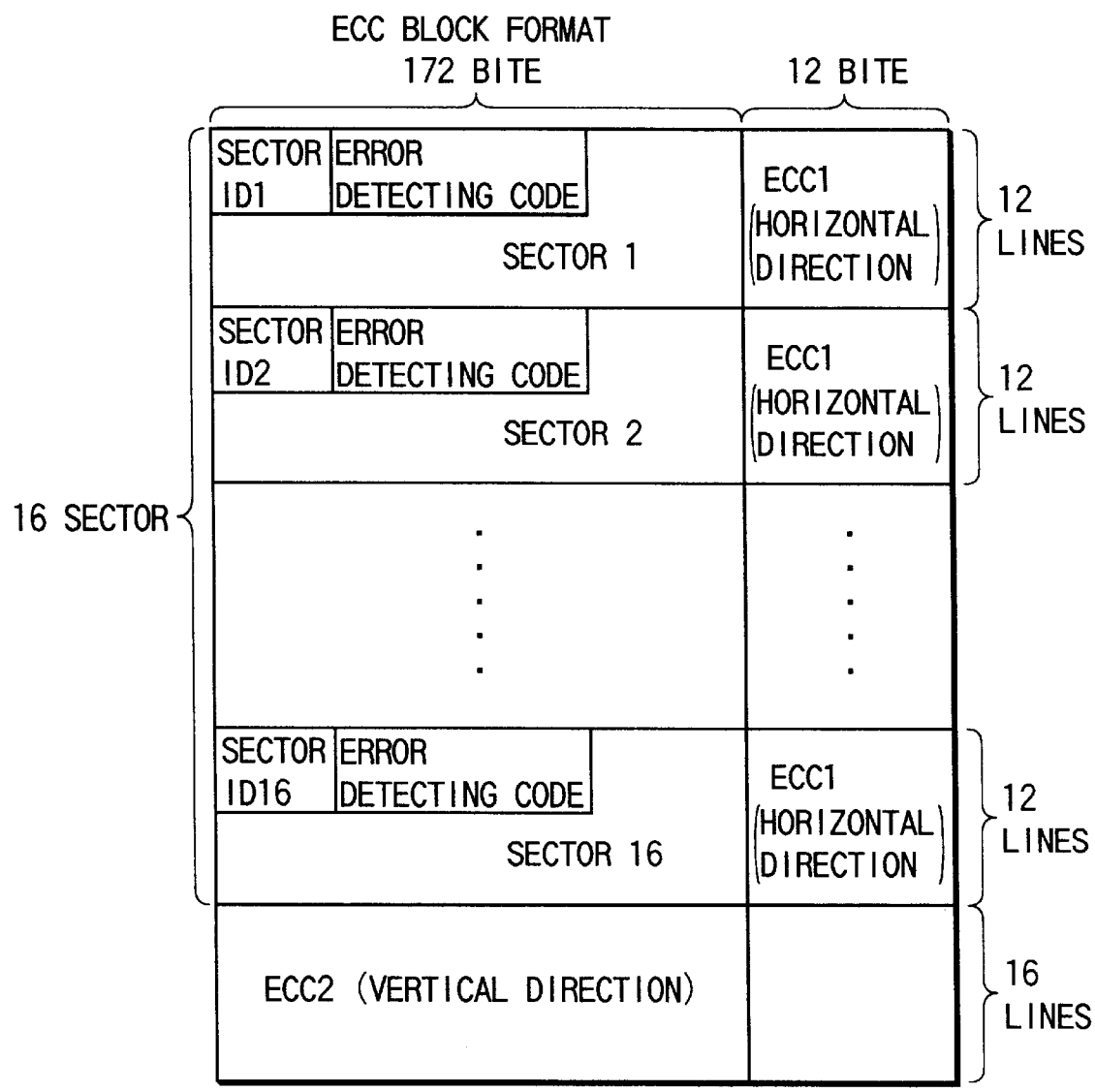
FIG. 10 is a representation for explaining the structure of an ECC block of an optical disk.

An ECC block comprises 16 sectors in which data are recorded to 2K bytes and, as shown in FIG. 10, sector ID (identification data) 1 of 1 to ID 16 comprising 4 bytes (32 bits) as an address data in each sector are respectively attached to main data (sector data) together with an error detection code (IED: ID error detection code) comprising 2 bytes and there are recorded ECC (error correction code) 1 in a lateral direction and ECC 2 in a longitudinal direction as an error correction code for reproduction of data recorded in the ECC block. The ECCs 1, 2 are error correction codes which are attached to data as redundancy codes that prevent failures in data reproduction due to a defect of an optical disk 40.

Sectors each are constructed from 172 bytes, which is data in 12 lines and each line is provided not only with ECC 1 comprising 10 bytes in a lateral direction but with ECC 2 in a longitudinal direction comprising 182 bytes in one line. Thus an error correction circuit 92 is to perform not only error correction for each line by use of the ECC 1 in a lateral direction but error correction for each column by use of the ECC 2 in a longitudinal direction.

Figure 11:
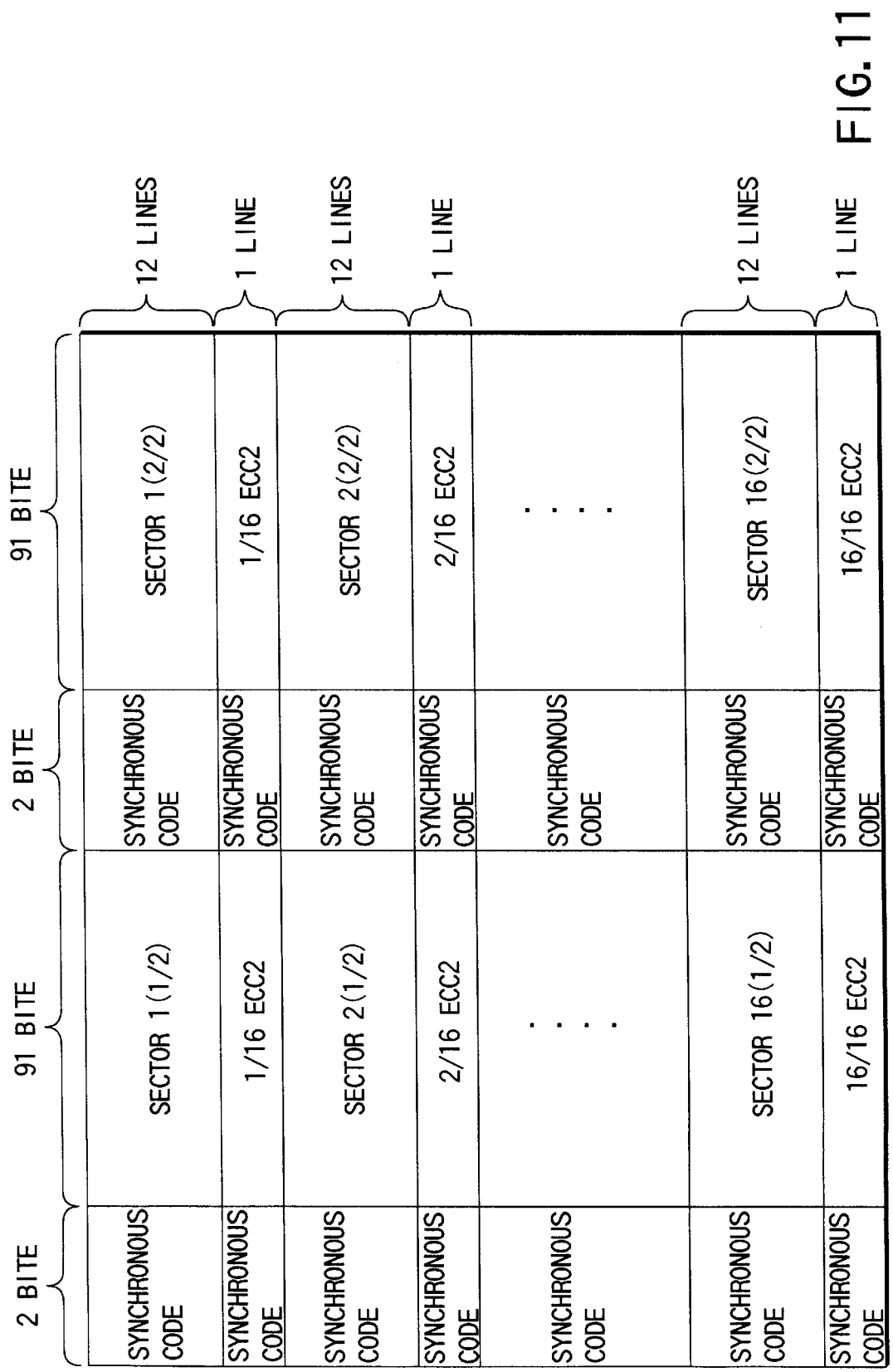
FIG. 11 is a representation for explaining the structure of an ECC block of an optical disk.

When an ECC block as described above is recorded on the optical disk 40, as shown in FIG. 11, a synchronous code (2 bytes: 32 channel bits) is attached to a predetermined data quantity in each sector (for example, at each predetermined data length interval of 91 bytes: 1456 channel bits) in order to establish synchronization in bytes in data reproducing.

Figure 12:
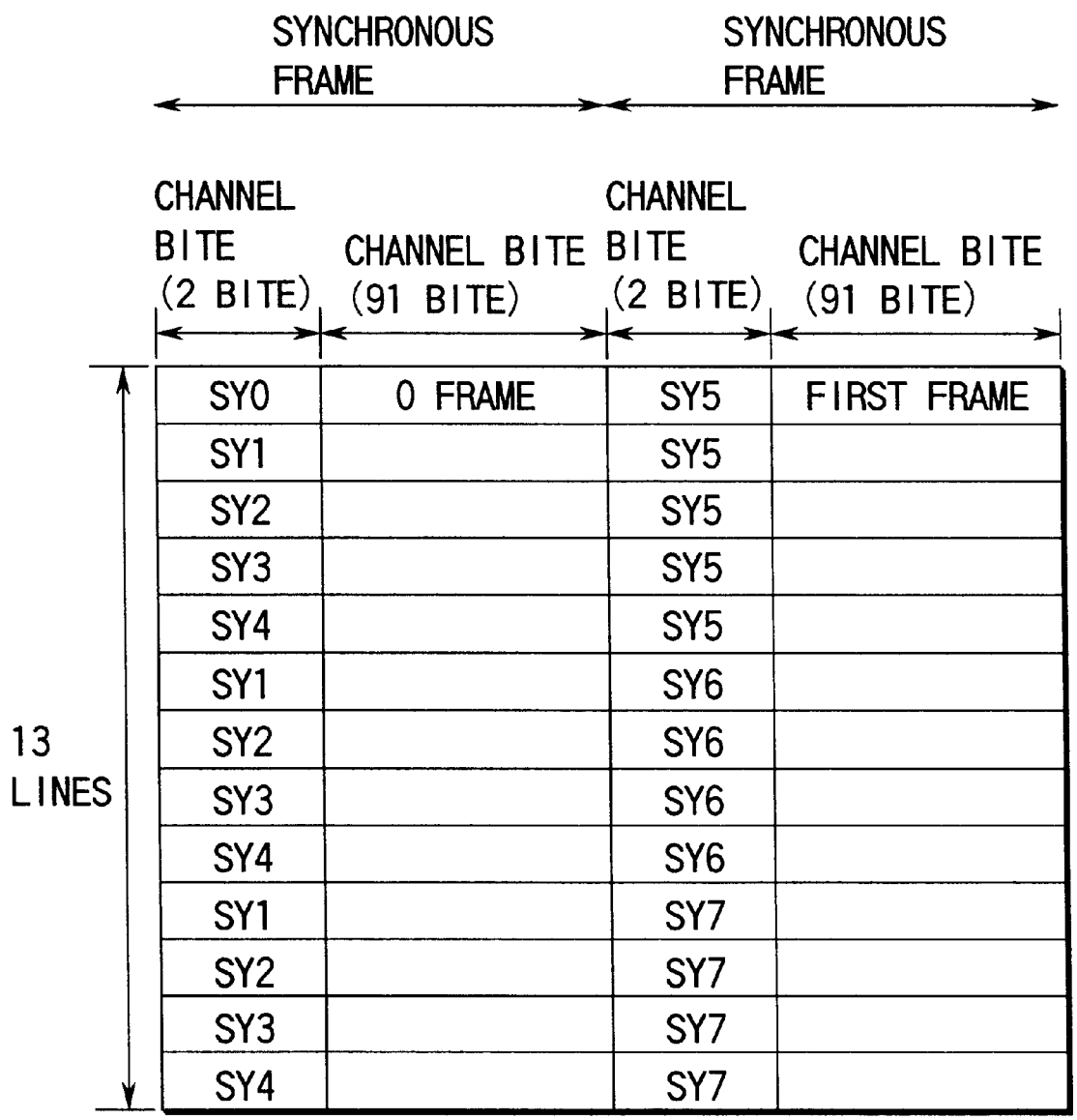
FIG. 12 is a representation for explaining the structure of each sector of an ECC block.

Each sector is constructed, as shown in FIG. 12, from 26 frames consisting of a first frame through a twenty-fifth frame and a synchronous code (frame synchronous signal) conferred to each frame is constructed from a specified code (1 byte: 16 channel bits) for specifying a frame number and a common code (1 byte: 16 channel bits) used in common with the other frames.

That is, as shown in FIG. 12, the 0 frame comprises SY0, the 2nd, 10th and 18th frames comprise SY1; the 4th, 12th and 20th frames comprise SY2, the 6th, 14th and 22nd frames comprise SY3, the 8th, 16th and 24th frames comprise SY4, the 1st, 3rd, 5th, 7th and 9th frames comprise SY5, the 11th, 13th, 15th and 17th frames comprise SY6 and the 19th, 21st, 23rd and 25th frames comprise SY7.

On tracks of the zones 43a, . . . 43x in the data area 43, as shown in FIG. 6, header sections 51, . . . in which addresses and the like are recorded are respectively preformatted in sectors in advance.

Figure 13:
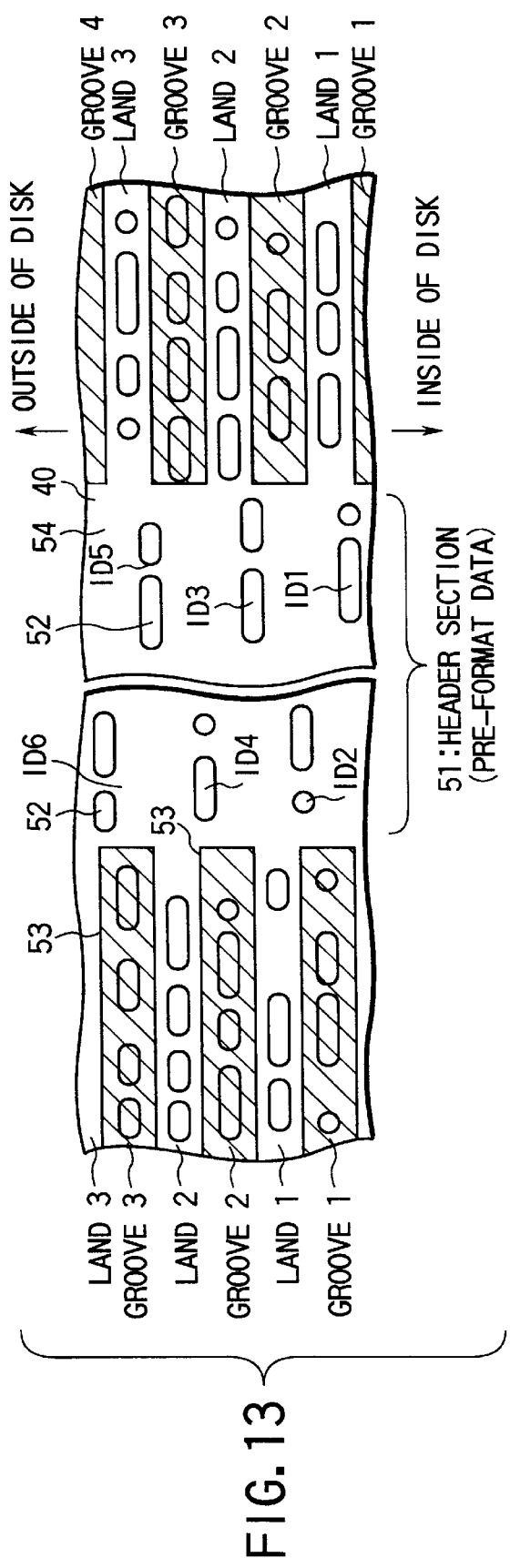
FIG. 13 is a representation for explaining a preformat data in a header section of an optical disk.
Figure 14:
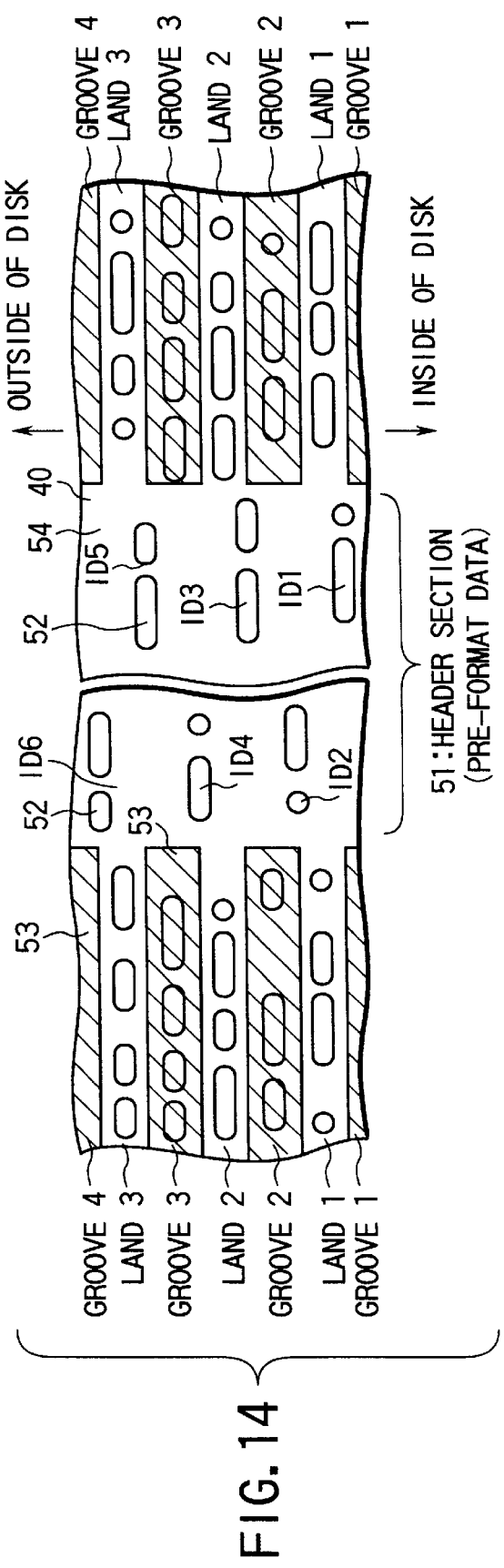
FIG. 14 is a representation for explaining a preformat data in a header section of an optical disk.

The header section 51 is formed when a groove is formed. The header section 51 is provided with a plurality of pits 52 formed, as shown in FIGS. 13 and 14, and they are preformatted as shown in the figures for a groove 53, so that the center of the pit 52 is located at a position on the same line as a boundary line between the groove 53 and a land 54. FIG. 13 shows the header section 51 conferred to the first sector of each track and FIG. 14 shows the header section 51 conferred to a sector at a position between the first and end sectors.

As shown in FIGS. 13 and 14, a pit row ID 1 is the header section of land 1, a pit row ID 2 is the header section of groove 2, a pit row ID 3 is the header section of land 2, a pit row ID 4 is the header section of groove 3, a pit row ID 5 is the header section of land 3 and a pit row ID 6 is the header section of groove 4.

Therefore, the header sections for grooves and the header sections for lands are disposed right and left alternately in a zig-zag shifted manner.

Figure 15:
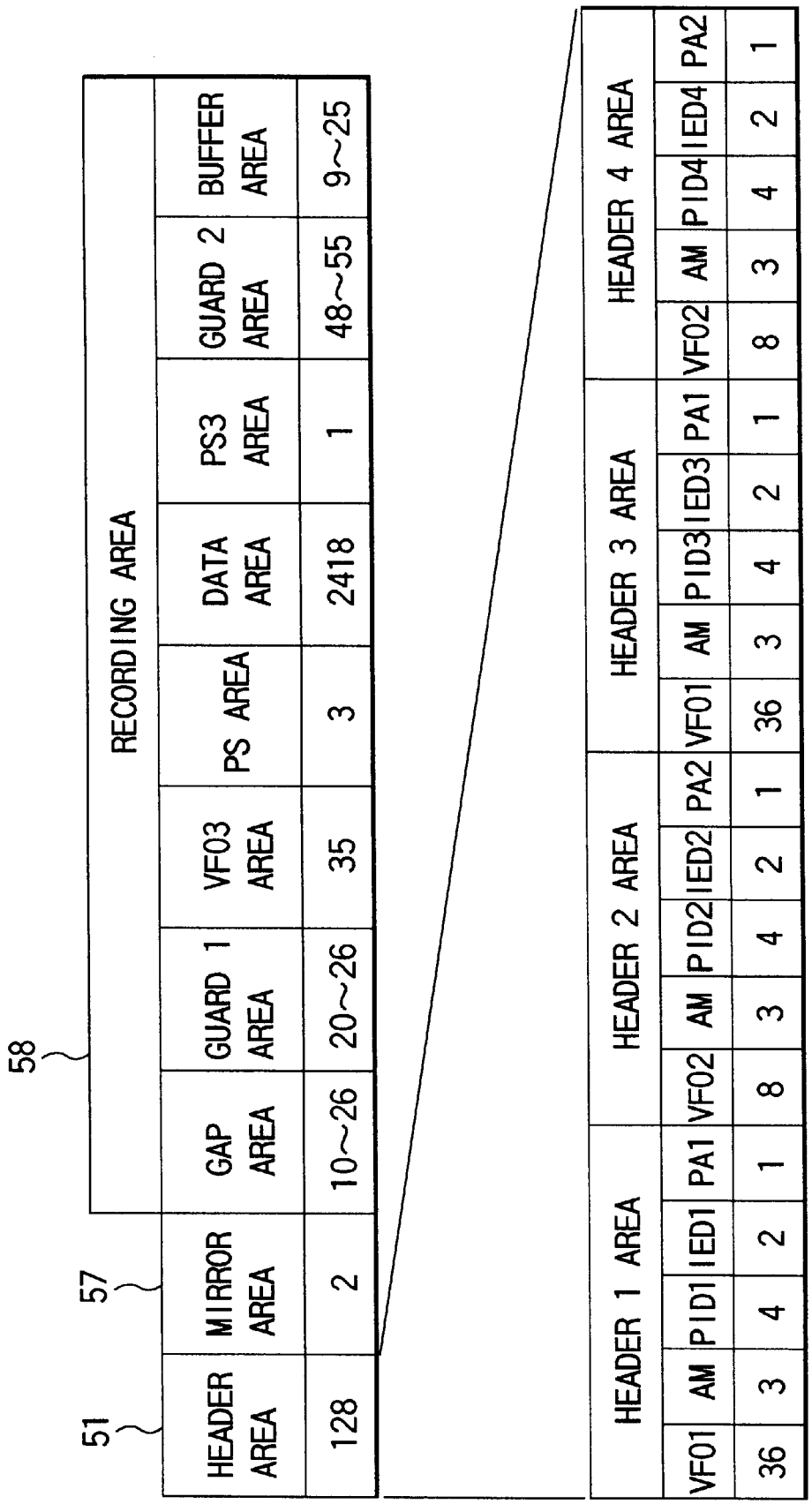
FIG. 15 is a representation for explaining a sector format of an ECC block.

A format for each sector is shown in FIG. 15.

One sector comprises 2697 bytes in FIG. 15 and is constructed from a header area 51 (corresponding to the header section 51) of 128 bytes, a mirror area 57 of 2 bytes and a recording area 58 of 2567 bytes.

Channel bits recorded in the sectors are in the form subjected to 8–16 code conversion in which an original 8 bit data is converted to 16 in channel bit.

The header area 51 is an area where a predetermined data is recorded when an optical disk 40 is manufactured. The header area 51 is constructed from 4 header areas, that is from header 1 area, header 2 area, header 3 area and header 4 area.

The header 1 area through the header 4 area comprise 46 bytes or 18 bytes and each constructed from a synchronous code VFO (Variable Frequency Oscillator) of 36 bytes or 8 bytes, an address mark AM (address Mark) of 3 bytes, an address section PID (Position Identifier) of 4 bytes, an error detecting code IED (ID Error Detecting code) of 2 bytes and a postamble PA (Postambles) of 1 byte.

The header 1 area and the header 3 area each have a synchronous code section VFO 1 of 36 bytes, and the header 2 area and the header 4 area each have a synchronous code section VFO 2 of 8 bytes.

The synchronous code section VFO 1, 2 are areas for enabling PLL to function in a proper manner and of "010" in channel bit equivalent to "36" bytes (corresponding to 576 channel bits), wherein a pattern in a predetermined interval is recorded, and the synchronous code section VFO 2 records a series of "010" equivalent to "8 bytes" (corresponding to 128 bits in channel bits).

The address mark AM is a synchronous code of 3 bytes which indicates where a sector address gets started. A pattern of each byte of the address mark AM uses a special pattern of "0100100000000100" which does not appear in a data.

The address sections PID 1 to PID 4 are areas where sector addresses (including an ID number) are recorded as address information of 4 bytes. A sector address is a physical sector number represented as a physical address showing a physical location on a track and the physical sector number is recorded in a mastering process, whereby the address cannot be rewritten.

The ID number is, for example "1" in the case of PID 1 and identifies the number of times a header section has been overwritten after starting the quadruple overwrites in a header 51.

The error detection code IED is an error detection code for a sector address (including an ID number) and can detect whether or not an error is present in a PID which is read.

The postamble PA includes state information necessary for demodulation and plays a role in adjusting polarity so that a header section 51 is finished in a space.

The mirror area 57 is utilized for offset correction of a tracking error signal and timing generation for a land/groove conversion.

The recording area 58 is constructed from a gap area of 10 to 26 bytes, guard 1 area of 20 to 26 bytes, VOF 3 area of 35 bytes, pre-synchronous code (PS) area of 3 bytes, data area of 2418 bytes, postamble 3 area (PA 3) of 1 byte, guard 2 area of 48 to 55 bytes and buffer area of 9 to 25 bytes.

The gap area is an area where no write is conducted.

The guard 1 area is an area provided in order that a terminal degradation in repetition of recording which is peculiar to a phase-change recording medium does not affect the VOF area.

The VOF 3 area is provided for PLL lock as well but synchronization is exercised at a byte boundary by inserting a synchronous code between the same patterns.

The PS (pre-synchronous code) area is an area provided for synchronization to attain a smooth shift to a data area.

The data area is constructed from a data ID, a data ID error correction code IED (Data ID Error Detection Code), a synchronous code, an ECC (Error Correction Code), EDC (Error Detection Code) and user data and the like. The data ID is sectors ID 1 to ID 16 of 4 bytes (32 channel bits) for sectors. The data ID error correction code IDE is an error correction code comprising 2 bytes (16 bits) for the data ID.

The sector ID (1 to 16) is constructed from sector information of 1 byte (8 bits) and a sector number (a logical sector number as a logical address indicating a logical position on a track) of 3 bytes. The sector information is constructed from a sector format type area of 1 bit, a tracking method area of 1 bit, a reflectance area of 1 bit, a reserve area of 1 bit, an area type area of 2 bits, a data type area of 1 bit and a layer number area of 1 bit.

The logical sector number is different from a physical number when a slipping replacement algorithm due to an initial defect is performed.

The PA (postamble) 3 area includes data necessary for demodulation and is an area showing a termination of the last byte of the preceding area.

The guard 2 area is an area provided in order that a terminal degradation in repetition of recording which is peculiar to a phase-change recording medium does not affect the data area.

The buffer area is an area provided to absorb fluctuations in rotation of a motor rotating the optical disk 40 so that a data area is not superposed on a next header area 51.

The reason why the gap area is expressed by 10+J/16 bytes is that a random shift is conducted. The random shift displaces a starting position for writing in order to alleviate degradation resulting from repetition of recording on a phase-change recording medium. A length of a random shift is adjusted by a length of a buffer area located at the end of the data area and a length of the whole of one sector is a constant value of 2697 bytes.

In each of the zones 43a, . . . 43x of the data area 43, a spare sector, as described above, is provided and utilized as a final spare when a slipping replacement algorithm in a sector unit is performed in the same zone.

The master disk has the same structure as the optical disk 40.

Next described will be an optical disk system 60 using the optical disk 40.

Figure 16:
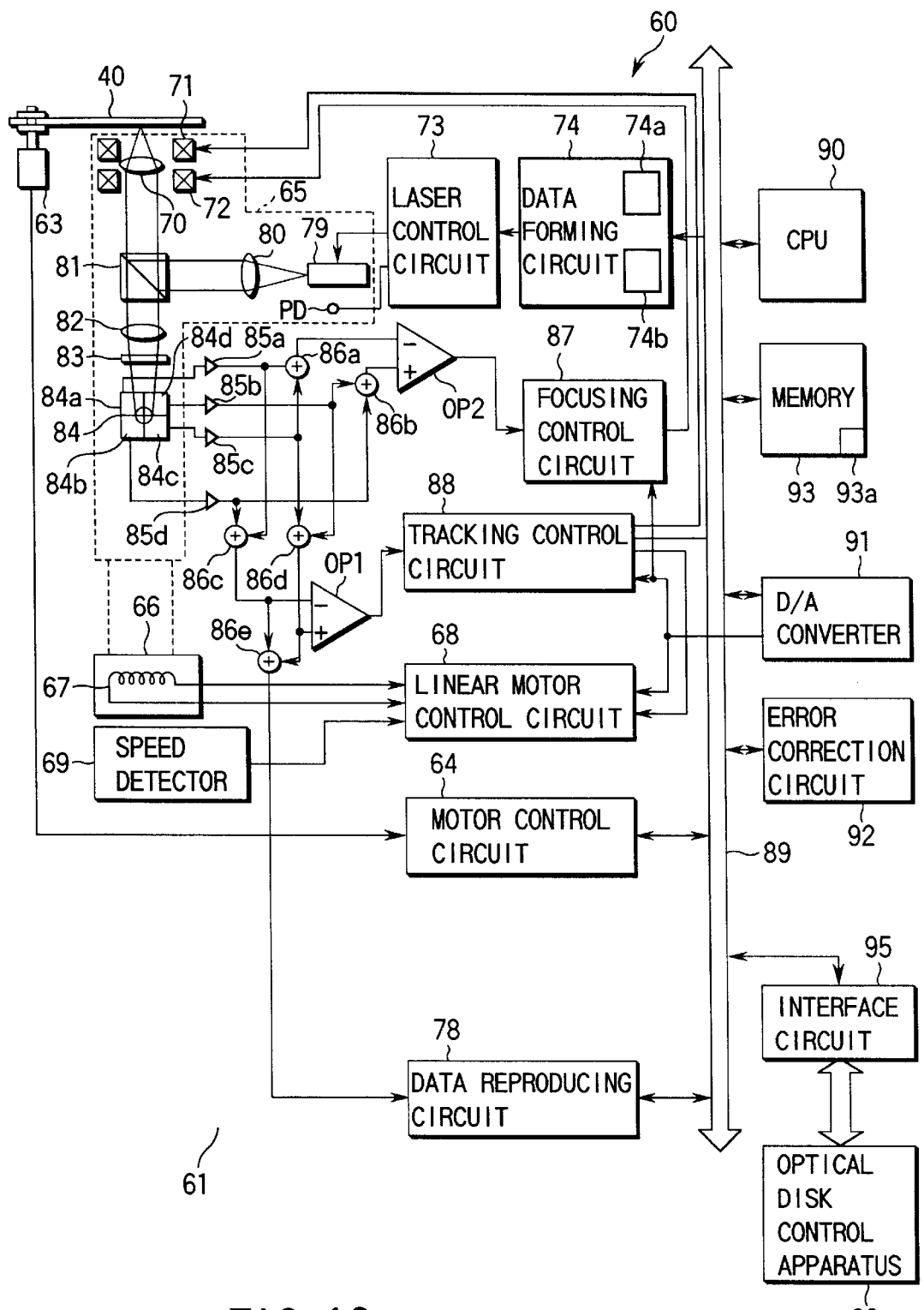
FIG. 16 is a block diagram showing a schematic structure of an optical system.

The optical disk system 60 shown in FIG. 16 comprises: the optical disk apparatus 61 in which data (information) is recorded on an optical disk (DVD-RAM) 40 as a recording medium by use of converged light rays and data recorded on the optical disk 40 is reproduced and an optical disk control apparatus 62 is an external apparatus which gives instructions on recording and reproducing to the optical disk 61.

In FIG. 16, the optical disk 40 is rotated, for example, at a different rotation number in a different zone by a motor 63. The motor 63 is controlled by a motor control circuit 64.

Data recording on the optical disk 40 and reproducing recorded data on the optical disk 40 are conducted by an optical head 65. The optical head 65 is fixedly mounted to a driving coil 67 constituting a moving part of a linear motor 66 and the driving coil 67 is connected to a linear motor control circuit 68.

A speed detector 69 is connected to the linear motor control circuit 68 and a speed signal of the optical head 65 is transmitted to the linear motor control circuit 68.

A stationary section of the linear motor 66 is provided with a permanent magnet not shown and the driving coil 67 is excited by the linear motor control circuit 68, whereby the optical head 65 is moved along a radial direction of the optical disk 40.

An objective lens 70 is supported on the optical head 65 with a wire or a leaf spring not shown and the objective lens 70 can be moved along a focusing direction (an optical axis direction of the lens) by the driving coil 71 and can also be moved along a tracking direction (a direction intersecting an optical axis of the lens at a right angle) by driving of a driving coil 72.

A semiconductor laser oscillator 79 is driven by a laser control circuit 73 and laser light is generated. The control circuit 73 corrects a quantity of laser light from the semiconductor laser oscillator 79 based on a monitor current from a photodiode PD for monitoring the semiconductor laser oscillator 79.

The laser control circuit 73 is operated in synchronization with a clock signal for recording from a PLL circuit not shown. The PLL circuit divides a master clock signal generated by an oscillator (not shown) to thereby generate a recording clock signal.

Laser light generated from the semiconductor laser oscillator 79 driven by the laser control circuit 73 is guided through a collimator lens 80, a half prism 81 and an objective lens 70 and finally directed on the optical disk 40 and reflecting light from the optical disk 40 is guided through an objective lens 70, a half prism 81, a collective lens 82 and a cylindrical lens 83 then to a photodetector 84.

The photodetector 84 is constructed from light detecting cells 84a, 84b, 84c and 84d, wherein the photodetector 24 is divided in four ways.

Output signals from the light detecting cells 84a, 84b, 84c, 84d are respectively supplied through amplifiers 85a, 85b, 85c, 85d to a terminal of an adder 86a, a terminal of an adder 86b, the other terminal of the adder 86a and the other terminal of the adder 86b.

Output signals from the light detecting cells 84a, 84b, 84c, 84d constituting the photodetector 84 are respectively supplied through amplifiers 85a, 85b, 85c, 85d to a terminal of an adder 86c, a terminal of an adder 86d, the other terminal of the adder 86d and the other terminal of the adder 86c.

An output signal of the adder 86a is supplied to the inversion input terminal of a differential amplifier OP2 and an output signal of the adder 86b is supplied to the non-inversion input terminal of the differential amplifier OP2. Thereby, the differential amplifier OP2 supplies a signal relating to a focal point (a focus error signal) based on a difference between output signals of the adders 86a, 86b to a focusing control circuit 87. An output signal of the focusing control circuit 87 is supplied to a focusing driving coil 71 and thereby, the laser light is controlled on the optical disk to be always in a just focusing condition.

An output signal of the adder 86c is supplied to the inversion input terminal of a differential amplifier OP1 and an output signal of the adder 86d is supplied to the non-inversion terminal of the differential amplifier OP1. Thereby, the differential amplifier OP1 supplies a tracking error signal to a tracking control circuit 88 based on a difference between the output signals of the adders 86c, 86d. The tracking control circuit 88 generates a track driving signal based on the tracking error signal supplied from the differential amplifier OP1.

The track driving signal output from the tracking control circuit 88 is supplied to the driving coil 72 in the tracking direction. Moreover, the tracking error signal used in the tracking control circuit 88 is supplied to the linear motor control circuit 68.

In the situation where focusing and tracking are conducted as described above, a change in a reflectance on a pit (recorded data) formed on a track is reflected on a sum signal of outputs of the light detecting cells 86a to 86d of the photodetector 84, that is a signal which is the sum of output signals of the adders 86c, 86d obtained in the adder 86e. The sum signal is supplied to the data reproducing circuit 78, which reproduces a recorded data.

A reproduced data in the data reproducing circuit 78 is output to the optical disk control apparatus 62 as an external apparatus through an interface circuit 95 after error correction is conducted on the reproduced data in an error correction circuit 92 by use of an error correction code ECC attached thereto.

While the objective lens 70 is moved by the tracking control circuit 88, the linear motor control circuit 68 moves the linear motor 66, that is the optical head 65, so that the objective lens 70 is positioned in the vicinity of the center of the optical head 65.

The data forming circuit 74 is provided in the preceding stage of the laser control circuit 73. The data forming circuit 74 comprises: an ECC block data forming circuit 74a in which a format data of an ECC block as a recorded data, as shown in FIG. 10, supplied from the error correction circuit 92 is converted to a format data of an ECC block for recording attached with a synchronous code for the ECC block, as shown in FIG. 11; and the modulation circuit 74*b* in which the recorded data from the ECC block data forming circuit 74*a* is modulated by an 8 to 16 code conversion method.

The data forming circuit 74 is supplied with a recorded data to which an error correction code is attached by the error correction circuit 92 and a dummy data for error check read out from a memory 10. The error correction circuit 92 is supplied with a recorded data from the optical disk control apparatus 62 as an external apparatus through the interface circuit 95 and the bus 89.

In the error correction circuit 92, the recorded data of 32 Kbytes supplied from the optical disk control apparatus 62 is attached not only with error correction codes (ECC 1, ECC 2) of 2 Kbytes in lateral and longitudinal directions for recorded data in a sector unit but with a sector ID (logical address number) to form a format data of the ECC block as shown in FIG. 10.

The optical disk apparatus 61 is equipped with a D/A converter 91 which is used for exchange of information between a CPU 90 which controls the whole system of the optical disk apparatus and other circuits which are the focusing control circuit 87, the tracking control circuit 88, the linear motor control circuit 68.

The CPU 90 controls the motor control circuit 64, the linear motor control circuit 68, the laser control circuit 73, the data reproducing circuit 78, the focusing control circuit 87, the tracking control circuit 88, the error correction circuit 92 and the like through the bus 89 and the CPU 93 works in accordance with a control program stored in a memory 93 so as to perform a predetermined operation.

The memory 93 has a stored control program and is used for data recording. The memory 93 has a table 93*a* in which recorded are a speed data as a rotation number and the number of sectors in one track for each of the zones 43*a*, . . . 43*x*, 44, 45, 46 and the like.

Figure 17:
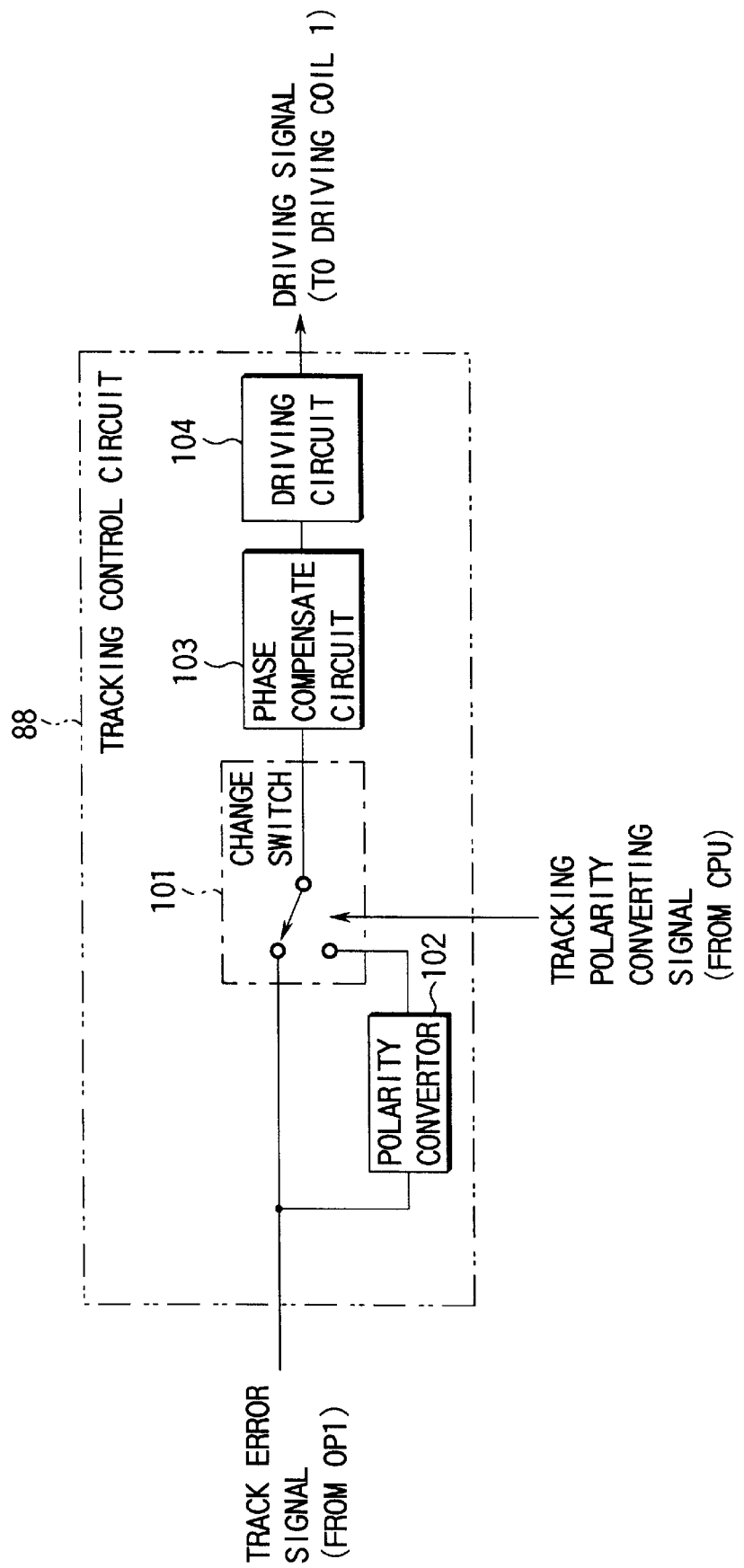
FIG. 17 is a block diagram showing a schematic structure of a tracking control circuit.

The tracking control circuit 88 is constructed from a change switch 101, a polarity convertor 102, a phase compensate circuit 103 and a driving circuit 104 as shown in FIG. 17.

The change switch 101 is operated by a tracking polarity converting signal (land/groove converting signal) from the CPU 90 and when a polarity of a tracking polarity converting signal is of a groove, a track error signal from the differential amplifier OP1 is output to the phase compensate circuit 103 and when a polarity of a tracking polarity converting signal is of a land, a track error signal whose polarity is converted by the polarity convertor 102 is output to the phase compensate circuit 103.

The polarity convertor 102 is to convert a polarity of a track error signal supplied from the differential amplifier OP1 to a reverse phase and an output thereof is supplied to the change switch 101.

The phase compensate circuit 103 compensates a phase of a track error signal of a positive polarity (positive phase) supplied from the change switch 101 or a track error signal of a reverse polarity (reverse phase) and outputs the track error signal compensated in its phase to the driving circuit 104.

The driving circuit 104 drives the driving coil 71 based on a track driving signal from the phase compensate circuit 103 and the objective lens 70 is thereby moved along a tracking direction.

Figure 18:
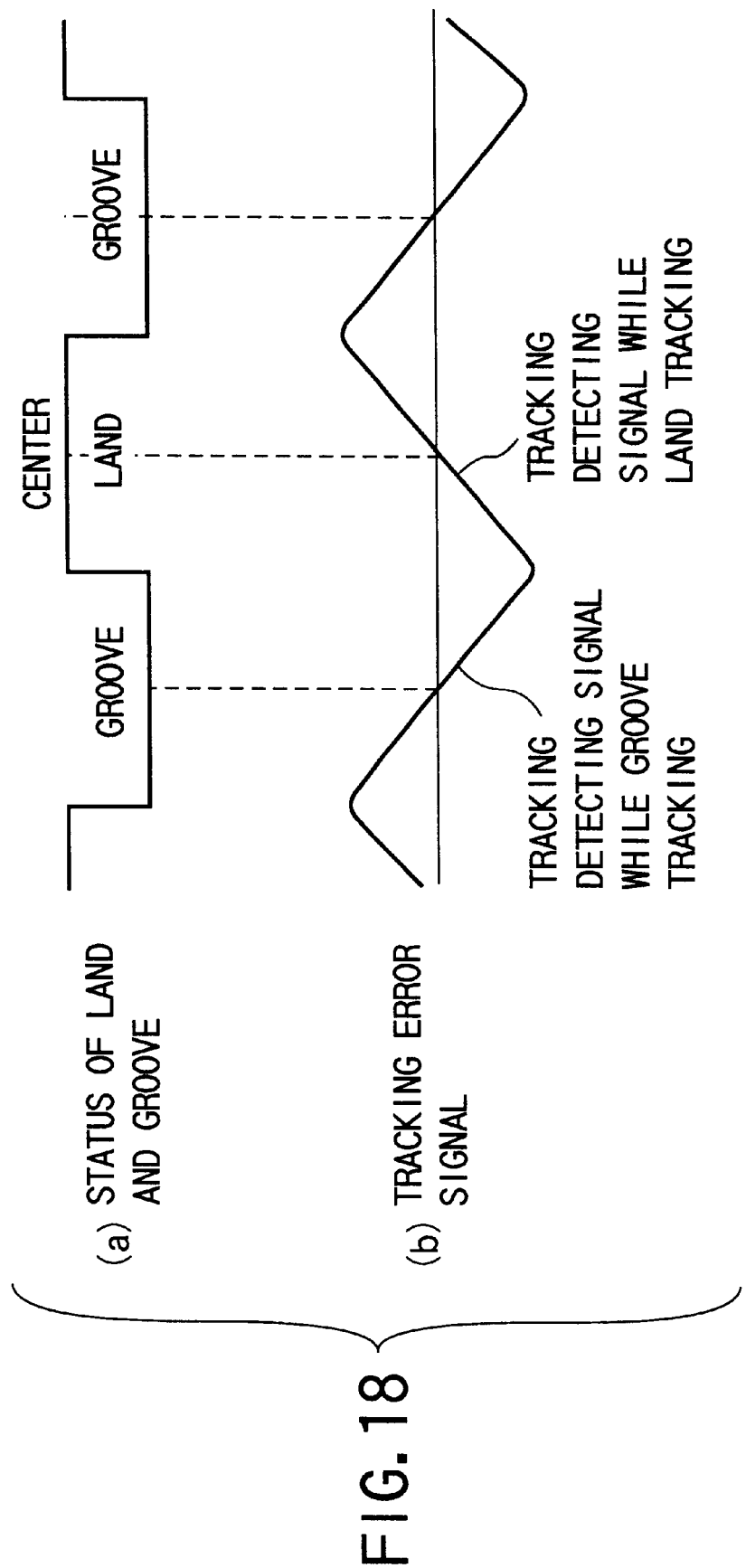
FIG. 18 is a diagram for explaining a signal waveform in a main section of a tracking control circuit.

A track error signal changes with displacement of a position of laser light in relation to a groove and a land, as shown in FIGS. 18(*a*), 18(*b*). That is, when the laser light is located in the center between a groove and a land, a track signal indicates 0 and as the laser light moves away from the center, the difference grows larger.

Next described will be the mechanism of the optical disk apparatus 61 for realization of a zoned CLV format.

The optical head 65 mounted on the optical disk apparatus 61 has a home position and is controlled so as not to fail to assume this home position when power is applied. The home position is designed so that the optical head may assume a position in a radial direction mechanically and the CPU 90 knows how many zones there are before the home position including the zone where the optical head is to be located and adjusts a rotation number of the optical disk. At this position, a position of the header section, that is an address thereof, is confirmed (read a sector address of the current position). When a seek of a sector needs to be conducted, a distance is calculated from an address of the sector to which a seek is conducted and a current address and the linear motor 67 as a coarse adjustment mechanism of the optical head 65 is driven. A rotation number of the optical disk 40 is obtained from the address number of a sector to which a seek is conducted by referring to the table 93*a* to find a zone number and a rotation number and the motor control circuit 64 is controlled so that the motor 63 shows the rotation number.

Thereafter, when the optical head 65 is moved by the linear motor 67, a position after the movement is confirmed by read on the header section 51. Calculation is conducted to obtain a difference between the moved position and the position of a target sector to which a seek is conducted and a track jump corresponding to the difference is conducted to move to the target sector by use of the tracking control circuit 88.

Next, described will be processing in which an animation is recorded between zones of an optical disk 40 in a bridging manner in such a way as described above.

Described will be, for example, processing when recording (write) from a predetermined ECC block (zone 0) is conducted.

An instruction of recording (write) from a predetermined ECC block (zone 0) in the data area 43 of the optical disk 40 and recording data are supplied into the optical disk apparatus 61 through the interface circuit 95 from the optical disk control apparatus 62. Thereby, the instruction of data recording from the predetermined ECC block is supplied to the CPU 90 and the recording data is stored in the memory 93.

Thereby, the CPU 90 judges a record from the first sector of the ECC block and not only an address consisting of a track number and a sector number corresponding to the first sector but a rotation number (39.78 Hz) corresponding to zone 0 in which the first sector is included based on the content of a storage of the table 93*a*.

According to the judgment, the CPU 90 rotates the optical disk 40 at a rotation number (39.87) corresponding to zone 0 in which the ECC block to be recorded is included and an illuminating position of the laser light from the optical head 65 is moved to a position corresponding to the address.

After this access processing is conducted, the CPU 90 produces a recording data for a first ECC block by newly attaching a correction code from the recording data supplied and the new recording data is recorded on the optical disk 1.

Thereafter, recording of data supplied from the optical disk control circuit 62 to ECC blocks continuously disposed in the same zone is conducted.

After data recording to the end ECC block in the user area of zone 0 is over, the CPU 90 judges shifting to zone 1, reads out a new rotation number corresponding to zone 1 (37.57 Hz) from the table 93a of the memory 93 and changes a rotation number of the optical disk 40 to the new rotation number. The laser light from the optical head 65 traces tracks in a guard area (on the outer side) of zone 0 and a guard area (on the inner side) of zone 1 until a rotation number is changed and the new rotation number is stabilized. For this reason, fluctuations in rotation number can be absorbed.

As a result of the above process, data recording is successively conducted on each of the first ECC blocks and the following ECC blocks in the user area of zone 1.

When data is recorded in a bridging manner over zones, a transmission rate can be secured at a constant value throughout the entire surface of an optical disk according to a relation between a rotation number and the number of sectors in one track of the optical disk 40, as described above.

Described next will be the process of reproducing an animation recorded over zones of the optical disk 40.

For example, now described will be the process of reproducing (read) from a predetermined ECC block (zone 0).

An instruction on reproducing (read) data from a predetermined ECC block in the data area 43 of the optical disk 40 is supplied to the CPU 90 in the optical disk apparatus 61 through the interface circuit 95 from the optical disk control apparatus 62. Based on the instruction, the CPU 90 judges reproducing from the first sector in the ECC block and judges a rotation number (39.78 Hz) corresponding to zone 0 in which the first sector is included together with an address consisting of a track number and a sector number corresponding to the first sector based on a storage content in the table 93a of the memory 93.

According to the judgment, the CPU 90 conducts an access processing such that the CPU 90 rotates the optical disk 40 at a rotation number (39.78 Hz) corresponding to zone 0 in which ECC blocks to be recorded are included and moves an illuminating position of the laser light from the optical head 65 to a position corresponding to the address.

After the access processing is over, the CPU 90 outputs data in each sector area included in an ECC block as a unit, which is demodulated by the demodulation circuit (not shown) in the data reproducing circuit 78, to the error correction circuit 92. Thereby, data of one ECC block is supplied to the error correction circuit 92 and error correction processing is conducted by use of ECC 1 and ECC 2.

When the correction by the error correction processing is judged to be finished in an orderly manner, the CPU 90 outputs reproduced data from the reproduced ECC block as a reproducing result to the optical control circuit 62 through the interface circuit 95.

Thereafter, reproduced data from consecutive ECC blocks in the same zone are outputs to the optical disk control circuit 62.

After reproduced data of the end ECC block in the user area of zone 0 is output to the optical disk control circuit 62, the CPU 90 judges shift to zone 1 and reads out a new rotation number (37.57 Hz) corresponding to zone 1 from the table 93a of the memory 93 to change a rotation number of the optical disk 40 to the new rotation number. The laser light of the optical head 65 traces a guard area (on the outer side) of zone 0 and a guard area (on the inner side) of zone 1 until a rotation number is changed and the new rotation number is stabilized. Therefore, fluctuations in rotation number can be absorbed.

As a result, reproduced data in the user area of zone 1 are successively output starting from the first ECC block to the following ECC blocks to the optical disk control circuit 62. When data are reproduced on consecutive zones in a bridging manner, a transmission rate of reproduced data can be kept unchanged without any slow down according to a relation between a rotation number of the optical disk 40 and the number of sectors in one track of the optical disk 40 and an animation can thus be reproduced without the need for any special circuits.

Therefore, a transmission rate can be kept almost constant all over the optical disk. That is, a constant user data bit rate can be secured across the entire surface of the optical disk, which enables serial data such as an animation to be recorded and reproduced.

An example, in which an emboss area is provided in order to store data especially required for reproducing such as control information or the like, which is another embodiment of the present invention, will be described in detail in reference to FIG. 19A and the following figures.

Figure 19A:
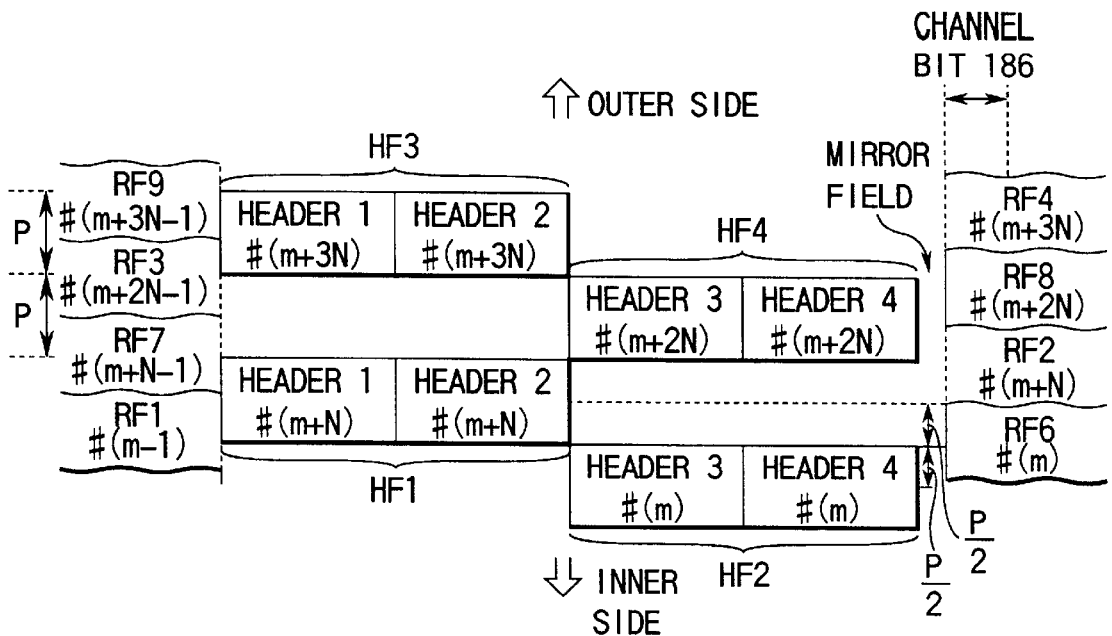
FIGS. 19A, 19B are representations, as a model, showing structures of a header section of a sector on a recording/reproducing optical disk pertaining to an embodiment of the invention of the present application.

In addition, described in detail will be an embodiment in which when recording is not conducted in a primary recording area in an orderly manner, the recording is conducted in a second recording area in the vicinity of the primary recording area in reference to FIG. 19A and the following figures.

Also described in detail will be an embodiment in reference to FIGS. 19A to 26B in which, with a configuration that the first half header section and the second half header are disposed in a zig-zag shifted manner with a space therebetween, 1) reliability in reading is increased because a margin in distance between adjacent pits is provided, 2) a narrow beam exclusively used for a header is not necessary any longer and thus cutting can be possible by one beam with a high speed and 3) a converting position between a land and a groove can be detected with ease.

The embodiments can be executed by applying the first embodiment of the present invention that a transmission rate is kept at a constant value by making a product of a rotation number and the number of sectors in one track as a constant value.

Figure 19B:
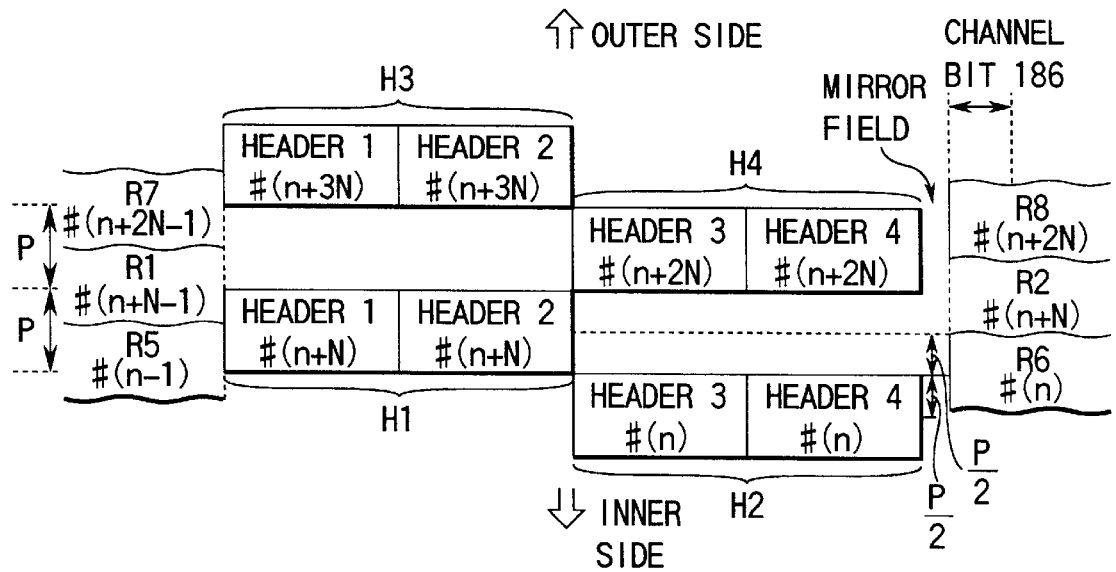

Structures of header sections in sectors of a recording/reproducing optical disk according to an embodiment of the invention of the present application are shown as models in FIGS. 19A, 19B. When a track is traced in a spiral manner on an optical disk whose header sections have structures shown in FIGS. 19A, 19B, a tracking polarity changes in a radial direction between any pair of adjacent tracks in such an order of land, groove, land, groove and so on without any track jump. The structures will be described below.

FIG. 19A shows header sections in sectors in converting conditions of a tracking polarity. A sector in a converting condition of a tracking polarity is hereinafter referred to as the first sector. FIG. 19B shows the structure of header sections in sectors other than the first sector. In a structure in which groove and land sectors are converted to each other between successive rounds, as described above, there is a need to convert a tracking polarity between groove and land sectors in tracking and sectors in a converting condition assume a different header configuration from the other sectors.

A header section shown by Header 1, Header 2, Header 3 and Header 4 is an area where a recess/protrusion profile called a "pit" is formed and predetermined address information on a sector is recorded by the recess/protrusion profile. Information recording areas indicated by RF1 to RF8 and R1 to R8 are areas made of, for example a recording film of a phase change type and hereinafter referred to as "a recording section." In the case of a phase change recording film, a difference in reflectance caused by a change in an optical property between a crystalline state and amorphous state of the recording film is utilized by a user for recording/reproducing of information. RF5 to RF8 and R5 to R8 in the recording section each indicate a recording section for a sector in which a guide groove is formed and hereinafter referred to as a recording section of a groove sector. On the other hand, RF1 to RF4 and R1 and R2 each indicate a recording section of a sector provided in a portion which is not a guide groove, and which is adjacent to a groove sector, and they are hereinafter referred to as a recording section of a land sector.

In FIGS. 19A and 19B, an arrow labeled OUTER SIDE points to the outer side of a disk and an arrow labeled INNER SIDE points to the inner side of the disk. Therefore, a direction of the upper to lower side or vice versa corresponds to a radial direction. Besides, # (m+N), # (n+N) and the like are sector numbers indicating sector addresses, wherein m and n indicate integers and N indicates the number of sectors along one round of a track, for example the number is a predetermined integer falling in the range of 17 to 40.

Description of FIG. 19A will be given in a more detailed manner. In FIG. 19A, shown is a first sector on 4 tracks having sector numbers # m, # (m+N), # (m+2N) and # (m+3N). A header section in the first sector is formed by cutting in a quadruple write structure. Portions of a quadruply written header section respectively correspond to Header 1, Header 2, Header 3 and Header 4. Header 1 and Header 2 each constitute a first half header section and Header 3 and Header 4 each constitute a second half header section. Among them, the first header section is used as a header section for a land sector and the second header section is used as a header section for a groove sector.

Further description of FIG. 19A will be continued in a concrete manner. For a recording section RF5 of a groove sector # (m) whose address is indicated by a sector number # (m), a second half header section HF2, which is provided at a head portion of the recording section RF5 with Mirror Field (hereinafter referred to as mirror section) being inserted therebetween, is used as a header section of the sector. In this case, the second half header section HF2 comprises Header 3 and Header 4 in which address information of the sector number # (m) is recorded. The second half header section HF2 is shifted by a half of a track pitch toward the inner side relatively to a position where the recording section RF5 of the groove sector # (m) is formed, that is the second half header section HF2 is parallel-translated sideways for displacement. The track pitch is a distance between centers of a land and a groove which are adjacent to each other, said distance being shown by a mark P in FIG. 19A.

For a recording section RF2 of a land sector # (m+N) whose address is indicated by a sector number # (m+N), a first half header section HF1, which is provided at a forward position of the recording section RF2 with not only a mirror section but in addition a space corresponding to the second half header section HF2 inserted therebetween, is used as a header section of the sector. In this case, the first half header section HF1 comprises Header 1 and Header 2, in which address information of the sector number # (m+N) is recorded. That is, the first half header section HF1 shows address information which is different from address information shown by the second half header section HF2 by one round of a track and to be more precise, the first half header section HF1 shows address information which is different from the second half header section HF2 by one round of a track toward the outer side. The first half header section HF1 is formed at a position which is shifted by a half of a track pitch toward the inner side relatively to a position where the recording section RF2 of the land sector # (m+N) is located.

In this case, the recording section RF2 of the land sector # (m+N) is formed in an adjacent manner to the recording section RF5 of the groove sector # (m). That is, the recording section RF2 of the land sector # (m+N) is formed at a position shifted toward the outer side relatively to the recording section RF5 of the groove sector # (m) by one track pitch. Thus, the first header section HF1 is formed at a position shifted toward the outer side relatively to the second header section HF2 by one track pitch. The first header section HF1 and the second header section HF2 are manufactured in a continuous manner by cutting described later and Header 2 in the first header section HF1 and Header 3 in the second header section HF2 are located in an adjacent manner. With such a configuration, the first header section HF1 and the second header section HF2 constitute a zig-zag shift header structure as a pair.

A recording section RF1 of a land sector # (m−1) whose address is indicated by a sector number one less than the sector number # (m) for the recording section RF5 in the groove sector # (m) is fabricated on the same track as the recording section RF5 of the groove sector # (m) with a space occupied by the first half header section HF1 interposing between the recording section RF1 and the head portion of the second half header section HF2 which is a header section of the group sector # (m), that is a Header 3 portion. In a similar manner, a recording section RF6 of a groove sector # (m+N−1) whose address is indicated by an address number one less than the sector number # (m+N) for the recording section RF2 in the land sector # (m+N) is fabricated on the same track as the recording section RF2 in the land sector # (m+N) in an adjacent manner to the head portion of the first half header section HF1 which is a header section of the land sector # (m+N), that is in an adjacent manner to a Header 1 portion.

In FIG. 19B, shown are sectors including three tracks of sector numbers of # n, # (n+N) and # (n+2N). A header section in the sector is formed in a similar manner to the case of the first sector by cutting described later in a quadruple write structure. Portions of a quadruply written header section are respectively called Header 1, Header 2, Header 3 and Header 4, and Header 1 and Header 2 constitute a first half header used as header sections of the land sectors and Header 3 and Header 4 constitute a second half header section used as header sections of the groove sectors.

Further description will be continued in a concrete manner. For a recording section R6 of a groove sector # (n) whose address is indicated by a sector number # (n), a second half header section H2, which is provided at a head portion of the recording section R6 with a mirror section being inserted therebetween, is used as a header section of the sector. In this case, the second half header section H2 comprises Header 3 and Header 4 in which address information of the sector number # (n) is recorded. The second half header section H2 is shifted by a half of a track pitch toward the inner side relatively to a position where the recording section R6 of the groove sector # (n) is formed, that is the second half header section H2 is parallel-translated sideways for displacement.

For a recording section R2 of a land sector # (n+N) whose address is indicated by a sector number # (n+N), a first half header section H1, which is provided at a forward position of the recording section R2 with not only a mirror section but in addition a space corresponding to the second header section H2 inserted therebetween, is used as a header section of the sector. In this case, the first half header section H1 comprises Header 1 and Header 2, in which address information of the sector number # (n+N) is recorded. The first half header section H1 is formed at a position which is shifted by a half of a track pitch toward the inner side relatively to a position where the recording section R2 of the land sector # (n+N) is located.

In this case, the recording section R2 of the land sector # (n+N) is formed in an adjacent manner to the recording section R6 of the groove sector # (n). That is, the recording section R2 of the land sector # (n+N) is formed at a position shifted toward the outer side relatively to the recording section R6 of the groove sector # (n) by one track pitch. Thus, the first header section H1 is formed at a position shifted toward the outer side relatively to the second half header section H2 by one track pitch. The first half header section H1 and the second half header section H2 are fabricated in a continuous manner by cutting described later and Header 2 in the first half header section H1 and Header 3 in the second header section H2 are located in an adjacent manner. With such a configuration, the first half header section H1 and the second header section H2 constitute a zig-zag shift header structure.

A sector whose address is indicated by a sector number one less than the sector number # (n) for the recording section R6 in the groove sector # (n) is a groove sector # (n−1), which is different from the case of the first sector. A recording section R5 of the groove sector # (n−1) is fabricated on the same track as the recording section R6 of the groove sector # (n) with a space occupied by the first half header section H1 interposing between the recording section R5 and the head portion of the second half header section H2 which is a header section of the groove sector # (n). In a similar manner, a sector whose address is indicated by an address number one less than the sector number # (n+N) for the recording section R2 in the land sector # (n+N) is a land sector # (n+N−1). A recording sector R1 of the land sector # (n+N−1) is fabricated on the same track as the recording section R2 in the land sector # (n+N) in an adjacent manner to the head portion of the first half header section H1 which is a header section of the land sector # (n+N).

Fabrication of a recording/reproducing optical disk having the structure described above will be described.

When an optical disk is fabricated, a master disk having a recess/protrusion profile corresponding to a groove and a pit is first of all fabricated by a method called cutting. The recess/protrusion profile formed on the master disk is transferred to a stamper and with use of the stamper as a die, a resin molding transferred with the profile is fabricated. This resin molding is used as a substrate for an optical disk and a recording film such as a phase change type film is formed on a profiled surface of the substrate by a method such as a vapor deposition method or the like. Then, a protective film for protecting the recording film is formed by a method such as coating or the like. In such a manner, fabrication of an optical disk on which a groove and a pit are formed is conducted. It is also possible to fabricate a bonding type optical disk by bonding the above described optical disks with each other with an intermediate layer made of a material similar to the protective layer.

Figure 20:
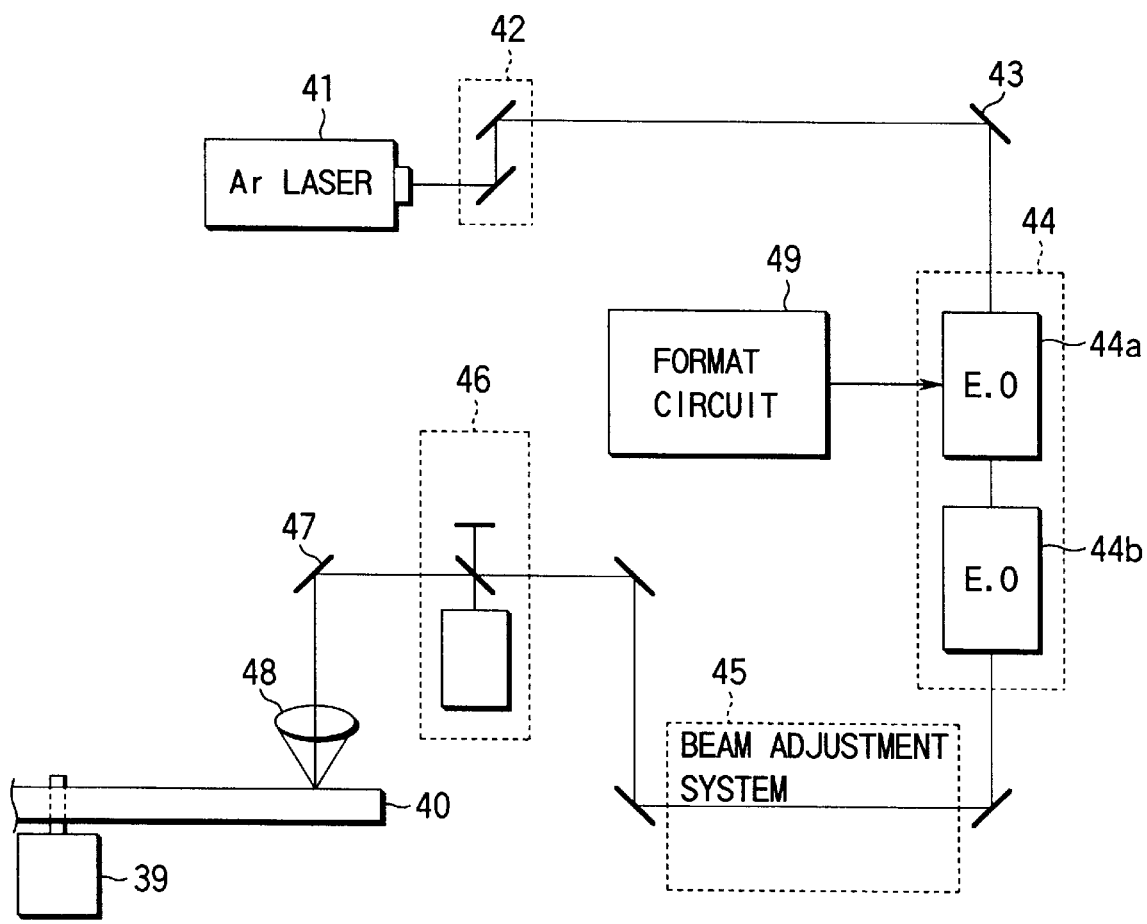
FIG. 20 is a view showing a master recording apparatus for recording recess/protrusion profiles corresponding to a groove and a pit on a master disk by cutting in manufacture of a recording/reproducing optical disk pertaining to an embodiment of the invention of the present application.

In FIG. 20, shown is a master disk recording apparatus for recording a recess and protrusion profile corresponding to a groove and a pit on a master disk by cutting.

In the master disk recording apparatus, laser light (for example, Ar laser or Kr laser light) emitted from a laser light source 41 is projected into a laser optical axis control system 42 adjusting an optical axis to cope with a change in optical axis caused by a change in temperature of laser light or the like. The laser light is reflected on a mirror 43 and modulated in a beam modulation system 44 comprising E·O modulators 44a, 44b controlled by a format circuit 49 into laser light having an arbitrary signal. At this point, the laser light can be modulated into a predetermined format signal. The format circuit 49 controls the beam modulation system 44 so that the laser light is modulated in accordance with a cutting action described later. Then, the laser light is adjusted in its beam diameter and sectional shape by passing a beam adjustment system 45 composed of a pin hole and a slit. Adjustment of the laser light is finished in the process described above and a beam shape can be confirmed with a beam monitoring system 46.

The laser light is further guided by a mirror 47 and converged for illumination on an optical recording master disk 40 by an objective lens 48. As the optical recording master disk 40, for example, a glass disk is used. A photoresist is coated on the glass disk and the surface of the photoresist is illuminated with the laser light. An optically activated portion produces a recess type profile by etching. A desired surface profile formed by the laser light illumination is thus obtained and a groove and a format pattern are recorded. Thus processed, the glass disk is used as a master disk, which is utilized to fabricate a stamper.

In cutting, the glass disk 40 is rotated by a rotating means 39, for example, a motor or the like at a predetermined speed. An optical pickup for illuminating a predetermined position on the glass disk 40 with the laser light is moved at a constant speed along a direction from the inner side to outer side. In cutting, the optical pickup is moved at an equal speed in terms of a rate of one track pitch per one rotation of the disk and an illuminating position of the laser light is moved along with the optical pickup. With the moving optical pickup, a portion on which laser light is applied is processed to a groove and a portion to which laser light is not applied is left unprocessed as a land. In a header section, laser light is turned on and off to produce a pit in the shape of a recess/protrusion profile.

A cutting action in an embodiment of the present invention will be described in reference to FIGS. 19A and 19B.

In FIG. 19A, it is assumed that a cutting processing for the recording section RF1 in the land sector # (m−1) whose address is indicated by the selector number # (m−1) is finished at a time t0. As described above, in a land area such as the recording section RF1 in the land sector # (m−1), laser light from the optical pickup is not projected on the area and a laser light illuminating position is only traveled. The traveling of the laser light illuminating position is achieved by a combination of rotation of an optical disk, movement of the light pickup and driving of an objective lens mounted to the light pickup.

After processing on the recording section RF1 in the land sector # (m−1) is finished at the time t0, the laser light illuminating position is in succession shifted toward the outer side by a half of a track pitch from the center of the track of the recording RF1 in the land sector # (m−1). At thus shifted track position, Header 1 and Header 2 whose sector number is assigned as # (m+N), that is the first half header section HF1 is recorded. At this point, the laser light radiated from the light pickup is turned on and off so that a pit is formed in a corresponding manner to information expressing a sector number. Header 1 in the first half header HF1 is recorded in an adjacent manner to the recording section RF1 in the land sector # (m−1). After the recording of Header 1, Header 2 in the first half section HF1 is recorded in succession to Header 1.

After record-cutting for Header 1 and Header 2 whose sector number is assigned as # (m+N), that is the first half header section HF1 is finished, the laser light illuminating position is in succession shifted toward the inner side by a half of a track pitch from the center of the track of Header 1 and Header 2. That is, the laser light illuminating position is shifted toward the inner side by a half of a track pitch from the center of the track of the recording section RF1 in the land sector # (m−1). Header 3 and Header 4 whose sector number is # (m), that is the second half header section HF2 are recorded at the track position of such a shift. At this point, the laser light is turned on and off so that a pit corresponding to information expressing the sector number is formed. Header 3 in the second half header section HF2 is recorded in an adjacent manner to Header 2 in the first half header section HF1. After the recording of Header 3, Header 4 in the second half header section HF2 is continuously recorded following Header 3.

After cutting for Header 3 and Header 4, whose sector number is # (m), that is the second half section HF2 are finished, cutting for recording is subsequently conducted for the recording section RF5 in the groove sector # (m) following the mirror section therebetween. At this point, laser light is not applied on the mirror section. The laser light illuminating position is shifted toward the outer side by a half of a track pitch from the center of the track of Header 3 and Header 4 with the sector number # (m). That is, the laser light illuminating position is shifted to not only the same track position as the track center of the recording section RF1 in the land sector # (m−1) but also to a track position shifted toward the inner side by a half of a track pitch from the track center of Header 1 and Header 2 with the sector number # (m+N).

Cutting for recording is conducted for the recording section RF5 in the groove sector # (m) at thus shifted track position. In the recording section RF5 in the groove sector #(m), laser light is applied and a groove is formed by etching of a photoresist. At this point, a laser light spot is subjected to for example, a sine wave oscillation in a 186 channel bit period along a direction from the inner side to the outer side, that is along a radial direction of the disk to fabricate a groove in the form of a wave. A signal component obtained from the groove in the form of the wave is utilized as a reference signal for generation of a clock in a data write operation (that is, when information is recorded on a recording/reproducing optical disk).

In the one round of a track from the sector number # (m) to the sector number # (m+N−1), all the sectors are groove sectors. In the groove sectors, the cutting for recording is conducted by predetermined procedures described below. Except for a first sector, the cutting will be described in reference to FIG. 19B.

In FIG. 19B, it is assumed that a cutting processing for the recording section R5 in the groove sector # (n−1), whose address is indicated by the selector number # (n−1), is finished at a time t1. After processing on the recording section R5 in the groove sector # (n−1) is finished, the laser light illuminating position is in succession shifted toward the outer side by a half of a track pitch from the track center of the recording section R5 in the groove sector # (n−1). Header 1 and Header 2 whose selector number is # (n+N), that is the first half header section H1 are recorded at the track position of such a shift. At this point, the laser light radiating from the optical pickup is turned on and off so that a pit is formed in a corresponding manner to information expressing a selector number. Header 1 in the first half header section Hi is recorded in an adjacent manner to the recording sector R5 in the land sector # (n−1). After the recording of Header 1 is finished, Header 2 in the first half header section H1 is recorded in succession to Header 1.

When cutting for recording of Header 1 and Header 2 with the sector number # (n+N), that is the first half header section H1 is finished, the laser light illuminating position is subsequently shifted toward the inner side by a half of a track pitch from the track center of Header 1 and Header 2. That is, the laser light illuminating position is shifted toward the inner side by a half of a track pitch from the track center in the recording section R5 in the groove sector # (n−1). Header 3 and Header 4 with the sector number # (n), that is the second half header section H2 are recorded at the track position of such a shift. At this point, the laser light radiating from the optical pickup is turned on and off so that a pit corresponding to information expressing a sector number is formed. Header 3 in the second half section H2 is recorded in an adjacent manner to Header 2 in the first half header section H1. After recording for Header 3 is finished, Header 4 in the second half header section H2 is recorded in a successive manner to Header 3.

After cutting for recording of Header 3 and Header 4 with the sector number # (n), that is the second half header section H2 is finished, cutting for recording for the recording section R6 in the groove sector # (n) is subsequently conducted after the passage of a mirror section. At this point, laser light is not illuminated on the mirror section. The laser light illuminating position is shifted toward the outer side by a half of a track pitch from the track center of Header 3 and Header 4 with the sector number # (n). That is, the laser light illuminating position is shifted to not only the same track position as the track center of the recording section R5 in the groove sector # (n−1) but also to a track position shifted toward the inner side by a half of a track pitch from the track center of Header 1 and Header 2 with the sector number # (n+N).

Cutting for recording is conducted for the recording section R6 in the groove sector # (n) at the track position of such a shift. In the recording section R6 in the groove sector # (n), laser light is applied and a groove is formed by etching of a photoresist. At this point, a laser light spot is subjected to for example, a sine wave oscillation in a 186 channel bit period along a direction from the inner side to the outer side, that is along a radial direction to fabricate a groove in the form of a wave. A signal component obtained from the groove in the form of the wave is utilized as a reference signal for generation of a clock in a data write operation.

With repetition of the cutting actions from the groove sector # (n−1) to the groove sector # (n) in a similar manner, what is achieved is the cutting for recording on the recording section RF5 in the groove sector with the sector number # (m) to the recording section RF6 in the groove sector with the sector number # (m+N−1), which is shown in FIG. 19A.

After the cutting for recording on the recording section RF5 in the groove sector # (m) to the recording section RF6 in the groove sector # (m+N−1) is finished, cutting of the first sector shown in FIG. 19A is again conducted. The first sector at this time is the land sector # (m+N) following the groove sector # (m+N−1). One round of a track of the sector number # (m+N) of the land sector # (m+N) to the sector number # (m+2N−1) consists entirely of land sectors. Therefore, in the one round of a track from the land sector # (m+N) to the land sector # (m+2N−1), laser light is not turned on. Header sections of the land sections at this time are already simultaneously formed in the cutting of groove sectors on the inner side by one track.

After the cutting processing on the land sector with the sector number # (m+N) to the land sector with the sector number # (m+2N−1) is over, a first sector is again subjected to a cutting processing. The first sector at this time is the groove sector # (m+2N) following the land sector # (m+2N−1). Sectors following the groove sector # (m+2N) are cut in a similar manner to the cutting conducted on and from the groove sectors # (m). With repetition of the cutting action, sectors having header sections of a structure shown in FIG. 19A can be fabricated.

If the cutting for recording described above is conducted, a header section in a groove sector, that is the second half header section comprising Header 3 and Header 4 and a recording section in a groove sector with the same sector number as the sector number of the header section are cut for recording in a continuous manner. For example, the second half header section HF2 comprising Header 3 and Header 4 with the sector number # (m) and the recording section RF5 in the groove sector # (m) are continuously cut.

However, a header section in a land sector, that is the first half header section comprising Header 1 and Header 2, and a recording section in a land sector with the same sector number as the sector number for the header section are not cut for recording in a continuous manner but recorded on different tracks by one round of track. For example, the first half header section HF1 comprising Header 1 and Header 2 with the sector number # (m+N) and the recording section RF2 in the land sector # (m+N) are recorded in different tracks by one round of track. Therefore, if there is a difference between one period of rotation of a disk and one period of a recording signal including N sectors, cutting for recording is conducted with a discrepancy arising between a header section in a land sector and a recording section in a land sector whose sector number is shown by the header section.

Described will be a sector format according to an embodiment of the invention of the present application which enables a header section to be detected with high reliability even when recording/reproduction of information is conducted on an optical disk fabricated by the cutting for recording with such a discrepancy in a header section.

FIG. 21A shows the entire structure of a sector according to an embodiment of the present invention. FIG. 21B shows a header section of the sector in a more detailed manner.

In FIG. 21A, the total byte number of a sector is 2697 bytes, which comprises: Header field of 128 bytes (hereinafter referred to as header section); Mirror field of 2 bytes (hereinafter referred to as mirror section); Recording field of 2567 bytes (hereinafter referred to as recording section). The header section, mirror section and recording section correspond in description to FIGS. 19A and 19B.

The header and mirror sections are portions in which recording has been conducted as a recess/protrusion profile before shipment of an optical disk. Preformat is an operation in which recording according to a predetermined format is conducted as a recess/protrusion profile before shipment.

A recording section is a portion where information discernible based on address information shown by a corresponding header section is recorded according to a predetermined format by a user of an optical disk after shipment of the optical disk. The recording section is fabricated only in the form of a groove or land when the preformat is conducted.

Recording of information on a recording section, for example, in the case where an optical disk is of a phase change type, is carried out by irradiation with laser light which is modulated in a corresponding manner to record information on a recording film of a phase change type provided in the recording section; and forming areas in a crystalline state or in an amorphous state on the recording film of a phase change type by modulation of the laser light. The user of the optical disk reproduces the information by utilizing a difference in reflectance based on a change in optical property between crystalline and amorphous states of the recording film in the recording section.

The recording section is recorded by a format comprising: a gap section (Gap field) of (10+J/16) bytes; a guard 1 section (Guard 1 field) of (20+K) bytes; a VFO 3 section (VFO 3 field) of 35 bytes; a pre-synchronous section (PS field) of 3 bytes; a data section (Data field) of 2418 bytes; a PA 3 section (PA 3 field) of 1 byte; a guard 2 section (Guard 2 field) of (55−K) bytes; and a buffer section (Buffer field) of (25−J/16) bytes, wherein J is an integer in the range of 0 to 15, K is an integer in the range of 0 to 7 and both assume random values.

FIG. 21B shows the content of a header section in a sector format of an optical disk according to an embodiment of the invention of the present application. The header section comprises: Header 1 field; Header 2 field; Header 3 field; and Header 4 field. These indicate the same as Header 1; Header 2; Header 3; and Header 4 described in reference to FIGS. 19A and 19B. These are hereinafter respectively referred to as Header 1; Header 2; Header 3; and Header 4. Lengths for Headers are: 46 bytes for Header 1; 18 bytes for Header 2; 46 bytes for Header 3; and 18 bytes for Header 4, and the total length of the header section is 128 bytes.

Each of Header 1, Header 2, Header 3 and Header 4 comprises: a VFO section; a AM section; a PID section; an IED section; and a PA section. The structure will be described below.

A VFO is an abbreviation of Voltage Frequency Oscillator and an area for enabling PLL (Phase Locked Loop) to function in a proper manner. That is, the VFO section comprises continuously repeated data patterns, which patterns are read by an optical disk apparatus described later which performs information recording/reproducing on an optical disk, from which a synchronization signal (clock signal), which is used for data read, rotational speed control of an optical disk and the like, is extracted to a PLL circuit incorporated in the optical disk apparatus. The data patterns are in a continuous manner repeated to lock PLL into establishment of perfect synchronization. If PLL is locked in a data pattern to establish perfect synchronization and produce a clock signal, data reading, disk rotational speed control and the like can be realized with certainty since a code pattern of the VFO is changed along with a change in rotation of an optical disk.

A VFO section has a length of 36 bytes as a VFO1 in each of Header 1 and Header 3 and on the other hand, a length of 8 bytes as VFO2 in each of Header 2 and Header 4. That is, as described above, a first half header comprises Header 1 and Header 2, which is used as a header section for a land sector; and a VFO section of Header 1, which is a head portion in the first half header section, is set to be longer than a VFO section of Header 2 on which laser light is applied after irradiation on Header 1. In a similar manner, a second half header section comprises Header 3 and Header 4, which is used as a header section of a groove sector and a VFO section of Header 3, which is a head portion in the second half header section, is set to be longer than a VFO section of Header 4 on which laser light is irradiated after irradiation on Header 3. A VFO section of each sector has at least a length of 8 bytes and PLL can usually function in a proper manner with use of such a length.

Since the VFO section of Header 1 and the VFO section of Header 3 which correspond to head portions of the sectors are set to be both longer than the VFO section of Header 2 and the VFO section of Header 4 which are not the head portions, PLL can function with more certainty with the help of the VFO sections. Therefore, detection of each of the header sections can be conducted with high reliability, whereby information recording/reproducing can be achieved with more precision.

It is especially effective, in information recording/reproducing on an optical disk which is fabricated with a discrepancy in the header section of a land sector, that the VFO section of Header 1 which is a head portion of a land sector is longer.

That is, in the case of a land sector, there is a time difference of one round of track between cutting for a header section and cutting for a recording section in the land sector whose sector number is shown by the header section. In such a condition, if there arises a difference between one period of rotation of a disk and a period of the recording signal covering N sectors, cutting for recording is conducted with a discrepancy between the header section in the land sector and the recording section in the land sector whose sector number is shown by the header section. If such a discrepancy arises between the header section and the recording section, it is harder to detect the header section than in a normal condition without such a discrepancy. Besides, if there is an offset in tracking in addition to the discrepancy of the header section, a difference in quality of reproductive signal between the header section of a land sector and the recording section of the land sector whose sector number is indicated by the header section makes detection of the header section even more difficult.

Even in such a case, since a VFO section of Header 1 which is a head portion of a land sector is designed to be longer, a function of PLL can be exerted with high reliability, which makes precision in header detection higher, so that a header section can be detected with precision and certainty.

AM is an abbreviation of Address Mark, is a synchronous code having a length of 3 bytes and is used for judging a word boundary in demodulation. PID is an abbreviation of Physical ID and comprises sector information having a length of 1 byte and a sector number having a length of 3 bytes. IED is an abbreviation of ID Error Detection code and a code having a length of 2 bytes for error detection of PID 4 bytes. PA is an abbreviation of Post Amble and a code having a length of 1 byte which is necessary to establish a state of previous bytes in demodulation.

Description will be given of the case where an emboss section of a recording/reproducing optical disk having headers of such a structure described above, that is a header section, which is constructed from a pit having a recess/protrusion profile, is read in an information recording/reproduction process.

Figure 22:
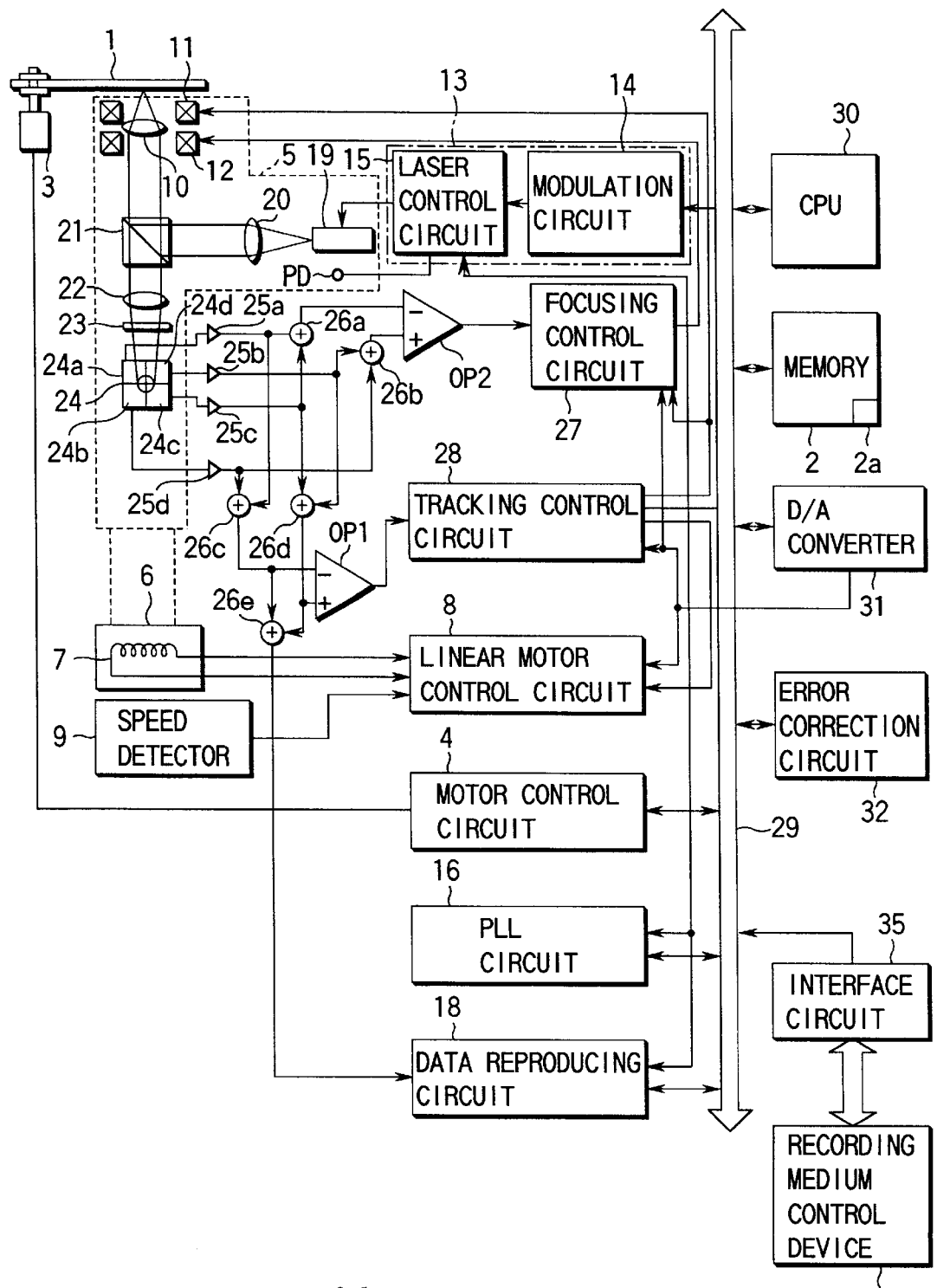
FIG. 22 is a block diagram showing an overall structure of an optical disk apparatus for performing recording/reproducing of information on a recording/reproducing optical disk pertaining to an embodiment of the invention of the present application.

FIG. 22 is a block diagram showing the overall structure of an optical disk apparatus used for information recording/reproducing on a recording/reproducing optical disk.

In FIG. 22, a recording/reproducing optical disk 1 which is an information recording medium in the shape of a circular plate is rotated by a spindle motor 3, for example, at a constant linear speed. The spindle motor 3 is controlled by a motor control circuit 4. Information recording/reproducing on the optical disk 1 is conducted by an optical pickup 5. The optical pickup 5 is fixed to a driving coil 7 constituting a moving section of a linear motor 6 and the driving coil 7 is connected to a linear motor control circuit 8.

A speed detector circuit 9 is connected to the linear motor control circuit 8 and a speed signal of the optical pickup 5 detected by the speed detector circuit 9 is transmitted to the linear motor control circuit 8. A stationary section of the linear motor 7 is provided with a permanent magnet not shown and the driving coil 7 is excited by the linear motor control circuit 8, whereby the optical pickup 5 is moved along a radial direction of the optical disk 1.

The optical pickup 5 is provided with an objective lens 10 supported by a wire or a leaf spring not shown. The objective lens 10 can be moved along not only a focusing direction (an optical axis direction of the lens) by driving of a driving coil 11 but a tracking direction (a direction orthogonally intersecting an optical axis of the lens) by driving of a driving coil 12.

A laser light beam is emitted from a semiconductor laser oscillator 9 under driving control of a laser control circuit 13. The laser control circuit 13 comprises a modulation circuit 14 and a laser driving circuit 15 and is operated in synchronization with a recording clock signal supplied from a PLL circuit 16. The modulation circuit 14 modulates a recording data supplied from an error correction circuit 32 into a signal suitable for recording, for example an 8–16 conversion data. The laser driving circuit 15 drives the semiconductor laser oscillator (or an Ar/Ne laser oscillator) 19 according to the 8–16 conversion data from the modulation circuit 14.

The PLL circuit 16 divides a master frequency generated by a crystal oscillator into a frequency corresponding to recording positions on the optical disk 1 in a recording process, thereby generates not only a recording clock signal but a reproducing clock signal corresponding to a reproduced synchronous code in a reproducing process, and further detects abnormality in frequency of the reproducing clock signal. The detection of frequency abnormality is performed by judging whether or not a frequency of the reproducing clock signal falls in the range of a predetermined frequency corresponding to a recording position on the optical disk 1 from which a data is reproduced. The PLL circuit 16 outputs a recording or reproducing clock signal in a selective manner according to a control signal from CPU 30 and a signal from a binarization circuit 41 in the data reproducing circuit 18.

A laser beam emitted from the semiconductor oscillator 19 is guided through a collimator lens 20, a half prism 21 and an objective lens 10 and finally directed on the optical disk. Reflecting light from the optical disk 1 is guided through an objective lens 10, a half prism 21, a collective lens 22 and a cylindrical lens 23 then to a photodetector 24.

The photodetector 24 is constructed from light detecting cells 24a, 24b, 24c and 24d, wherein the photodetector 24 is divided in four ways. Among them, output signals from the light detecting cells 24a, 24b, 24c, 24d are respectively supplied through amplifiers 25a, 25b, 25c, 25d to a terminal of an adder 26a, a terminal of an adder 26b, the other terminal of the adder 26a and the other terminal of the adder 26b.

Output signals from the light detecting cells 24a, 24b, 24c, 24d are respectively supplied through amplifiers 25a, 25b, 25c, 25d to a terminal of an adder 26c, a terminal of an adder 26d, the other terminal of the adder 26d and the other terminal of the adder 26c.

An output signal of the adder 26a is supplied to the inversion input terminal of a differential amplifier OP2 and an output signal of the adder 26b is supplied to the non-inversion input terminal of the differential amplifier OP2. The differential amplifier OP2 outputs a signal relating to a focal point in accordance with a difference between output signals of the adders 26a, 26b. The output is supplied to a focusing control circuit 27. An output signal of the focusing control circuit 27 is supplied to a focusing driving coil 12. Thereby, the laser light is controlled on the optical disk to be always in a just focusing condition.

An output signal of the adder 26c is supplied to the inversion input terminal of a differential amplifier OP1 and an output signal of the adder 26d is supplied to the non-inversion terminal of the differential amplifier OP1. The differential amplifier OP1 outputs a track difference signal according to a difference between the signals of the adders 26c, 26d. The output is supplied to a tracking control circuit 28. The tracking control circuit 28 generates a track driving signal according to the track difference signal from the differential amplifier OP1.

The track driving signal output from the tracking control circuit 28 is supplied to a driving coil 11 in a tracking direction. Moreover, the track difference signal used in the tracking control circuit 28 is supplied to the linear motor control circuit 8.

With application of the above described focusing control and tracking control, a change in a reflectance on a pit or the like formed in a corresponding manner to recording information on a track of the optical disk 1 is reflected on a sum signal of output signals of the light detecting cells 24a to 24d of the photodetector 24, that is an output signal of the adder 26e which is the sum of outputs of the adders 26c, 26d. The sum signal is supplied to the data reproducing circuit 18. The data reproducing circuit 18 reproduces a recorded data based on a reproducing clock signal from the PLL circuit 16.

The data reproducing circuit 18 not only detects a sector mark in a preformat data based on an output signal of the adder 26e and a reproducing clock signal from the PLL circuit 16, but also reproduces a track number and a sector number as address information from a binarized signal supplied from the PLL circuit 16 based on the binarized signal and the reproducing clock signal from the PLL circuit 16.

A reproduced data of the data reproducing circuit 18 is supplied to an error correction circuit 32 through a bus 29. The error correction circuit 32 corrects an error by use of an error correcting code (ECC) in the reproduced data or outputs a recording data supplied from an interface circuit 35 with an error correcting code (ECC) added thereto to a memory 2.

A reproduced datan error-corrected in the error correction circuit 32 is supplied to a recording medium control device 36 as an external device through a bus 29 and the interface circuit 35. A recording data generated from the recording medium control device 36 is supplied to the error correction circuit 32 through the interface circuit 35 and the bus 29.

When the objective lens 10 is moved by the tracking control circuit 28, the linear motor 6, that is the optical pickup 5, is moved by the linear motor control circuit 8 so that the objective lens 10 is located at a position in the vicinity of the center of the optical pickup 5.

A D/A converter 31 is used for information receiving/supplying between the focusing control circuit 27, the tracking control circuit 28, the linear is motor control circuit 8 and the CPU 30 controlling the whole system of the optical disk apparatus.

The CPU 30 controls the motor control circuit 4, the linear motor control circuit 8, the laser control circuit 15, the PLL circuit 16, the data reproducing circuit 18, the focusing control circuit 27, the tracking control circuit 28, the error correction circuit 32 and the like through the bus 29. The CPU 30 conducts a predetermined operation according to a program stored in the memory 2.

Next described will be reading a header section preformatted on a recording/reproducing optical disk according to the invention of the present application when information recording/reproducing is conducted on the optical disk by the optical disk apparatus having the structure described above in reference to FIG. 19A.

In FIG. 19A, in the case where a header section to be read as a target is, for example, the header section HF2 in the groove sector indicated by the sector number # (m), laser illumination on the recording section RF1 in the land sector indicated by the sector number # (m−1) is conducted ahead of reading on the header section HF2. The laser light spot directed to the recording section RF1 is moved so as to trace the track center of the recording section RF1. The tracing of the laser light spot is performed by tracking control in the optical disk apparatus which is already described in reference to FIG. 22.

The laser light directed to the recording section RF1 in the land sector indicated by the sector number # (m−1) while tracing the track center is subsequently directed to the header sections HF1 and HF2 recorded on the optical disk 1.

As described above, the header sections HF1 and HF2 comprise data of a length of 128 bytes in total. Here, if one byte has a physical length of about 3 $\mu$m, the header sections HF1 and HF2 have the total length of about 400 $\mu$m. If laser light illumination is conducted on the optical disk at a linear speed of about 6 m/s, the laser light spot passes from the header section HF1 to the header section HF2 in about 67 $\mu$s.

The light spot cannot follow the header sections, which repeatedly alternate sideways in a zig-zag shifted manner as shown in FIG. 19A since a zone area of the tracking control system is sufficiently small. Therefore, it may be considered that the light spot traces an imaginary track center. While the imaginary track center is different from the actual track center of the header sections HF1 and HF2, data such as address information and the like preformatted in the headers HF1 and HF2 can sufficiently be read. After the reading of the headers HF1 and HF2 is finished and the mirror section is passed by, laser light radiated from the optical pickup is applied to the recording section RF5 indicated by the selector number # (m) while following the imaginary track center.

In this case, the recording section in a sector which is illuminated with laser light after illumination on the headers HF1 and HF2 is the recording section RF5 in the groove sector. The header section used in a groove sector, as described above, is the second half header section comprising Header 3 and Header 4, and the header HF2 is a second half section in the header sections HF1 and HF2 which are read in advance. Therefore, the second header section HF2 is used as a header section of the recording section RF5 and address information of the recording section RF5 is indicated by the second half header section HF2.

Figure 23:
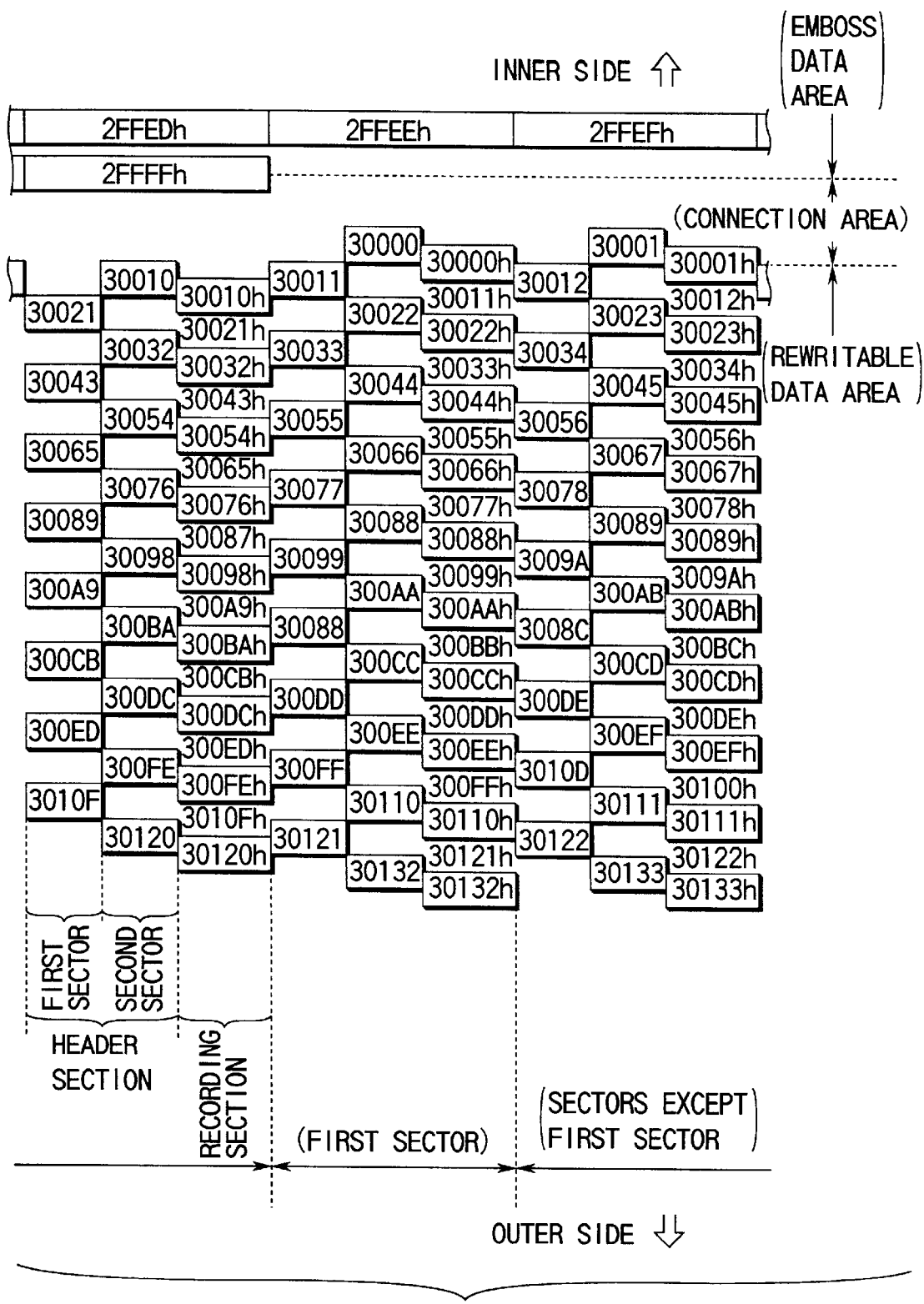
FIG. 23 is a representation, as a model, showing the structure of a header section disposed in a zig-zag shifted manner and in the neighborhood of the header section pertaining to an embodiment of the invention of the present application.

As described above, header sections disposed in a zig-zag shifted manner are formed on an optical disk pertaining to the invention of the present application. Header sections disposed in a zig-zag shifted manner and a structure in the neighborhood of the header sections are shown in FIG. 23 as a model. In FIG. 23, the inner side of an optical disk and the outer side thereof are shown by white arrows at the top and bottom of the figure. Therefore, the direction from top to bottom or vice versa corresponds to a radial direction of an optical disk.

In FIG. 23, the case where sector addresses are in the range of 30000 h to 30133 h is shown. The letter h following these numbers represents that the numbers are in hexadecimal notation. In FIG. 23, recording sections are shown in hexadecimal notation and header sections are not.

In addition, in recording sections of sectors, the sectors in which sector addresses are respectively indicated by 30000 h, 30001 h, 30010 h, 30022 h, 30023 h . . . are shown as groove sectors. The sectors in which sector addresses are indicated by 30011 h, 30012 h, 30021 h, 30033 h, 30034 h . . . are shown as land sectors.

In this case, a header section indicated by a number and a recording section with the same number as that indicating the header section plus the letter h following the number in a combined manner constitute one sector as a pair. In the figure, if a header section indicated by the number 30000 is described as (30000 h) header section and the recording section in a groove sector indicated by 30000 h is described as (30000 h) groove sector recording section, for example, the (30000 h) header section and the (30000 h) groove recording section constitute one sector as a pair. In this case, in the (30000 h) header section, sector information of the sector address 30000 h is recorded in a preformat and a user records information indicated by the sector address 30000 h in the (30000 h) groove sector recording section.

In FIG. 23, the same structure of a header section as that described in reference to FIG. 19A is shown as a model. In an optical disk comprising header sections formed in the structure shown in FIG. 23, a tracking polarity is alternately switched in a radial direction in a manner such as in the order of land/groove/land/groove, each corresponding to one track round, without any track jump when a track is traced in a spiral manner as described in FIG. 19A.

In the case of FIG. 23, the number of sectors in one track round is shown as 17 (11 h in the hexadecimal notation) and when a track is traced in one more round, the number of sector addresses on a track adjacent toward the outer side has an increment of 17. For example, sectors adjacent, toward the outer side, to other sectors whose number of sector addresses is 30000 h have 30011 h as the number of sector addresses.

In FIG. 23, the sectors indicated by 30000 h, 30011 h, 30022 h, 30033 h . . . as sector addresses are those at positions where a tracking polarity is converted and the first sections described above. The sectors indicated by 30010 h, 30021 h, 30032 h, 30043 h . . . as sector addresses and in addition, the sectors indicated by 30001 h, 30012 h, 30023 h, 30034 h . . . as sector addresses are sectors other than the first sectors.

In a system in which groove sectors and land sectors are alternately converted in a radial direction, with one track round as a unit as described above, a polarity of grooves or lands needs to be converted in tracking and sectors located at positions of polarity conversion need to have a different header configuration than the other sectors.

For example, the first header section for the (30000 h) groove sector recording section is recorded with the address number of 30011 h in preformat and the second header section therefor is recorded with the address number of 30000 h in preformat. Since the (30000 h) groove sector recording section is of a groove type, the address number of 30000 h recorded in the second half header section is the sector address.

On the other hand, the first half header section, for example, the (30011 h) land sector recording section is in advance recorded with the address number of 300011 h in preformat and the second half header section therefor is in advance recorded with the address number of 30022 h in preformat. Since the (30011 h) land sector recording section is of a land type, the address number 300011 h recorded in the first half header is the sector address.

Positional relations of such a zig-zag shift is header configuration will be described in the case of a groove sector. There is a positional relation that a first half header section is wobbled to the outer side but a second half header section is wobbled to the inner side. That is, settings are such that the first half header section is shifted toward the outer side of an optical disk relatively to a track position of the groove sector by a half of a track pitch and the second half header section is shifted toward the inner side of the optical disk by a half of the track pitch. On the other hand, in the case of a land sector, a positional relation of headers is opposite to that of a groove sector and a first half header section is wobbled toward the inner side and a second half header section is wobbled toward the outer side.

In a system in which groove sectors and land sectors are alternately converted in a radial direction with one track round as a unit, a polarity of a groove or land needs to be converted from one to the other in tracking. Timing of the conversion is determined depending on reading a header section. That is, the header section is read and a correct polarity is selected by discerning whether the recording section is of a land type or of a groove type based on information obtained from the reading before tracking in the recording section following the header section gets started.

At this point, if the following recording section is discerned to be of a land type based on information obtained from the header section, a tracking polarity is selected to be of a land type and tracking in the recording section is then conducted. If, to the contrary, the following recording section is discerned to be of a groove type based on information from the header section, the tracking polarity is selected to be of a groove type and tracking in the recording section is then conducted.

Conversion of a tracking polarity is conducted when the laser light illuminating position is located in the mirror section (Mirror Field) shown in FIG. 19A. When the position in the mirror section is specified, information obtained from the header section is also utilized. That is, if information can be read from any of Header 1, Header 2, Header 3 and Header 4 which constitute a header section with precision, a position in the mirror can be specified by calculating retroactively from the reading position.

For example, in the case where reading is conducted on Header 1 in an orderly manner, counting of the number of bits gets started at a time when the reading on Header 1 is finished. Since a sector format in the header section is in advance determined as shown in FIG. 21A, the number of bits which is counted to reach the mirror section starting at a position where the reading on Header 1 is finished is determined in advance. Therefore, when the predetermined number of bits is counted from the time when the reading on Header 1 is finished, it is assumed that the mirror section is illuminated with the laser and conversion of the tracking polarity is conducted. After the polarity is converted to a correct polarity in the mirror section, tracking in a land or groove recording section gets started.

In the land/groove polarity conversion thus conducted, the above mentioned relation between the inner side wobbling and outer side wobbling can be utilized for detection of timing in the conversion. Below described will be a way to detect timing in the land/groove conversion by use of this relation between wobblings to the inner and outer sides.

Timing detection for the land/groove polarity conversion is conducted by use of the photodetector 24 shown in FIG. 22. The photodetector 24 is constructed from light detecting cells 24a, 24b, 24c and 24d, which is a four way division. As already described, output signals of the light detecting cell 24a and the light detecting cell 24b are summed in the adder 26c and output signals of the light detecting cell 24c and the light detecting cell 24d are summed in the adder 26d.

Output signal of the adder 26c is supplied to the inversion input terminal of the differential amplifier OP 1 and output signal of the adder 26d is supplied to the non-inversion terminal of the differential amplifier OP 1. The differential amplifier OP 1 outputs a track difference signal in accordance with a difference between the output signals of the adders 26c, 26d and the output is supplied to the tracking control circuit 28, whereby the track driving signal is generated in the tracking control circuit 28 in accordance with the track difference signal from the differential amplifier OP 1.

The track driving signal output from the tracking control circuit 28 is supplied to the driving coil 11 in the direction of tracking or the track difference signal used in the tracking control circuit 28 is supplied to the linear motor control circuit 8, and thereby tracking control is conducted.

One case is where the photodetector 24 is divided into two groups, that is a first pair consisting of the light detecting cells 24a, 24b and a second pair consisting of the light detecting cells 24c, 24d, wherein the two pairs are divided in relation to a direction along a recording track.

The following situation is considered. The first light detecting cell pair of the two pairs formed by division in two ways is located in a corresponding manner to the outer side of a recording track and an output signal from the first light detecting cell pair is indicated by A. The second light detecting cell pair of the two pairs formed by division in two ways is located in a corresponding manner to the inner side of the recording track and an output signal from the second light detecting cell pair is indicated by B.

When illumination by a light beam is conducted while tracing a track, if the light beam travels on a header section wobbled toward the outer side, an output of the signal A is increased but an output of the signal B is decreased. On the other hand, if the light beam travels on a header section wobbled toward the inner side, an output of the signal B is increased but an output of the signal A is decreased.

At this point, if a (A–B) signal, which is a difference between both signals is generated, (A–B)>0 in the header section wobbled toward the outer side and (A–B)<0 in the header section wobbled toward the inner side, and (A–B)=0 in the other situation. For simplicity, the condition of (A–B) >0 is indicated by [+], the condition of (A–B)<0 is indicated by [–] and the condition of (A–B)=0 is indicated by [0].

If the (A–B) signal output which is output from such a photodetector 24 is utilized, the (A–B) signal is changed from [+] to [–] prior to illumination of the light beam on the recording section of a groove sector when the light beam travels through the groove sector. This change is shown in a graph of FIG. 26A.

On the other hand, the (A–B) signal output is changed from [–] to [+] prior to illumination of the light beam on the recording section of a land sector when the light beam travels through the land sector. This change is shown in a graph of FIG. 26B. Therefore, it is possible that a polarity change of the (A–B) signal output is monitored by the tracking control circuit with the help of the differential amplifier OPI interposing therebetween and detection of land or groove is performed by processing of the CPU 30, whereby timing in land/groove conversion in polarity is detected.

That is, when the (A–B) signal output is changed from [+] to [–], it is detected that a recording section to which the light beam is applied after the change is the recording section of a groove sector. If the groove sector at this point is a groove sector in the first sector, control is performed so that a tracking polarity is converted from land to groove in order to have tracking control conducted in an orderly manner.

In a similar manner, when the (A–B) signal output is changed from [–] to [+], it is detected that a recording section to which the light beam is applied after the change is the recording section of a land sector. If the groove sector at this point is a land sector in a first sector, control is performed so that a tracking polarity is converted from groove to land in order to have tracking control conducted in an orderly manner.

As seen from the description above, if a polarity change in the (A–B) signal output is utilized, timing detection in land/groove polarity conversion can be effected.

Described below is a method in which timing detection in the land/groove polarity conversion is conducted by use of recording information recorded in preformat in the header on an optical disk, that is sector type bits in the header.

Prior to the description, a header structure shown in FIG. 23 will be described. It has already been described herein that with the numbering method for a sector address which is described in reference to FIG. 19A, disk cutting for recording of a single spiral structure can be continuously performed from the inner side to the outer side in one operation on an optical disk with zig-zag shift headers as shown in FIG. 23. Recording signals in the cutting are sequentially sent from a format circuit 49 in the master disk recording apparatus shown in FIG. 20 in the following order and the beam modulation system 44 comprising the E·O modulators 44a, 44b is thus controlled, whereby the cutting is conducted in accordance with the sector address numbering method.

The sending order of the recording signals is [(30011 h) header section→(30000 h) header section→(30000 h) groove sector recording section→ . . . →(30021 h) header section→(30010 h) header section→(30010 h) groove sector recording section→one round is blank→(30033 h) header section→(30022 h) header section→(30022 h) groove sector recording section→ . . . etc.

The concrete content of the (30011 h) header section will be described in reference to FIG. 21B. The header section is an emboss header in which not only 030011 h is recorded in the low order 3 bytes of PID 1 section (4 bytes) of Header 1 but 030011 h is also recorded in the low order 3 bytes of PID 2 section (4 bytes) of Header 2. The concrete content of the (30000 h) header section is an emboss header in which not only 030000 h is recorded in the low order 3 bytes of PID 3 section (4 bytes) of Header 3 but 030000 h is also recorded in the low order 3 bytes of PID 4 section (4 bytes) of Header 4.

A land/groove recording disk of a single spiral type can be fabricated by following the sector address numbering method. The disk has a series of sector addresses in a continuous manner wherein a first address is directly followed by a second address which is larger or smaller than the first address by 1 and the entire surface can be processed without any track jump or any seek in a continuous recording/reproducing mode.

However, as described above, in a land/groove recording disk of a single spiral type, there is a need for tracking polarity conversion between any pair of adjacent track rounds. That is, in the (30010 h) groove sector recording section of FIG. 23, a tracking polarity is of a groove type, but portions which are subsequently illuminated with a light beam are of a groove polarity for the (30011 h) header section and of a land polarity for the (30011 h) land sector recording section in tracking.

Conversion in tracking polarity is conducted by a method in which sector type bits in a header section is utilized, which is described below, in addition to the above described method in which the conversion is conducted by use of a polarity of a (A–B) signal.

The contents of the PID sections of headers are shown in FIG. 21B and PID 1 section is provided in Header 1, PID 2 section is provided in Header 2, PID 3 section is provided in Header 3 and PID 4 section is provided in Header 4. Each PID section comprises information of 32 bits (4 bytes). The bits are respectively indicated by b 31 to b 0, wherein b 31 is the highest order bit (MSB) and b 0 is the lowest order bit (LSB).

Eight bits (1 byte) from b 31 to b 24 of the bits from b 31 to b 0 which constitute a PID section are a portion where sector information, that is information on the sector is recorded. Twenty four bits (3 bytes) from b 23 to b 0 are a sector number, that is a portion where information on a sector address is recorded.

The content of sector information will be described below. The b 31 and b 30 are reserved bits and for example, they are temporarily recorded with 00b and are reserved for recording some kind of information in the future. A letter b which follows 00 shows the number is of a binary notation. The bits b 29 and b 28 show a physical ID number, and 00b is recorded in the PID 1 section, 01b is recorded in the PID 2, 10b is recorded in the PID 3 and 11b is recorded in the PID 4.

The bits b 27 to b 25 are a portion where a sector type is shown and a sector for read only is recorded with 000b, a writable first sector is recorded with 100b, the writable last sector is recorded with 101b, a writable sector ahead of the last sector by one sector is recorded with 110b and a sector other than the above described is recorded with 111b, wherein sectors from 001b to 011b are reserved.

A sector for read only indicates a sector where a data section is fabricated by embossment actually like a read-in area portion. A first sector is a sector where conversion in tracking polarity from land to groove or vice versa is performed. The last sector indicates a sector ahead of the first sector by one sector.

Further description will be given with use of the example of FIG. 23. Sectors indicated with sector addresses 30000 h, 30011 h, 30022 h, 30033 h, . . . are writable first sectors. Sectors indicated with sector addresses 30010 h, 30021 h, 30032 h, 30043 h, . . . are writable last sectors. Besides, sectors indicated with sector addresses 3000F h, 30020 h, 30031 h, 30042 h, . . . are writable sectors ahead of the last sector by one sector.

Timing for a writable first sector that is required for tracking polarity conversion can be generated from sector type bits which are a portion indicating a sector type. That is, a sector type is determined by reading the PID section in a header and a tracking polarity is or is not converted to the other based on a determined sector type. Even when the first sector is not detected, conversion timing is generated from a last sector ahead of the sector by one sector or a writable sector ahead of the last sector by one sector, which makes it possible to effect conversion of a tracking polarity.

In detection of a first section along with timing detection in tracking polarity conversion, an IED section of 2 bytes is additionally provided as shown in FIG. 21B and thereby error detection can be effected. Therefore, a rewritable first sector can be detected with high reliability and tracking polarity conversion on a single spiral disk can be realized in a stable manner.

If a PID section comprising PID 1 and PID 2 is grouped as a first half PID section and a PID section comprising PID 3 and PID 4 is grouped as a second half PID section and sector address values recorded in the first and second PID sections are compared with each other, a result from the comparison can be utilized for tracking polarity conversion.

That is, a first half header section for the (30000 h) groove sector recording section is the (30011 h) header section and a second half header section therefor is the (30000 h) header section. The (30011 h) header section of the first half header section is provided with the first half PID section in which the sector address 30011 h is recorded. The (30000 h) header section of the second half header section is provided with the second half PID section in which the sector address 30000 h is recorded.

The sector address 30011 h recorded in the first half PID section is larger in value than the sector address 30000 h recorded in the second half PID section. This relation is effective for all the groove sectors having the structure shown in FIG. 23. Therefore, when a header section is illuminated with a light beam, sector addresses in the first half PID section and in the second half PID section are read and the sector address in the first half PID section is larger, and a recording section which is subsequently illuminated can be judged as the recording section of a groove sector, which in turn can be used for tracking polarity conversion.

A similarity can be seen in the case of a land sector. For example, a first half header section for the (30011 h) land sector recording section is the (30011 h) header section and a second half header section therefor is the (30022 h) header section. The (30011 h) header section of the first half header section is provided with the first half PID section in which the sector address 30011 h is recorded. The (30022 h) header section of the second half header section is provided with the second half PID section in which the sector address 30022 h is recorded.

The sector address 30011 h recorded in the first half PID section is smaller in value than the sector address 30022 h recorded in the second half PID section. This relation is effective for all the land sectors having the structure shown in FIG. 23. Therefore, when a header section is illuminated with a light beam, sector addresses in the first half PID section and in the second half PID section are read and the sector address in the first half PID section is smaller, and a recording section which is subsequently illuminated can be judged as the recording section of a land sector, which in turn can be used for tracking polarity conversion.

Described will be the case where, at this point, the above mentioned conversion of a tracking polarity is not performed in an orderly manner, or the conversion is intentionally not conducted, and an automatic track-hold is effected in a track.

For example, in the first sector shown in FIG. 23, when tracing with a light beam is conducted from the (30021 h) land sector recording section to the (30022 h) groove sector recording section, the track center of a land track is traced normally with the spot of the light beam in the (30021 h) land sector recording section as described above. Tracing with the light beam is conducted along the center line between header sections in a zig-zag shifted configuration comprising the (30033 h) header section and the (30022 h) header section. In the (30022 h) groove sector recording section, a tracking polarity is first switched from land to groove and thereafter, the track center of a groove track is traced with the light beam spot.

At this point, if a tracking polarity cannot still be switched over from land to groove after the light spot traveled through the header sections in a zig-zag shifted configuration, tracking control is effected so that the light beam spot traces any of the (30011 h) land sector recording section and the (30033 h) land sector recording section and a normal track follow-up condition can no longer be held. At this point, it is unforeseeable to which section the light spot is tracking-controlled since there are various factors such as the eccentricity of the disk, a track offset condition and the like.

Accordingly, when a light beam spot traces the track, intentionally provided is a track offset which has a magnitude of an order that does not deteriorate recording/reproducing characteristics. That is, a light beam spot traces track centers of a land track and a groove track with a small deviation from a center toward the inner side of a disk when the light beam spot traces the land tracks and the groove tracks in the shape of a spiral from the inner side to the outer side.

In such a situation, if a tracking polarity is not converted as described above, tracking control is effected from the (30021 h) land sector recording section to the (30011 h) land sector recording section through the zig-zag shift headers. After the tracking control, the light beam begins to trace a land track of one round from the (30011 h) land sector recording section and returns back to the (30021 h) land sector recording section.

Therefore, if a small track offset with a magnitude of an order which does not adversely affect the recording/reproducing characteristics is intentionally provided toward the inner side of the disk, the light beam spot can be made to trace while being held on the same track in the tracing order of 30011 h, 30012 h, 30020 h, 30021 h, 30011 h, . . . and when tracking polarity conversion is not conducted or even when tracking polarity conversion is not satisfactorily conducted, a large deviation from a normal tracking control can be prevented.

In FIG. 23, an emboss data area is shown in a place, toward the inner side, spaced from the rewritable data area with the zig-zag shift header configuration described above. The emboss data area is a data area for read only, and is not of a sector format having a rewritable zig-zag shift header configuration but data are recorded in the sector format for a read-only disk. In the emboss data area, data are recorded with embossment comprising pits in a recess/protrusion profile. A coupling area comprising a mirror is provided in a space between the emboss data area and the rewritable data area.

In such an emboss area, for example, a reference signal, physical format information, disk fabrication information, disk supplier information and the like are recorded and the area is used as a read-in area which can be read for information retrieval by a read-only player conventionally used. With such a provision, disk identification can be effected with ease by a conventional read-only player even when information recorded in a sector format with zig-zag shift headers cannot be read out by the player.

It is preferred in an optical disk of a land/groove recording type with a zig-zag shift header section that a so-called zoned CLV format or a so-called zoned CAV format can be used to serve a double purpose.

That is, by adopting a single spiral structure having a zig-zag shift header section, information can be recorded on a land and in a groove, as described above, and recording capacity thereby is increased and access in a short time can be realized throughout the entire disk surface. On the other hand, a zoned CLV format or a zoned CAV format is suitable for high speed access since rotational speed control of a spindle motor can be simplified. Therefore, if the zoned CLV format or the zoned CAV format is used in combination with a single spiral structure having the above described zig-zag shift header section, further improvement on an access speed can be realized.

Figure 24:
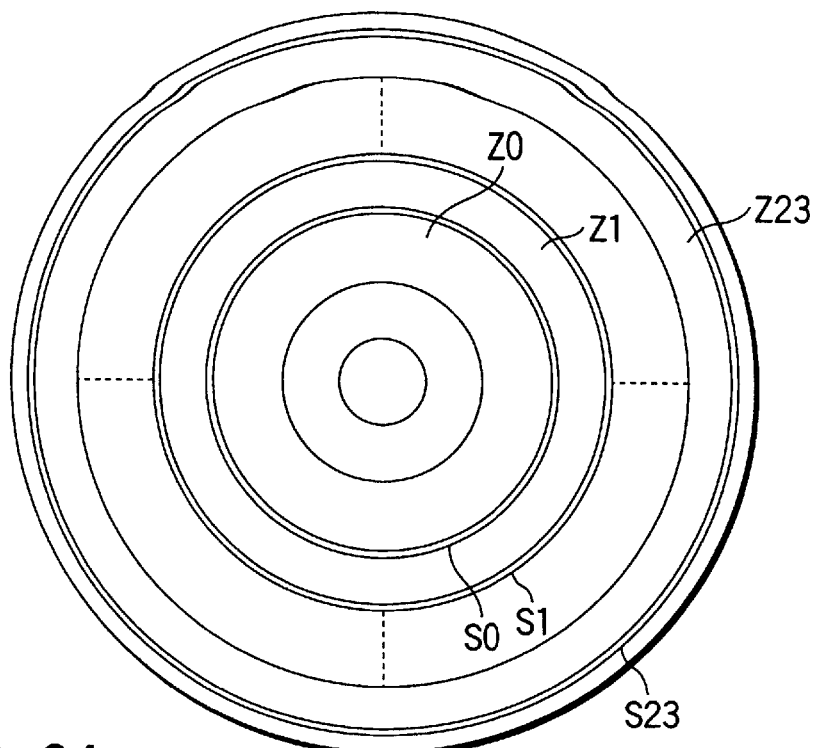
FIG. 24 is a view, as a model, of a recording/reproducing optical disk pertaining to an embodiment of the invention of the present application wherein the optical disk is partitioned into a plurality of annular zones.
Figure 26A:
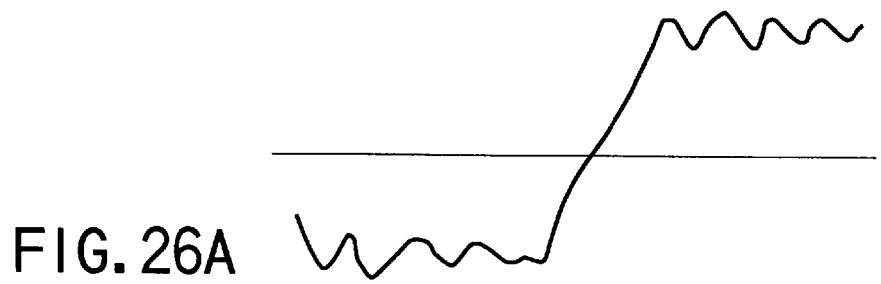
FIGS. 26A, 26B are graphs showing signal changes in reading on zig-zag shift headers of the present invention.
Figure 26B:
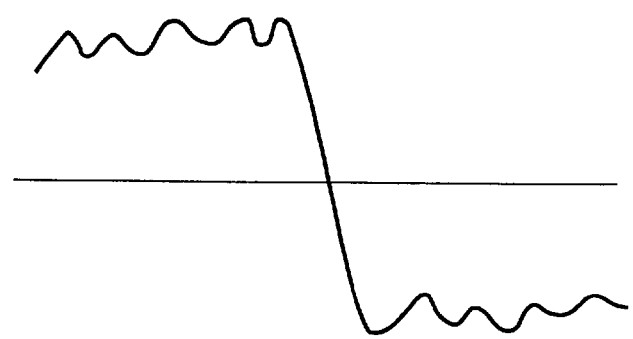
Figure 25:
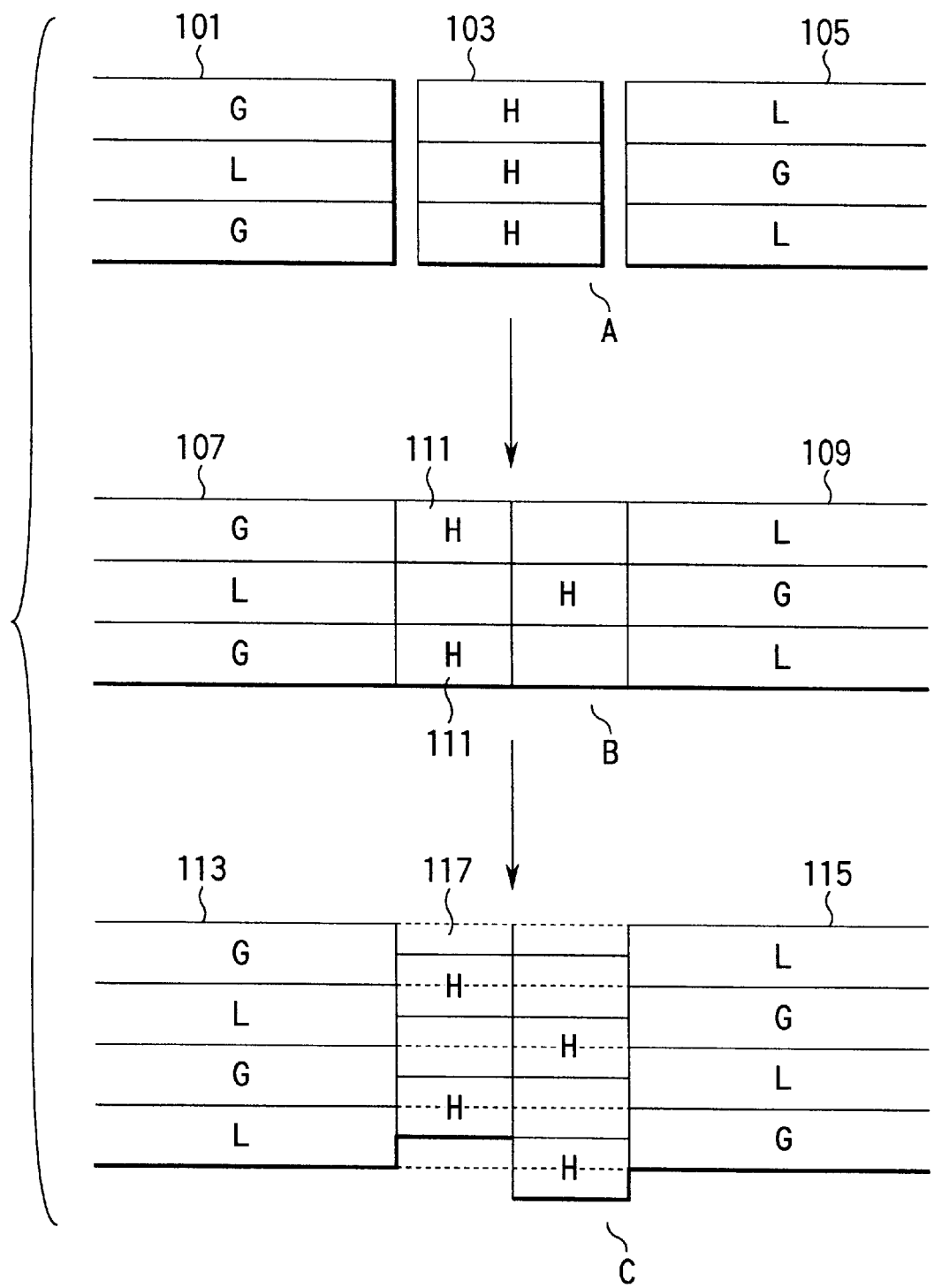
FIG. 25 is a representation for explaining stages of development in creation of the present invention.

As shown in FIG. 24, for example, in a zoned CLV format, the surface of an optical disk 1 is divided into a plurality of annular zones Z0, Z1, . . . , Z23. Information is recorded in the sector format of a single spiral structure with a zig-zag shift header section in each divided annular zone. A linear speed on the disk surface is controlled so as to be kept at a constant value in each divided annular zone while changing a disk rotational speed. Since it is easy to conduct information reading at a near constant linear speed when disk rotation speed is controlled almost at a constant value in each zone, high speed access can be realized.

However, when recording/reproducing are performed on an optical disk between zones in a bridging manner, a change in rotational speed of the spindle motor is needed. For example, if there is a sector where information cannot be reproduced due to presence of a defect on a recording surface in a zone and no spare area (that is, alternate area) is available where information can be recorded, it is necessary to conduct recording/reproducing over adjacent zones on the disk and thereby to change a rotational speed of the spindle motor.

A change in rotational speed of a motor requires a long time until a rotational speed is stabilized and as a result, data access time is longer. A spare area is provided in each zone in order to eliminate such a harmful effect. For example, in the 24 divided zones described above, that is in Z0, Z1, . . . , Z23, spare areas S0, S1, . . . , S23 are provided along the outside of the periphery of each respective zone.

TABLE 1

| Zone number | Sectors number | Head sectors number (HEX) | Inner side buffer area sectors number (HEX) | Data area number (HEX) | Data block number | Spare sector number (HEX) |
|---|---|---|---|---|---|---|
| 0 | 17 | 31000 | — | 31000 to 377DF | 1662 | 377E0 to 37D2F |
| 1 | 18 | 37D60 | 37D60 to 37D8F | 37090 to 3FB2F | 2010 | 3FB30 to 401EF |
| 2 | 19 | 40220 | 40220 to 4024F | 40250 to 486EF | 2122 | 486D0 to 48E0F |
| 3 | 20 | 48E40 | 48E40 to 48F6F | 48E70 to 51ADF | 2234 | 51A10 to 5218F |
| 4 | 21 | 521C0 | 521C0 to 521EF | 52 F0 to 5B48F | 2346 | 5B490 to 5BC6F |
| 5 | 22 | 58CA0 | 58CA0 to 58CCF | 58CD0 to 6566F | 2458 | 65670 to 65EAF |
| 6 | 23 | 6SEE0 | 65E10 to 6540F | 65F10 to 6FFAF | 2570 | 61FB0 to 7084F |
| 7 | 24 | 70880 | 70880 to 708AF | 708B0 to 7B04F | 2882 | 78050 to 7894F |
| 8 | 5 | 78980 | 78980 to 7898F | 789C0 to 8683F | 2792 | 86840 to 8719F |
| 9 | 26 | 871E0 | 871E0 to 8721F | 87220 to 9279F | 2904 | 927A0 to 9315F |
| 10 | 27 | 931A0 | 931A0 to 931DF | 931E0 to 9EE5F | 3016 | 9EE60 to 9F87F |
| 11 | 28 | 9F8C0 | 9F8C0 to 9F8FF | 9F9D0 to ABC7F | 3128 | ABC80 to AC6FF |
| 12 | 29 | AC740 | AC740 to AC77F | AC780 to B91FF | 3240 | B9200 to B9CDF |

TABLE 1-continued

| Zone number | Quantity of spare sector | Number of sector of outer side buffer area (HEX) | Final sector number (HEX) | LBA head sector | Number of data area of head sector (HEX) |
|---|---|---|---|---|---|
| 0 | 1360 | 37D30 to 37D5F | 37D5F | 0 | 31000 |
| 1 | 1728 | 401F0 to 4021F | 4021F | 26592 | 377E0 |
| 2 | 1824 | 48E10 to 48E3F | 48E3F | 58752 | 3F580 |
| 3 | 1920 | 52190 to 5218F | 521BF | 92704 | 47A20 |
| 4 | 2016 | 5BC70 to 58C9F | 58C9F | 128448 | 505C0 |
| 5 | 2112 | 65EB0 to 65EDF | 65EDF | 165984 | 59860 |
| 6 | 2208 | 70850 to 70871 | 7087F | 205312 | 63200 |
| 7 | 2304 | 7B950 to 7B97F | 7897F | 246432 | 6D2A0 |
| 8 | 2400 | 871A0 to 871DF | 871DF | 289344 | 77A40 |
| 9 | 2496 | 93160 to 9319F | 9319F | 334016 | 828C0 |
| 10 | 2592 | 9F880 to 9F88F | 9F8BF | 380480 | 8DE40 |
| 11 | 2688 | AC700 to AC73F | AC73F | 428736 | 99AC0 |
| 12 | 2784 | B9CE0 to B9D1F | B9D1F | 478784 | A5E40 |

| Zone number | Sectors number | Head sectors number (HEX) | Inner side buffer area sectors number (HEX) | Data area number (HEX) | Data block number | Spare sector number (HEX) |
|---|---|---|---|---|---|---|
| 13 | 30 | 89D20 | 89D20 to 89D5F | B9D50 to C6EDF | 3352 | C6EE0 to C7A1F |
| 14 | 31 | C7A60 | C7A60 to C7A91 | C7AAO to D531F | 3464 | D5320 to D5EBF |
| 15 | 32 | D5F00 | D5F00 to D5F3F | D5F40 to E3EBF | 3576 | E3EC0 to E4ABF |
| 16 | 33 | E4B00 | E4B00 to E4B4F | E4850 to F31AF | 3686 | F31B0 to F3EOF |
| 17 | 34 | F3E60 | F3E60 to F3EAF | F3E80 to 102C0F | 3798 | 102C10 to 1038CF |
| 18 | 35 | 103920 | 103920 to 10396F | 103970 to 112DCF | 3910 | 112DD0 to 113AEF |
| 19 | 36 | 113B40 | 113B40 to 11398F | 113890 to 1238EF | 4022 | 1236F0 to 12448F |
| 20 | 37 | 1244C0 | 1244CC0 to 12450F | 124510 to 13478F | 4134 | 134770 to 13554F |
| 21 | 38 | 1355A0 | 1355A0 to 1355EF | 1355F0 to 145F4F | 4246 | 145F50 to 148D8F |
| 22 | 39 | 146DE0 | 146DEC0 to 146E2F | 146E30 to 157E8F | 4358 | 157E90 to 158D2F |
| 23 | 40 | 15BD80 | 158D80 to 158DCF | 148DD0 to 16A57F | 4475 | 16A580 to 16B47F |
| Total | | | | | 76185 | |

| Zone number | Quantity of spare sector | Number of sector of outer side buffer area (HEX) | Final sector number (HEX) | LBA head sector | Number of data area of head sector (HEX) |
|---|---|---|---|---|---|
| 13 | 2880 | C7A20 to C7A5F | C7A5F | 530624 | B2OC0 |
| 14 | 2976 | D5EC0 to D5EFF | D5EFF | 584256 | BFA4O |
| 15 | 3072 | E4AC0 to E4AFF | E4AFF | 639880 | CD2C0 |
| 16 | 3168 | F3E10 to F3E5F | F3E5F | 696896 | DB240 |
| 17 | 3264 | 1038D0 to 10391F | 10391F | 755872 | E98A0 |
| 18 | 3360 | 113AF0 to 113B3F | 113B3F | 816640 | F8600 |
| 19 | 3458 | 124470 to 1244BF | 12448F | 879200 | 107A60 |
| 20 | 3552 | 135550 to 13559F | 13559F | 943552 | 1175C0 |
| 21 | 3648 | 146D90 to 146D0F | 148DDF | 1009696 | 127820 |
| 22 | 3744 | 158D30 to 158D7F | 158D7F | 1077632 | 138180 |
| 23 | 3840 | — | 16847F | 1147360 | 1491E0 |
| Total | 65392 | | | | |

In Table 1, the zone numbers 0, 1, . . . , 23 correspond to the zones Z0, Z1, . . . , Z23 respectively and data for the zones are shown.

The number of sectors shows the number of sectors in one track round, which incrementally increases by one when the zone number increases. A start sector number shows the sector number of the start sector of a zone, that is a representation of a sector address in the hexadecimal notation. The sector number of an inner side buffer area shows the sector number of a buffer area provided in the inner side of each zone. A buffer area is an area provided at an interface between zones and no data recording is conducted there. A data area sector number shows the sector number of an area where user data recording can be effected. Calculation of a disk capacity is to sum up data quantities of areas of this kind. The number of data blocks is expressed in the decimal notation, and shows how many ECC blocks (16 physical sectors) can be included in the areas where the user data recording can be effected.

A spare sector number is the sector number of a spare sector, which is expressed in the hexadecimal notation, and which is included in the spare area of a zone. As can be seen from Table 1, a sector with a larger sector number is located at an outer position in an optical disk and thus, the spare areas described above each are disposed in the outer side of a zone. The number of spare sectors is the number of spare sectors expressed in the decimal notation.

The sector numbers of an outer side buffer area show sector numbers of a buffer area which are disposed on the outer side of a zone. The end sector numbers show the end sector number of a zone expressed in the hexadecimal notation. A LBA start sector number, which is expressed in the decimal notation, shows the start number of a logic block address (that is, the sectors other than the buffer areas and the spare areas are numbered with a series of numbers wherein a first number is directly followed by a second number which is larger or smaller than the first number by 1). The data area number of a start sector shows a number, which is expressed in the hexadecimal notation, and which is offset from a LBA start sector number by 31000 h in the hexadecimal notation, that is obtained by adding to the LBA start sector number with 200704 in the decimal notation.

As described above, in the embodiments of the invention of the present application, a spare area is provided for each zone and the switch-over can be performed without any change in disk rotational speed, whereby a shorter time in data access can be realized. As a preferred example in regard to the data shown in Table 1 there is a structure that each zone comprises 1888 tracks. In this case, no change in disk rotational speed is required in switch-over and all that is required is to conduct a seek over the maximum of 1888 tracks.

As described above, according to the present invention, the first half header section (HF1, HF3) and the second half header section (HF2, HF4) are spatially disposed alternately in a zig-zag shifted configuration as shown FIG. 19A and thereby at least the following advantages are achieved: 1) that reliability in reading is improved by providing a margin in distance between adjacent pits; 2) that speedy cutting is realized by use of only one beam without use of a finer beam exclusively used for a header; and 3) that switch-over position between a land and a groove can be detected with ease. Thereby, a disk with high reliability in data recording/reproducing can further be provided. In addition, provided is a data recording/reproducing optical disk recording/reproducing apparatus, in which data recording/reproducing with precision and a high speed is effected on the optical disk.

Besides, the present invention has been described in various embodiments and at least one of the aspects of the invention is to keep a product between a rotation number R and the number of sectors n in one track in each of plurality of zones as a constant value C and thereby to supply data at a constant transmission rate in a stable manner, so that the present invention can provide an optical disk which can effect recording/reproducing data such as an animation or the like without addition of any special circuitry thereto, a master disk manufacturing apparatus for the optical disk and an optical disk apparatus using the optical disk.

Furthermore, recorded is emboss information exclusively used for specific reading, which is limited to information especially required for stable reading such as control information and the like, and with recording on the emboss information, provided is an optical disk on which control data and the like can always be read with certainty.

Furthermore, since a change area is given to each of a land area and a groove area as described above, a recording/reproducing process is achieved with more certainty even when there is a disturbance in recording in a primary recording area.

Moreover, with a configuration of the first half header section and the second half header section in a zig-zag shifted manner with a space between the half sections, the following advantages are secured: 1) that reliability in reading is improved by providing a margin in distance between adjacent pits; 2) that speedy cutting is realized by use of only one beam without use of a finer beam exclusively used for a header; and 3) that converting position between a land and a groove can be detected with ease.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk comprising:
    a plurality of land areas and a plurality of groove areas formed on a disk made of resin in a spiral or circular configuration such that each full round of said configuration consists of one of a land area and a groove area, and such that a land area and a groove area are alternately disposed in a sequential manner along a radial direction of said disk; and
    a plurality of tracks formed on said plurality of land areas and said plurality of groove areas, said plurality of tracks being partitioned into a plurality of zones on said disk from a radially inner portion to a radially outer portion thereof, said plurality of tracks also being circumferentially partitioned into a plurality of sector areas such that sector areas on each track abut sector areas on an adjacent track, said sector areas each including an address area where address data specifying the location of the sector area on the track is recorded, and also including a recording area where arbitrary data is recorded, wherein the number of sector areas per track within said zones increases by one between adjacent zones from a radially inner portion of said disk to a radially outer portion thereof, the plurality of sector areas also including a plurality of block areas having a plurality of error correction recording areas that record error correction data in order to accurately reproduce the recorded arbitrary data, wherein the disk in use is rotated such that a rotation number of the disk in said zones is sequentially slowed between adjacent zones from a radially inner portion of said disk to a radially outer portion thereof such that a product of the rotation number and the number of sector areas per track in each zone is held constant.

2. An optical disk according to claim 1, wherein the number of tracks in a zone equals a product of the number of sector areas in a block area and an integer.

3. An optical disk according to claim 1, wherein each of said zones comprises: a user area where user data is recorded; and a spare area having a first guard area disposed on the inner side of said zone in which data is not recorded and a second guard area disposed on the outer side of a zone in which data is not recorded.

4. An optical disk recording apparatus, comprising:
    an optical disk made of resin, said disk having a plurality of land areas and a plurality of groove areas formed thereon in a spiral or circular configuration such that each full round of said configuration consists of one of a land area and a groove area, and such that a land area and a groove area are alternately disposed in a sequential manner along a radial direction of said disk, said disk further having a plurality of tracks formed on said plurality of land areas and said plurality of groove areas, said plurality of tracks being partitioned into a plurality of zones on said disk from a radially inner portion to a radially outer portion thereof, said plurality of tracks also being circumferentially partitioned into a plurality of sector areas such that sector areas on each track abut sector areas on an adjacent track, said sector areas each including an address area where address data specifying the location of the sector area on the track is recorded, and also including a recording area where arbitrary data is recorded, wherein the number of sector areas per track within said zones increases by one between adjacent zones from a radially inner portion of said disk to a radially outer portion thereof, the plurality of sector areas also including a plurality of block areas having a plurality of error correction recording areas that record error correction data in order to accurately reproduce the recorded arbitrary data, wherein the disk in use is rotated such that a rotation number of the disk in said zones is sequentially slowed between adjacent zones from a radially inner portion of said disk to a radially outer portion thereof such that a product of the rotation number and the number of sector areas per track in each zone is held constant;

means for receiving data from an external apparatus;

means for holding and rotating said disk at a predetermined revolution; and means for recording said received data on said disk.

5. The optical disk recording apparatus according to claim 4, wherein the number of tracks in a zone equals a product of the number of sector areas in a block area and an integer.

6. The optical disk recording apparatus according to claim 4, wherein each of said zones includes a user area where user data is recorded, and a spare area having a first guard area disposed on the inner side of said zone in which data is not recorded, and a second guard area disposed on the outer side of said zone in which data is not recorded.

7. A method of recording data on an optical disk, said method comprising:

providing an optical disk, said disk being made of resin, and having a plurality of land areas and a plurality of groove areas formed thereon in a spiral or circular configuration such that each full round of said configuration consists of one of a land area and a groove area, and such that a land area and a groove area are alternately disposed in a sequential manner along a radial direction of said disk, said disk further having a plurality of tracks formed on said plurality of land areas and said plurality of groove areas, said plurality of tracks being partitioned into a plurality of zones on said disk from a radially inner portion to a radially outer portion thereof, said plurality of tracks also being circumferentially partitioned into a plurality of sector areas such that sector areas on each track abut sector areas on an adjacent track, said sector areas each including an address area where address data specifying the location of the sector area on the track is recorded, and also including a recording area where arbitrary data is recorded, wherein the number of sector areas per track within said zones increases by one between adjacent zones from a radially inner portion of said disk to a radially outer portion thereof, the plurality of sector areas also including a plurality of block areas having a plurality of error correction recording areas that record error correction data in order to accurately reproduce the recorded arbitrary data, wherein the disk in use is rotated such that a rotation number of the disk in said zones is sequentially slowed between adjacent zones from a radially inner portion of said disk to a radially outer portion thereof such that a product of the rotation number and the number of sector areas per track in each zone is held constant;

receiving data from an external apparatus;

holding and rotating said disk at a predetermined revolution; and recording said received data on said disk.

8. The method of claim 7, wherein, in said provided disk, the number of tracks in a zone equals a product of the number of sector areas in a block area and an integer.

9. The method of claim 7, wherein, in said provided disk, each of said zones includes a user area where user data is recorded, and a spare area having a first guard area disposed on the inner side of said zone in which data is not recorded, and a second guard area disposed on the outer side of said zone in which data is not recorded.

10. An optical disk reproducing apparatus, comprising:

an optical disk, said disk being made of resin, and having a plurality of land areas and a plurality of groove areas formed thereon in a spiral or circular configuration such that each full round of said configuration consists of one of a land area and a groove area, and such that a land area and a groove area are alternately disposed in a sequential manner along a radial direction of said disk, said disk further having a plurality of tracks formed on said plurality of land areas and said plurality of groove areas, said plurality of tracks being partitioned into a plurality of zones on said disk from a radially inner portion to a radially outer portion thereof, said plurality of tracks also being circumferentially partitioned into a plurality of sector areas such that sector areas on each track abut sector areas on an adjacent track, said sector areas each including an address area where address data specifying the location of the sector area on the track is recorded, and also including a recording area where arbitrary data is recorded, wherein the number of sector areas per track within said zones increases by one between adjacent zones from a radially inner portion of said disk to a radially outer portion thereof, the plurality of sector areas also including a plurality of block areas having a plurality of error correction recording areas that record error correction data in order to accurately reproduce the recorded arbitrary data, wherein the disk in use is rotated such that a rotation number of the disk in said zones is sequentially slowed between adjacent zones from a radially inner portion of said disk to a radially outer portion thereof such that a product of the rotation number and the number of sector areas per track in each zone is held constant;

means for holding and rotating said disk at a predetermined revolution; and means for detecting and reproducing data stored on said disk.

11. The optical disk reproducing apparatus according to claim 10, wherein the number of tracks in a zone equals a product of the number of sector areas in a block area and an integer.

12. The optical disk reproducing apparatus according to claim 10, wherein each of said zones includes a user area where user data is recorded, and a spare area having a first guard area disposed on the inner side of said zone in which data is not recorded, and a second guard area disposed on the outer side of said zone in which data is not recorded.

13. A method of reproducing data stored on an optical disk, said method comprising:

providing an optical disk, said disk being made of resin, and having a plurality of land areas and a plurality of groove areas formed thereon in a spiral or circular configuration such that each full round of said configuration consists of one of a land area and a groove area, and such that a land area and a groove area are alternately disposed in a sequential manner along a radial direction of said disk, said disk further having a plurality of tracks formed on said plurality of land areas and said plurality of groove areas, said plurality of tracks being partitioned into a plurality of zones on said disk from a radially inner portion to a radially outer portion thereof, said plurality of tracks also being circumferentially partitioned into a plurality of sector areas such that sector areas on each track abut sector areas on an adjacent track, said sector areas each including an address area where address data specifying the location of the sector area on the track is recorded, and also including a recording area where arbitrary data is recorded, wherein the number of sector areas per track within said zones increases by one between adjacent zones from a radially inner portion of said disk to a radially outer portion thereof, the plurality of sector areas also including a plurality of block areas having a plurality of error correction recording areas that record error correction data in order to accurately reproduce the recorded arbitrary data, wherein the disk in use is rotated such that a rotation number of the disk in said zones is sequentially slowed between adjacent zones from a radially inner portion of said disk to a radially outer portion thereof such that a product of the rotation number and the number of sector areas per track in each zone is held constant;

holding and rotating said disk at a predetermined revolution; and detecting and reproducing data stored on said disk.

14. The method of claim 13, wherein, in said provided disk, the number of tracks in a zone equals a product of the number of sector areas in a block area and an integer.

15. The method of claim 13, wherein, in said provided disk, each of said zones includes a user area where user data is recorded, and a spare area having a first guard area disposed on the inner side of said zone in which data is not recorded, and a second guard area disposed on the outer side of said zone in which data is not recorded.

* * * * *